(12) United States Patent
Probetts et al.

(10) Patent No.: US 11,720,956 B2
(45) Date of Patent: *Aug. 8, 2023

(54) INTEGRATED GRAPHICAL USER INTERFACE FOR SEPARATE SERVICE LEVELS OF A FINANCIAL PLANNING SYSTEM

(71) Applicant: Empower Annuity Insurance Company of America, Greenwood Village, CO (US)

(72) Inventors: Daryl Probetts, Highlands Ranch, CO (US); Jeremy Hersch, Greenwood Village, CO (US); Sean Hough, Thornton, CO (US); Paul O'Connell, Wilmington, MA (US)

(73) Assignee: EMPOWER ANNUITY INSURANCE COMPANY OF AMERICA, Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/418,302

(22) Filed: May 21, 2019

(65) Prior Publication Data

US 2019/0355054 A1 Nov. 21, 2019

Related U.S. Application Data

(60) Provisional application No. 62/674,407, filed on May 21, 2018.

(51) Int. Cl.
*G06Q 40/02* (2023.01)
*G06Q 40/06* (2012.01)
(Continued)

(52) U.S. Cl.
CPC .......... *G06Q 40/02* (2013.01); *G06F 3/0482* (2013.01); *G06F 3/0483* (2013.01);
(Continued)

(58) Field of Classification Search
CPC ....... G06Q 40/02; G06Q 40/06; G06Q 40/174
(Continued)

(56) References Cited

U.S. PATENT DOCUMENTS 5,918,217 A 6/1999 Maggioncalda et al.
6,012,044 A 1/2000 Maggioncalda et al.
(Continued)

*Primary Examiner* — Bruce I Ebersman
*Assistant Examiner* — Paul R Kloberg
(74) *Attorney, Agent, or Firm* — Polsinelli PC

(57) ABSTRACT

A graphical user interface for a financial planning system includes at least one planning engine in communication with a database storing user profiles for a first and second plurality of users registered respectively for a first and second service level. An introductory page displays, to the first and second users, a top level menu and a comparison of an estimated retirement income amount to a user goal. The top level menu appears in a substantially identical format and location, and the first comparison appears in a substantially identical format and location, to the first and second users. The introductory page also displays, to the first and not the second users, an enrollment link operable to enable registration for the second service level. The introductory page further displays, to the second and not the first users, a dashboard link operable to open a dashboard page for the second level of services.

20 Claims, 61 Drawing Sheets

(51) Int. Cl.
　　*G06F 3/04847* (2022.01)
　　*G06F 3/0483* (2013.01)
　　*G06F 3/0482* (2013.01)
　　*G06F 16/904* (2019.01)
　　*G06F 16/9035* (2019.01)
　　*G06F 40/174* (2020.01)
　　*G06F 16/955* (2019.01)

(52) U.S. Cl.
　　CPC ........ *G06F 3/04847* (2013.01); *G06F 16/904* (2019.01); *G06F 16/9035* (2019.01); *G06F 40/174* (2020.01); *G06Q 40/06* (2013.01); *G06F 16/9558* (2019.01)

(58) Field of Classification Search
　　USPC .......................................................... 703/35
　　See application file for complete search history.

(56) References Cited

U.S. PATENT DOCUMENTS

| | | |
|---|---|---|
| 6,021,397 A | 2/2000 | Jones et al. |
| 6,125,355 A | 9/2000 | Bekaert et al. |
| 6,292,787 B1 | 9/2001 | Scott et al. |
| 6,408,282 B1 | 6/2002 | Buist |
| 6,654,788 B1 | 11/2003 | Chance et al. |
| 6,968,317 B1 | 11/2005 | Wallace et al. |
| 7,016,870 B1 | 3/2006 | Jones et al. |
| 7,016,873 B1 | 3/2006 | Peterson et al. |
| 7,062,458 B2 | 6/2006 | Maggioncalda et al. |
| 7,120,601 B2 | 10/2006 | Chen et al. |
| 7,136,898 B1 | 11/2006 | Chisaki et al. |
| 7,216,099 B2 | 5/2007 | Chen et al. |
| 7,249,081 B2 | 7/2007 | Shearer et al. |
| 7,305,353 B1 | 12/2007 | Foley et al. |
| 7,321,871 B2 | 1/2008 | Scott et al. |
| 7,333,951 B1 | 2/2008 | Corning et al. |
| 7,383,218 B1 | 6/2008 | Oros |
| 7,386,494 B1 | 6/2008 | Rose et al. |
| 7,389,257 B2 | 6/2008 | Perkel et al. |
| 7,437,326 B2 | 10/2008 | Slowik et al. |
| 7,483,847 B1 | 1/2009 | Rymer et al. |
| 7,565,620 B1 | 7/2009 | Kershaw et al. |
| 7,599,869 B2 | 10/2009 | Sands et al. |
| 7,606,799 B2 | 10/2009 | Kalinichenko et al. |
| 7,627,507 B1 | 12/2009 | Drakeley et al. |
| 7,630,929 B1 | 12/2009 | Fisher et al. |
| 7,640,200 B2 | 12/2009 | Gardner et al. |
| 7,672,890 B2 | 3/2010 | Hernandez |
| 7,711,619 B2 | 5/2010 | Merton et al. |
| 7,720,742 B1 | 5/2010 | Mauro et al. |
| 7,752,110 B1 | 7/2010 | Swearingen et al. |
| 7,761,388 B2 | 7/2010 | Chitaley et al. |
| 7,774,257 B2 | 8/2010 | Maggioncalda et al. |
| 7,788,155 B2 | 8/2010 | Jones et al. |
| 7,813,989 B2 | 10/2010 | Jones et al. |
| 7,822,671 B1 | 10/2010 | Oros |
| 7,860,233 B2 | 12/2010 | Kaundinya et al. |
| 7,860,774 B1 | 12/2010 | Peterson et al. |
| 7,870,051 B1 | 1/2011 | En et al. |
| 7,873,556 B1 | 1/2011 | Dolan et al. |
| 7,949,592 B1 | 5/2011 | Oros |
| 7,983,975 B2 | 7/2011 | Jones et al. |
| 8,005,739 B1* | 8/2011 | Reddy .................... G06Q 40/08 705/36 R |
| 8,019,671 B2 | 9/2011 | Goolgasian |
| 8,051,000 B2 | 11/2011 | Kurczek et al. |
| 8,055,570 B2 | 11/2011 | Shelon et al. |
| 8,060,434 B1 | 11/2011 | Mauro et al. |
| 8,117,108 B2 | 2/2012 | Johnson et al. |
| 8,126,798 B2 | 2/2012 | Dolan et al. |
| 8,131,666 B2 | 3/2012 | O'Brien et al. |
| 8,166,157 B2 | 4/2012 | Couture et al. |
| 8,170,939 B2 | 5/2012 | Corning et al. |
| 8,185,463 B1 | 5/2012 | Ball |
| 8,200,561 B1 | 6/2012 | Scott et al. |
| 8,219,473 B2 | 7/2012 | Gardner et al. |
| 8,224,735 B1 | 7/2012 | Bold et al. |
| 8,244,621 B1 | 8/2012 | Swearingen et al. |
| 8,265,942 B2 | 9/2012 | Doyle et al. |
| 8,285,566 B2 | 10/2012 | Mcswaney et al. |
| 8,301,536 B2 | 10/2012 | Fulshaw et al. |
| 8,306,885 B2* | 11/2012 | Brose .................... G06Q 40/00 705/36 R |
| 8,321,320 B1 | 11/2012 | Lurtz et al. |
| 8,326,728 B1 | 12/2012 | Devaney et al. |
| 8,370,243 B1* | 2/2013 | Cernyar ................. G06Q 40/06 705/36 R |
| 8,392,578 B1 | 3/2013 | Donovan et al. |
| 8,417,617 B1 | 4/2013 | Swearingen et al. |
| 8,433,628 B2 | 4/2013 | Lindeman |
| 8,463,675 B1 | 6/2013 | Schwab et al. |
| 8,473,397 B2 | 6/2013 | Gardner et al. |
| 8,484,294 B1 | 7/2013 | Raneri et al. |
| 8,515,846 B1 | 8/2013 | Forsythe |
| 8,521,633 B2 | 8/2013 | Scott et al. |
| 8,527,382 B2 | 9/2013 | Mcdonough et al. |
| 8,532,628 B2 | 9/2013 | Kalinichenko et al. |
| 8,533,017 B1 | 9/2013 | Kohl et al. |
| 8,548,889 B1 | 10/2013 | Swearingen et al. |
| 8,566,191 B2 | 10/2013 | Shelon et al. |
| 8,577,779 B2 | 11/2013 | Kalt |
| 8,583,472 B2 | 11/2013 | Iannucci et al. |
| 8,584,219 B1 | 11/2013 | Toole et al. |
| 8,595,116 B1 | 11/2013 | Bettinger, II et al. |
| 8,626,632 B1 | 1/2014 | Dolan et al. |
| 8,628,150 B2 | 1/2014 | Kalt |
| 8,645,262 B1 | 2/2014 | Cottrell et al. |
| 8,660,861 B2 | 2/2014 | Chun et al. |
| 8,660,873 B1 | 2/2014 | Kohl et al. |
| 8,660,929 B2 | 2/2014 | Corning et al. |
| 8,666,871 B1 | 3/2014 | Canter |
| 8,666,887 B2 | 3/2014 | Elterich |
| 8,676,687 B2 | 3/2014 | Mcdonough et al. |
| 8,676,690 B1 | 3/2014 | Sprague et al. |
| 8,712,900 B2 | 4/2014 | Senoski |
| 8,725,614 B2 | 5/2014 | Scott et al. |
| 8,738,527 B2 | 5/2014 | Kalinichenko et al. |
| 8,751,356 B1 | 6/2014 | Garcia |
| 8,756,128 B2 | 6/2014 | Timmer et al. |
| 8,768,800 B2 | 7/2014 | Milosavljevic et al. |
| 8,768,815 B1 | 7/2014 | Thayer et al. |
| 8,775,214 B2 | 7/2014 | Birbara |
| 8,788,311 B2 | 7/2014 | Fleurant et al. |
| 8,874,656 B2 | 10/2014 | O'Connell et al. |
| 8,892,467 B1 | 11/2014 | Ball |
| 8,924,276 B2 | 12/2014 | Lindeman |
| 8,930,217 B2* | 1/2015 | Feinschreiber ........ G06Q 40/06 705/2 |
| 8,966,640 B1 | 2/2015 | Peddada et al. |
| 8,973,002 B1 | 3/2015 | Grammas et al. |
| 9,166,999 B1 | 10/2015 | Kulkarni et al. |
| 9,256,876 B2 | 2/2016 | Vasant Akole et al. |
| 9,491,178 B2 | 11/2016 | Bubany et al. |
| 9,548,996 B2 | 1/2017 | Meredith et al. |
| 9,558,250 B2 | 1/2017 | Sun |
| 9,773,276 B2 | 9/2017 | Foley et al. |
| 9,990,608 B2 | 6/2018 | Phillips et al. |
| 10,223,754 B1* | 3/2019 | Lopez .................... G06Q 40/12 |
| 10,438,288 B1 | 10/2019 | Hartigan et al. |
| 10,460,379 B1* | 10/2019 | Diggdon ................ G06Q 20/00 |
| 10,558,992 B2 | 2/2020 | Yang et al. |
| 2002/0002521 A1 | 1/2002 | Shearer et al. |
| 2003/0195831 A1 | 10/2003 | Feldman |
| 2005/0004856 A1* | 1/2005 | Brose .................... G06Q 40/08 705/35 |
| 2005/0004865 A1 | 1/2005 | Chudnovsky |
| 2006/0074788 A1 | 4/2006 | Grizack et al. |
| 2006/0100912 A1* | 5/2006 | Kumar .................. G06F 16/951 705/4 |
| 2007/0011063 A1 | 1/2007 | Shelon et al. |
| 2007/0027736 A1* | 2/2007 | Reynolds ............... G06Q 40/02 708/112 |
| 2009/0138406 A1 | 5/2009 | Reinkemeyer et al. |

(56) References Cited

U.S. PATENT DOCUMENTS

| | | |
|---|---|---|
| 2009/0192947 A1 | 7/2009 | Kenigsberg et al. |
| 2010/0100469 A1* | 4/2010 | Buchanan ............... G06Q 40/02 705/35 |
| 2010/0115612 A1 | 5/2010 | O'Brien et al. |
| 2011/0055115 A1 | 3/2011 | Hu et al. |
| 2011/0161116 A1* | 6/2011 | Peak ................... G06Q 20/3223 345/173 |
| 2011/0202474 A1* | 8/2011 | Mele ....................... G06Q 40/00 705/36 R |
| 2012/0005124 A1 | 1/2012 | Hu et al. |
| 2012/0069131 A1 | 3/2012 | Abelow |
| 2012/0242696 A1 | 9/2012 | Martin et al. |
| 2013/0066811 A1 | 3/2013 | Lurtz et al. |
| 2013/0144804 A1 | 6/2013 | Devaney et al. |
| 2013/0318007 A1 | 11/2013 | Van Harlow et al. |
| 2013/0325520 A1* | 12/2013 | Stewart ............... G06Q 30/0282 705/4 |
| 2014/0006050 A1* | 1/2014 | Feinschreiber ......... G06Q 40/00 705/2 |
| 2014/0019171 A1* | 1/2014 | Koziol ................... G06Q 40/08 705/4 |
| 2014/0129402 A1 | 5/2014 | Mcdonough et al. |
| 2014/0136381 A1 | 5/2014 | Joseph et al. |
| 2014/0304193 A1 | 10/2014 | Iskoz et al. |
| 2014/0351168 A1 | 11/2014 | Milosavljevic et al. |
| 2014/0365399 A1* | 12/2014 | Dennelly ............... G06Q 40/06 705/36 R |
| 2015/0019317 A1* | 1/2015 | Mitchell ............ G06Q 30/0226 705/14.27 |
| 2015/0066808 A1 | 3/2015 | Legare et al. |
| 2015/0066811 A1* | 3/2015 | Legare ................... G06Q 40/06 705/36 R |
| 2015/0120337 A1* | 4/2015 | Spalding ................ G06Q 40/08 705/4 |
| 2015/0161733 A1 | 6/2015 | Emsbo-Mattingly et al. |
| 2015/0178845 A1 | 6/2015 | Thayer et al. |
| 2015/0178846 A1* | 6/2015 | Feinschreiber ........ G06Q 40/06 705/36 R |
| 2015/0206245 A1 | 7/2015 | Basu et al. |
| 2015/0221036 A1 | 8/2015 | Sharma et al. |
| 2015/0356316 A1 | 12/2015 | Thompson et al. |
| 2015/0356552 A1 | 12/2015 | Thompson et al. |
| 2016/0063445 A1 | 3/2016 | Feinschreiber et al. |
| 2016/0104245 A1 | 4/2016 | Alter |
| 2016/0110810 A1 | 4/2016 | Ashok et al. |
| 2016/0110814 A1 | 4/2016 | Harris et al. |
| 2016/0117771 A1 | 4/2016 | Macdonald et al. |
| 2016/0117772 A1 | 4/2016 | Zhang et al. |
| 2016/0117773 A1 | 4/2016 | Lin et al. |
| 2016/0155200 A1 | 6/2016 | Basu et al. |
| 2016/0203558 A1 | 7/2016 | Morton, III et al. |
| 2016/0210696 A1 | 7/2016 | Quinton et al. |
| 2016/0225088 A1 | 8/2016 | Dennis et al. |
| 2016/0232463 A1 | 8/2016 | McDonough et al. |
| 2016/0232614 A1 | 8/2016 | Vorwerk et al. |
| 2016/0247222 A1 | 8/2016 | Kim |
| 2016/0253758 A1 | 9/2016 | Riggle |
| 2016/0292612 A1 | 10/2016 | Hegarty et al. |
| 2016/0314471 A1 | 10/2016 | Gerber et al. |
| 2016/0343077 A1 | 11/2016 | Bisikalo et al. |
| 2016/0364800 A1 | 12/2016 | Dennelly et al. |
| 2016/0379182 A1 | 12/2016 | Sheng et al. |
| 2017/0011462 A1 | 1/2017 | Anliker et al. |
| 2017/0124653 A1 | 5/2017 | Dunkin et al. |
| 2017/0200228 A1 | 7/2017 | Bryant et al. |
| 2018/0315143 A1 | 11/2018 | Rang |

\* cited by examiner

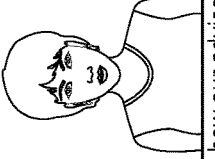
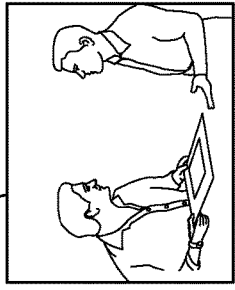

Professional planning to help you meet your goals

Your path to retirement is unique and you deserve a personalized approach to help you make the most of it.

Through professional investment advice and management, we'll create a plan that reflects your goals for today and tomorrow.

Get your personalized plan started

Retirement Managed Accounts[1]

PERSONALIZED
We tailor a custom strategy to your unique needs and goals

SIMPLIFIED
You don't have to be an investment professional to feel confident that you're on track to meet your goals

COMPREHENSIVE
We'll look at your full financial picture to ensure you have a complete plan

ONE-TO-ONE
You get ongoing access to investment adviser representatives

How do you create a personalized strategy

Watch our video to see how our advice and management services can help you.

According to research, people who use professional management service often experience more consistent returns[2] and almost 23% more income in retirement[3]-compared to those who don't.

You have access to this service which may be less than the cost you would otherwise pay outside you plan.

Get your personalized plan started | Enroll now

Home My Accounts Me & My Money▼ Guidance     👤 Samantha Lewis▼   Log out

Home / My Total Retirement    🖨 Print

ABC Company 401(k) Plan
Enroll in My Total Retirement

✅ You are now enrolled in my Total Retirement. Here are your initial investment allocations.

| Allocations | |
|---|---|
| Fund A Core Band | 13% |
| Fund B International Growth | 29% |
| Fund C Mid Cap Value | 16% |
| Fund D Small Cap Equity | 3% |
| Fund E Small Cap Growth | 1% |
| Fund F S&P 500 | 9% |
| Fund G Mid Cap Growth | 5% |
| Fund H Emerging Markets | 15% |
| Fund I International Value | 1% |
| Fund J US Equity | 8% |

Here's what you can expect next.

- Your investments have been changed to match the initial investment allocations listed above. Your initial investment allocations may change over time due to a variety of factors such as market movement.

- You will receive a Welcome Kit in the next few weeks.

- You will receive annual updates so you can see what we've been doing.

- We will continue to monitor your account making changes as needed, to keep you on track. You can call and investment Advisor Representative at any time at 1-888-411-4015 to review your strategy and personalize your retirement age, risk tolerance or add investment accounts.

- At any time, you can review your current investment strategy, update your portfolio or investment information, and view your retirement income projections online.

- You can cancel at any time, for any reason, without penalty.

[Home]              [Go to My Total Retirement]

FIG. 10

Home / My Total Retirement  🖶 Print

Do it for me
About my family

Are you married or do you have a partner?  [ Yes ▼ ]

Please provide your spouse/partner's information

Why do we need this information ⓘ

First name
[ Sean ]

Date of birth | Gender
[📅 2/2/1960 (57)] | [ Male ▼ ]

Annual salary
[ $ | 40,000 ]

Your spouse's/partner's retirement goals

Desired retirement age
[ 65 (2025) ▼ ]

Desired income replacement
[ % | $ | 100 ]

[ Back ]  [ Next ]

FIG. 14

Home / My Total Retirement

Do it for me
About my family

Do you have any dependents? 1600    Yes ▼

Please enter your dependents information
Why do we need this information ⓘ

| First name 1604 | Date of birth |
|---|---|
| Mia | 📅 7/7/2005 (Age 12) 1606  1606  ✕ Clear |
| Henry | 📅 7/7/2010 (Age 7) 1606 ✕ |
| | 📅 ✕ |
| | 📅 ✕ |
| | 📅 ✕ |

1604

1612 — Show more

1614 — Save

1616 — Back

FIG. 16

Home / My Total Retirement 🖨 Print

Do it for me

Assets

Do you have any other retirement assets? —1702

Examples include:
- Prior employer retirement accounts including 401(k), 401(a), 403(b), 457 plans
- IRA's
- Pensions
- Other taxable and tax-free savings
- Cash savings

[ None at this time ]  [ Add now ]  —1704

FIG. 17

Home / My Total Retirement　　　　　　　　　　　　　　　　🖨 Print

Do it for me
Add income in retirement

Who's income will this be?　　　| Samantha ▼ | — 1902

Name this income　　　　　　　| Hobby income | — 1904

Estimated annual amount　　　　| $ 12,000 | — 1906

Is this a pension?　　　　　　　| No ▼ | — 1908

Adjust for cost of living?　　　　| Yes ▼ | — 1910

Adjustment amount
　　　　　　| % 2 | — 1912

Will it be taxable?　　　　　　　| Yes ▼ | — 1914

Estimated date　　1916 —| At retirement ▼ |　| Until life expectancy ▼ | — 1918
　　　　　　　　　　　　　　　　　　1920 ⏎

1922 —| Cancel |　| Save |

FIG. 19

Home / My Total Retirement  🖨 Print

Do it for me
Income in retirement

Recommended estimated after-tax annual income: $19,005 of $27,904 goal!  — 1130  1132

— 1800

— 1802

Do you expect to have any other income in retirement?

— 2000

| OWNER and NAME | ESTIMATED ANNUAL AMOUNT | UPDATED |
|---|---|---|
| Samantha's hobby income | $12,000 | Today |

2002 — 2004 — 2006

[ Add income ] — 2008

[ Done ] — 2010

Home / My Total Retirement  🖶 Print

Do it for me
Retirement savings goals

Recommended estimated after-tax annual income: $19,005 of $27,904 goal!   1130  1132

Other than retirement, what else are you saving for?

| NAME & TYPE | AMOUNT | DATES | UPDATED |
|---|---|---|---|
| Mia's Wedding | $30,000 | 2028 | Today |

2202 — 2204 — 2206 — 2208

[ Add a goal ] 2210
[ Done ] 2212

Home / My Total Retirement                              🖨 Print

Do it for me
Investments

✓ Your investments are optimized. We will continue to monitor and adjust your investment to meet your unique retirement goals.

My investments                                          2302

View by: ⦿ Portfolio  ○ Account details

MODERATELY INVESTED                  2304
ABC Company 401(k) Plan

| ASSET CLASS | BALANCE |
|---|---|
| ▨ Equities | $121,311 |
| ▨ Bonds | $18,127 |
| Total: | $139,438 |

2306 (pie chart)
2308

| Equities/Bonds | Asset Class | Funds |
|---|---|---|

2310        2312

1130     1132
Recommended estimated after-tax annual income: $19,005 of $27,904 goal!

2314
How your advised accounts will change over time

Conservative          2316
Moderate
                                                More stability
Aggressive         O 2018 2020 2022 2024 2026 2028 2030 2032 2034 2036 2038 2040 2042 2044 2046 2048 2050 2052 2054 2056

Key: O My current investments  — My Recommended path
                                                   2318
                                    Investment Constraint options

[ Back ]

FIG. 23

Home / My Total Retirement 🖨 Print

Do it for me
Investments

✓ Your investments are optimized. We will continue to monitor and adjust your investment to meet your unique retirement goals.

My investments                View by: ⊙ Portfolio ○ Account details

MODERATELY INVESTED
ABC Company 401(k) Plan

| ASSET CLASS | BALANCE |
|---|---|
| ☐ US Large Cap Equity | $46,015 |
| ▨ US Small/Mid Cap Equity | $26,493 |
| ◨ International Equity | $20,916 |
| ▧ Cash Alternatives | $13,944 |
| ▦ Bonds | $32,071 |
| | Total: $139,438 |

Tabs: Equities / Bonds | Asset Class | Funds

Recommended estimated after-tax annual income: $19,005 of $27,904 goal!

How your advised accounts will change over time

Conservative
Moderate
Aggressive                                    More stability

2018–2056

Key: ○ My current investments   — My Recommended path

Investment Constraint options

[ Back ]

Home / My Total Retirement 🖶 Print

Do it for me
Review your change(s) — 3900

You've requested an increase in your Before tax contribution rate from 1% to 3% and an increase in your Roth contribution rate from 1% to 2%. — 3902

Before tax contribution rate: 3%, effective 2/21/2018

Roth contribution rate: 2%, effective 2/21/2018

Affected plan(s): ABC Company 401(k) Plan

— 3904

Salary deferral changes will be forwarded to your employer for processing. The actual salary deferral effective date is dependent upon your employer's payroll out-off date.

By clicking "Submit your change(s)," you authorize the payroll deductions as indicated above.

[ Cancel ] — 3908        [ Submit your change(s) ] — 3906

Home   Me & My Money   Guidance                         👤 James Smith  Log out

Home / Online Advice / Investing

Help me do it

Investing

Based on the information you've provided and your retirement income goal, we suggest you consider the recommended investment below.

ABC Company 401(k) Plan    4310                                        4312

| MODERATE CONSERVATIVE<br>My current investments | MODERATE<br>Recommended investments |
|---|---|
| Fund                Allocation<br>☐ XYZ Index 2020         100% | 4314                              4316<br>Fund                          Allocation<br>☐ Investment Co Europacific        16%<br>☐ Investment Comp Growth          1%<br>☐ Investment Comp A              11%<br>☐ Investment Comp B              12%<br>☐ Investment Comp C              10%<br>☐ Investment Comp D              21%<br>☐ Investment Comp E               7%<br>☐ Investment Comp F               5%<br>☐ Investment Comp G               1%<br>☐ Investment Comp H               7% |
| Keep my current investments | Continue with this recommendation |

Back

James Smith  Log out
Home   Me & My Money   Guidance

Home / Online Advice / Review you change

Help me do it
Review your change(s)
Implement our savings and investment advice by changing the following:

ABC Company 401(k) Plan　　　　　　　　　　　4410

CONTRIBUTION RATE: 10% Roth

The actual salary deferral effective date is dependent upon your employer's payroll cut-off date.

4412

Current and future investments

| From: | | To: | |
|---|---|---|---|
| Fund | Allocation | Fund | Allocation |
| XYZ Index 2020 | 100% | Investment Co Europacific | 16% |
| | | Investment Comp Growth | 1% |
| | | Investment Comp A | 11% |
| | | Investment Comp B | 12% |
| | | Investment Comp C | 10% |
| | | Investment Comp D | 21% |
| | | Investment Comp E | 7% |
| | | Investment Comp F | 5% |
| | | Investment Comp G | 1% |
| | | Investment Comp H | 7% |

[ Back ]　　　　　　　　　　　　　　[ Submit your change(s) ]

Home  Me & My Money  Guidance        James Smith  Log out

Home / My Total Retirement™ / My profile / Assets

Do it for me
Add a retirement asset

| Account owner | JAMES M |
| --- | --- |
| Account type | 401(K) |
| Account provider | Abc |
| | AbcCo Retirement<br>Franklin Abc Group |
| Currently contributing? | ○ Include and employer match ⓘ<br>○ Include profit sharing ⓘ |
| How is this account invested? | The same way as my primary account |
| Account balance | $ |

Cancel                                                    Save

| How is this account invested? | Enter asset allocation ▼ |

| | |
|---|---|
| US Large Cap Equity | ☐ % |
| US Small/Mid Cap Equity | ☐ % |
| International Equity | ☐ % |
| Bonds | ☐ % |
| Treasury Inflation-Protected Securities | ☐ % |
| Cash Alternatives | ☐ % |
| Total | 0 % |

| How is this account invested? | Enter fund holdings ▼ |

*Search for the name or ticker symbol of the fund you are investing in*   [ Add ]

Total   $ 0.00

@ James Smith  Log out

Home  My Accounts  Me & My Money  Guidance

Home / My Total Retirement™ / My Profile / Savings goals

Do it for me

Savings goals

Are you planning to use your retirement assets to pay for other expenditures?

Examples include:
- Planning a family vacation
- Paying for a wedding
- Contributing towards college expenses
- Leaving an inheritance

[ Nothing at this time ]   [ Add ]

Home  Me & My Money  Guidance                    James Smith  Log out

Add a retirement asset

| Who owns the account? | JAMES M ▼ |
| Account type | 401(k) ▼ |
| Account provider | Investment Co A ▼ |
| Account balance | $ 30,000 |

Are you currently contributing? | Pre-tax contribution ▼

PRE-TAX CONTRIBUTION AMOUNT

| % | $ | 5 |

○ Include and employer match ?
○ Include profit sharing ?

How is this account invested? | The same way as my primary account ▼

Cancel    Save

FIG. 56

INTEGRATED GRAPHICAL USER INTERFACE FOR SEPARATE SERVICE LEVELS OF A FINANCIAL PLANNING SYSTEM

CROSS REFERENCE TO RELATED APPLICATIONS

This application claims priority to U.S. Provisional Patent Application No. 62/674,407, filed May 21, 2018, and entitled "PLANNING ENGINE FOR DYNAMIC ACCOUNT OPTIMIZATION", which is hereby incorporated by reference in its entirety.

BACKGROUND

The disclosure relates generally to account management, and more specifically to, a user interface for manipulating account projections based on financial data captured and aggregated from multiple sources.

Increasingly, individuals are responsible for managing their own personal retirement accounts, which may be supplemented by employer contributions. Individual accountholders may be ill-equipped to optimize retirement accounts, as the lengthy term of the account increases sensitivity to asset allocation, contribution strategies, withdraw strategies, and changes in supplemental retirement benefits. For example, market conditions and/or a projected retirement date may require specific adjustments to the asset allocation of the account. Additionally, contribution and withdrawal policies may change. For example, taxes may be adjusted or assessed differently from year to year. As a result, many participants in financial plans, such as employer-provided 401(k) plans, would benefit from enrollment in a financial planning system that provides enhanced service, such as improved recommendations and visualization tools. However, at least some known financial planning systems, in attempting to provide a more sophisticated set of tools for the user, present a dramatically different and/or more complex user interface as compared to the basic 401(k) plan management interface to which many users are accustomed. As a result, many ordinary participants may be dissuaded from enrolling in, or continuing to stay enrolled in, such enhanced services.

Moreover, at least some known conventional on-line financial planning systems generate a large number of recommendations that overwhelm the ordinary user, and/or recommendations that are too complex for the ordinary user to grasp, and/or recommendations that result in changes that appear extreme to the ordinary user. As a result, financial planning participants using such known systems may be unable or unwilling to take steps to improve their income in retirement.

BRIEF DESCRIPTION

In one aspect, a graphical user interface (GUI) for a financial planning system is provided. The financial planning system includes at least one planning engine in communication with a database, the database storing user profiles for (i) a first plurality of users each registered for a first level of services with respect to a financial account of the respective user, and (ii) a second plurality of users each registered for a second level of services with respect to the financial account of the respective user. The GUI includes an introductory page programmed to display, to the first and second plurality of users, a top level menu and a first comparison of a first estimated retirement income amount to a user goal of the respective user. The top level menu appears in a substantially identical top-level-menu format and a substantially identical top-level-menu location to the first and second plurality of users, and the first comparison appears in a substantially identical first-comparison format and a substantially identical first-comparison location to the first and second plurality of users. The introductory page also is programmed to display, to the first plurality of users and not to the second plurality of users, an enrollment link operable to enable the first plurality of users to register for the second level of services. The introductory page further is programmed to display, to the second plurality of users and not to the first plurality of users, a dashboard link operable to open a dashboard page of the GUI, the dashboard page providing access to the second level of services.

In another aspect, a computer-implemented method for implementing a graphical user interface (GUI) for a financial planning system is provided. The financial planning system includes at least one planning engine in communication with a database, the database storing user profiles for (i) a first plurality of users each registered for a first level of services with respect to a financial account of the respective user, and (ii) a second plurality of users each registered for a second level of services with respect to the financial account of the respective user. The method includes displaying, by the GUI to the first and second plurality of users, a top level menu and a first comparison of a first estimated retirement income amount to a user goal of the respective user. The top level menu appears in a substantially identical top-level-menu format and a substantially identical top-level-menu location to the first and second plurality of users, and the first comparison appears in a substantially identical first-comparison format and a substantially identical first-comparison location to the first and second plurality of users. The method also includes displaying, by the GUI on the introductory page to the first plurality of users and not to the second plurality of users, an enrollment link operable to enable the first plurality of users to register for the second level of services. The method further includes displaying, by the GUI on the introductory page to the second plurality of users and not to the first plurality of users, a dashboard link operable to open a dashboard page of the GUI, the dashboard page providing access to the second level of services.

In another aspect, at least one non-transitory computer-readable storage media that includes computer-executable instructions for implementing a graphical user interface (GUI) for a financial planning system is provided. The financial planning system includes at least one planning engine in communication with a database, the database storing user profiles for (i) a first plurality of users each registered for a first level of services with respect to a financial account of the respective user, and (ii) a second plurality of users each registered for a second level of services with respect to the financial account of the respective user. The GUI is generated by at least one processor, and when executed by the at least one processor, the computer-executable instructions cause the at least one processor to display, to the first and second plurality of users on an introductory page, a top level menu and a first comparison of a first estimated retirement income amount to a user goal of the respective user. The top level menu appears in a substantially identical top-level-menu format and a substantially identical top-level-menu location to the first and second plurality of users, and the first comparison appears in a substantially identical first-comparison format and a substantially identical first-comparison location to the first and second plurality of users. The computer-executable instructions also cause the at least one processor to display, on the introductory page to the first plurality of users and not to the second plurality of users, an enrollment link operable to enable the first plurality of users to register for the second level of services. The computer-executable instructions further cause the at least one processor to display, on the introductory page to the second plurality of users and not to the first plurality of users, a dashboard link operable to open a dashboard page of the GUI, the dashboard page providing access to the second level of services.

BRIEF DESCRIPTION OF THE DRAWINGS

FIG. 1 is a simplified block diagram of an example financial planning (FP) system.

FIG. 8B depicts an exemplary informational sub-page of GUI which provides a user with more information about the financial advisory system driven by planning engine.

FIG. 10 depicts enrollment confirmation page of GUI.

FIG. 14 depicts the exemplary spouse status page with a spouse detail region.

FIG. 16 depicts the dependent status page with a dependent detail region.

FIG. 17 depicts an exemplary asset status page.

FIG. 19 depicts an exemplary supplemental income detail page.

FIG. 20 depicts an exemplary supplemental income summary region as a part of the supplemental income page.

FIG. 22 illustrates savings goals summary page of GUI, which is configured to display a summary of savings goals input by user in response to selection of save button.

FIG. 23 depicts investments page of GUI, which may be opened using investments link (shown in FIG. 11) and displays graphical and numeric descriptions of the composition of the user's financial account.

FIG. 24 depicts an exemplary asset class composition within the investments page.

FIG. 29 depicts an exemplary update to investments page of GUI (shown in FIGS. 23-25) in response to selection of one or more strategy selection options.

FIG. 39 depicts an exemplary contribution review page of GUI, which displays a summary of changes made to a user's contribution preferences via pages and receives user input confirming the changes from a submit changes button.

FIG. 43 depicts an exemplary investment advice page that may be provide as a part of the online advice services to the user.

FIG. 44 depicts an exemplary change review page. If the user chooses to continue with the recommended allocations, the opportunity rules engine displays the change review page to the user.

FIG. 50 depicts an exemplary retirement asset page that allows the user to add a retirement asset to their portfolio.

FIGS. 53A and 53B depict exemplary account configuration pages that allows the user to configure accounts.

FIG. 55 is an exemplary savings goals page that allows the user to add savings goals.

FIG. 56 is an exemplary add retirement asset page that allows the user to add a retirement asset.

FIG. 57 is an exemplary opportunities page that allows the user to view and step through opportunities, as discussed above.

DETAILED DESCRIPTION

Figure 1:
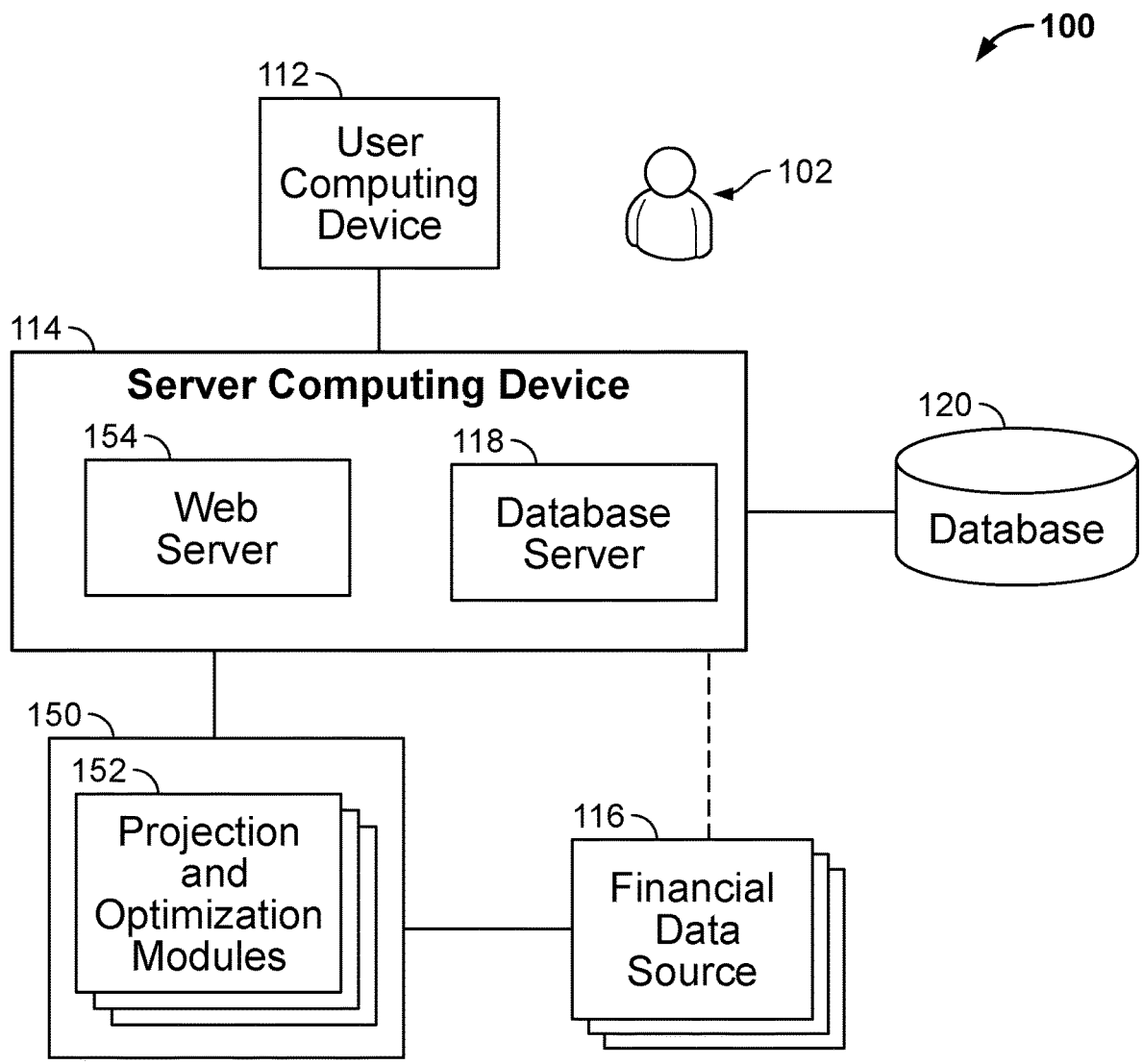
FIGS. 1-57 show example embodiments of the methods and systems described herein.

The following detailed description illustrates embodiments of the disclosure by way of example and not by way of limitation. The description enables one skilled in the art to make and use the disclosure. It also describes several embodiments, adaptations, variations, alternatives, and uses of the disclosure, including what is presently believed to be the best mode of carrying out the disclosure.

The systems and methods of the disclosure facilitate generating account projections based on financial data captured and aggregated from multiple sources, and alerting accountholders in response to changes in the account projection.

A GUI computer system for providing a graphical user interface (GUI) is provided. The GUI computer system is in communication with at least one planning engine. The planning engine includes multiple optimization modules for planning significant personal economic events (e.g., investment, savings, retirement). The GUI computer system is configured to capture and centrally store user profile data, including the financial data used by the optimization modules, such as the composition of investment accounts (e.g., employer-provided 401(k) plans). The planning engine is configured to retrieve additional financial data from multiple external data sources, such as asset return projections. Additionally, the GUI computer system may be configured to provide a web interface to capture financial data from the user. For example, the GUI computer system may provide a HTTP API or an interactive web application through which the user can enter data. Additionally, the GUI computer system may be configured to cause the GUI to be displayed by an application installed on a mobile device of a user.

The planning engine is configured to generate account projections in response to captured financial data. In some embodiments, the planning engine generates account projections (e.g., in near-real-time) based on updated financial data retrieved from the external data sources (e.g., third-party banking institutions, investment institutions) and/or from the user interface. For example, a deferral optimization module generates an updated account projection based on changes in employer contribution formulas, maximum contribution formulas, effective tax rates, current contribution rates, account allocation, project return data, and the like.

In certain embodiments, the GUI computer system provides basic or introductory-level services for an existing retirement account. For example, the retirement account is associated with a 401(k) or similar plan provided by an employer, and the GUI computer system provides a default user interface to employees to allow each employee to monitor performance and/or update basic data regarding the account. In addition, the GUI computer system provides an option to register for enhanced services, such as a financial advisor program that integrates other accounts and benefits of the user into a unified retirement income analysis and planning system. For users who register for the enhanced services, the GUI computer system maintains and builds upon the graphical GUI associated with the introductory-level services, adding additional functionality and features in order to provide a familiar and streamlined user experience to users who register, thus reducing barriers to user enrollment for the enhanced service level. In some such embodiments, the planning engine includes a first planning engine configured to receive calls from the GUI and provide financial projections for the basic or default service level, and a second planning engine configured to receive calls from the GUI and provide financial projections and recommendations for the enhanced service level. Alternatively, a single planning engine interfaces with the GUI for both service levels.

In some embodiments, the GUI computer system is configured to generate alerts based on the updated account projection. In some embodiments, where the GUI computer system is configured to compare account projections with stored financial goals, the GUI computer system may be configured to alert accountholders when an account projection does not satisfy a stored financial goal. Additionally, the GUI computer system may be configured to call the planning engine to generate an updated account configuration (e.g., contribution amount, asset allocation) in response to the updated account projection.

As such, the GUI computer system allows the user to receive benefits in managing a retirement plan by, for example, projecting investment account balances, estimating investment income, evaluating the effect of planned contributions, evaluating the effect of benefit plans, adjusting account asset compositions, projecting required replacement income, and determining a withdrawal schedule. Collection, analysis, and targeted presentation of such user and market data allows the user to better determine whether they are on target to meet their retirement goals or manage their wealth during retirement.

FIG. 1 is a simplified block diagram of an example financial planning (FP) system 100 used for generating account projections based on financial data captured from multiple sources, and alerting accountholders in response to changes in the account projection. In an example embodiment, FP system 100 includes GUI computer system 114, for example implemented on a server computing device, configured to interface with at least one planning engine 150. Planning engine 150 includes projection and optimization modules 152, which are configured to perform various analytical tasks with regard to analyzing a retirement portfolio of a user 102. The optimization modules are described in greater detail below with respect to FIG. 2.

In the example embodiment, FP system 100 also includes at least one user computing device 112. In some embodiments, user computing device 112 includes computing devices configured to implement a web browser or a software application, which enables user computing device 112 to communicate with server GUI computer system 114 (e.g., using the Internet.) User computing device 112 and GUI computer system 114 may be communicatively coupled through various networks or network interfaces including, but not limited to, at least one of a network, such as the Internet, a local area network (LAN), a wide area network (WAN), an integrated services digital network (ISDN), a dial-up-connection, a digital subscriber line (DSL), a cellular phone connection, and a cable modem. Alternatively, user computing device 112/or and GUI computer system 114 include any device capable of accessing the Internet such as, for example, a desktop computer, a laptop computer, a personal digital assistant (PDA), a cellular phone, a smartphone, a tablet, a phablet, or other web-based connectable equipment. User computing device 112 may be computing devices associated with at least one user 102, and may be communicatively coupled to GUI computer system 114.

In one embodiment, GUI computer system 114 includes a database server 118 that is communicatively coupled to a database 120. Database 120 stores user profile data associated with a plurality of users 102, account data associated with users 102, financial projections generated by the optimization modules, and other data that may be required for planning engine 150 to function as described herein. GUI computer system 114 is configured to centrally store account data, asset data, user profile data, and asset class data in database 120. GUI computer system 114 uses database server 118 to interface with database 120.

According to the example embodiment, database 120 is disposed remotely from GUI computer system 114. In other embodiments, database 120 is centralized, and may be a part of GUI computer system 114. In the example embodiment, an administrator or a financial planner (not shown) associated with FP system 100 or user 102 is able to access database 120 through a user computing device, such as user computing device 112, by logging onto GUI computer system 114. In the example embodiment, GUI computer system 114 may be associated with a financial services provider or financial account recordkeeper (not shown).

GUI computer system 114 is configured to capture and centrally store financial data associated with a financial portfolio of the user 102. In some embodiments, GUI computer system 114 provides an interactive web application to user computing device 112, through which the user 102 can enter data or otherwise interact with GUI computer system 114. Additionally, GUI computer system 114 may provide an API (e.g., a HTTP API), through which financial data may be received from one or more financial data sources 116. Financial data received from financial data sources 116 may include, for example, interest rates, projected growth rates for various funds or asset classes, the compositions of funds managed by third parties, and/or employer contribution data. GUI computer system 114 may use database server 118 to store received financial data in database 120. For example, database server 118 may parse financial data received from user computing device 112, planning engine 150, and/or financial data sources 116 before storing the financial data in database 120.

In the example embodiment, web server 154 generates and transmits web pages to user computing device 112 to implement the GUI. The generated web pages may be configured to capture data from user 102, and transmit it back to server computing device 114. For example, user 102 may fill form fields on a webpage. Additionally, web server 154 may generate visualizations and/or representations of data (e.g., account balance projections) for display on user computing device 112 (e.g. on a retirement planning dashboard).

Figure 2:
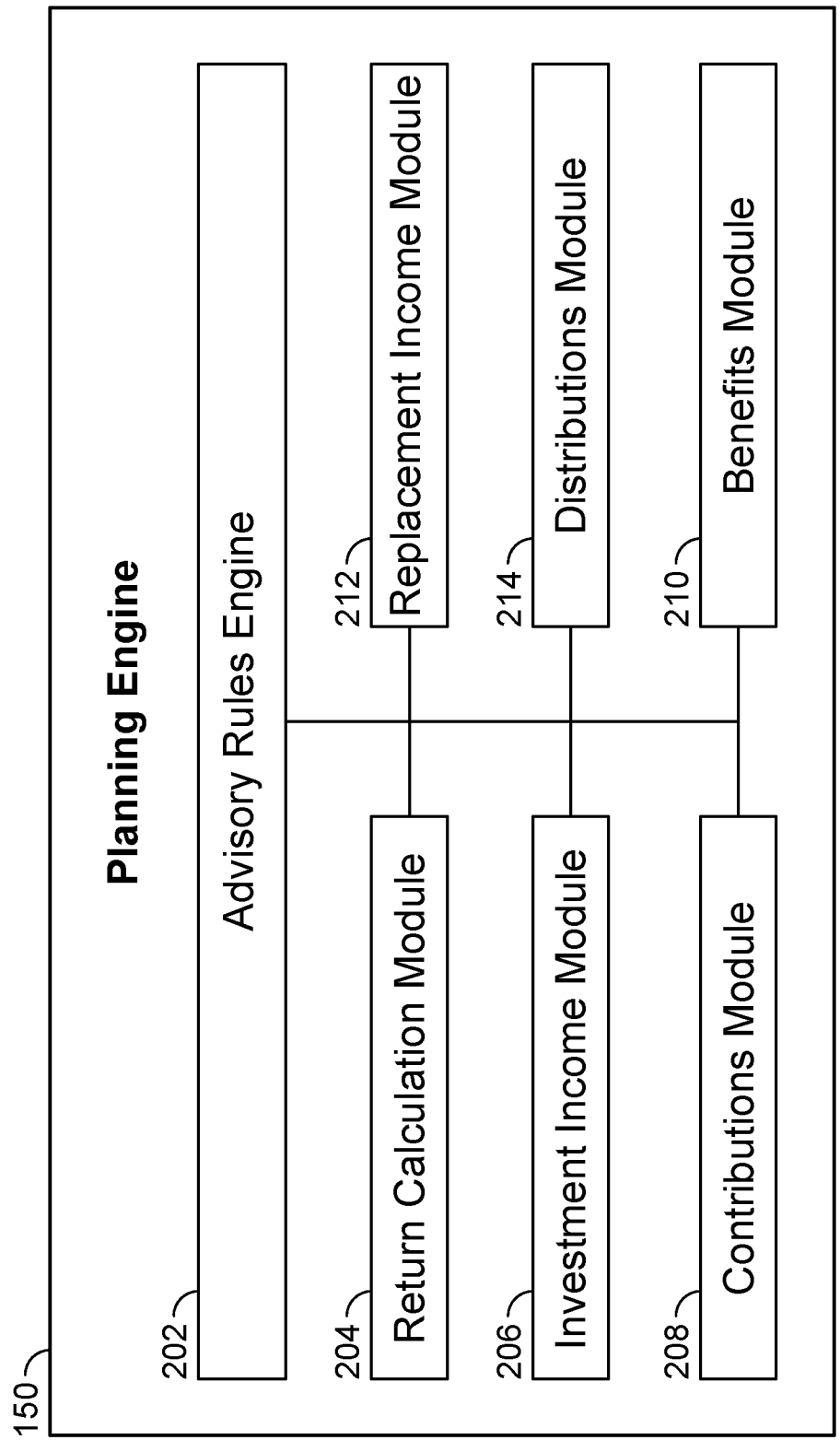
FIG. 2 is a component diagram illustrating components of the financial planning system shown in FIG. 1A.

FIG. 2 is a component diagram illustrating components of the at least one planning engine 150 shown in FIG. 1. In the example embodiment, planning engine 150 generates an extended term financial projection based on user profile data (e.g., financial goals, age, projected retirement date) and account data (e.g., asset data, contribution data, benefit data, income data) to help user 102 plan for retirement. Planning engine 150 includes advisory rules engine 202, return calculation module 204, investment income module 206, contributions module 208, benefits module 210, replacement income module 212, and distributions module 214. Modules 204, 206, 208, 210, 212, and 214 may be examples of projection and optimization modules 152 (shown in FIG. 1A).

Advisory rules engine 202 is configured to execute and schedule optimization modules based on user profile data and account data retrieved from GUI computer system 114. Advisory rules engine 202 manages operation of: (i) return calculation module 204 (e.g. to project account balances over time based on asset data), (ii) contributions module 208 (e.g. to adjust account balances generated by return calculation module 204 based on planned asset contribution data), (iii) benefits module 210 (e.g. to project the value of benefit plans), (iv) investment income module 206 (e.g. to project investment income based on account balances generated by return calculation module 204), (v) replacement income module 212 (e.g. to determine a replacement income amount based on user profile data), and (vi) distributions module 214 (e.g. to generate distribution schedules based on the investment income data generated by investment income module 206).

Return calculation module 204 is configured to receive account data including asset identifiers from GUI computer system 114, to calculate an expected return and standard deviation for each asset, and to derive an overall expected return and account standard deviation using the results for each of the assets. For example, an account may include assets of multiple types, such as securities, electronically traded funds, managed funds, bonds, and the like. Return calculation modules 204 applies any suitable algorithm to calculate the expected return and standard deviation for each type of asset.

In some embodiments, for each asset identifier, return calculation module 204 is configured to determine if the asset is managed or non-managed. In response to each asset identifier determined to be non-managed, return calculation module 204 determines the composition of the asset. In the example embodiment, return calculation module 204 determines asset class composition percentages. For example, return calculation module 204 may determine an asset is composed of 40% technology stock, and 60% municipal bonds. Return calculation module 204 retrieves expected return, standard deviation, and covariance data for each asset class. For example, technology stocks may have an expected return of 10% with a standard deviation of 0.4.

In response to each asset identifier determined to be managed, a glidepath module may be called. Alternatively, return calculation module 204 calculates expected returns in any suitable fashion. For example, return calculation module 204 generates projected account balance data based on expected return, standard deviation, and covariance data retrieved for each asset. More specifically, return calculation module 204 generates an account expected return based on aggregating the expected return of each asset. Additionally, return calculation module 204 generates an account standard deviation based on aggregating the retrieved standard deviation data for each asset.

Return calculation module 204 outputs a matrix of account expected returns, including the account expected return, and account expected returns modified by the aggregated standard deviation data. For example, account balances at multiples of the standard deviation may be output. In some embodiments, return calculation module 204 is configured to return the expected return matrix to GUI computer system 114, to be stored in database 120 using the account identifier.

Additionally, return calculation module 204 is configured to generate a projected account balance using the expected return matrix. Return calculation module 204 receives a baseline account balance, such as a previous year account balance or current account balance. The previous year account balance may be zero. Return calculation module 204 iteratively applies the expected return matrix to the baseline account balance to generate an account balance projection. In the example embodiment, return calculation module 204 determines projected annual balances. For example, annual account balances may be projected for a term of 50 years. In some embodiments, the account balance projection term may be received from GUI computer system 114, where database 120 stores a financial goal (e.g., retirement date, savings goal). For example, return calculation module 204 may project annual account balances until a projected retirement date based on the expected return matrix.

In the example embodiment, investment income module 206 determines a spending rate based on projected account balances generated by return calculation module 204. The spending rate may define monthly investment income during retirement. For example, investment income module 206 may determine an account valued at $130,000 will generate $3,200 in estimated monthly retirement income. Investment income module 206 searches through spending rates to find a desired spending rate. In other words, investment income module 206 may calculate the effect of various spending rates, and select a spending rate such that the account balance is not exhausted during a time period such as a period of retirement or disability. Additionally, investment income module 206 may generate adjusted spending rates using the expected return matrix (e.g., standard deviation data) generated by return calculation module 204. Investment income module 206 may generate multiple spending rates associated with above and below average performance, as defined by the standard deviation data.

In some embodiments, investment income module 206 determines a projected life expectancy of user 102. For example, investment income module 206 may determine an expected retirement term. In combination with user profile data (e.g., demographic data, retirement data), investment income module 206 may project the number of years in which retirement investment income may be needed. In some examples, investment income module 206 may utilize mortality weighting to estimate life expectancy of user 102. In other examples, investment income module 206 may estimate life expectancies based on demographic data such as health states, age, and sex of users. As another example, investment income module 206 may determine an expected disability term (e.g. a number of years where investment income is needed to offset disability support expenses).

Contributions module 208 is configured to adjust account balances generated by return calculation module 204 based on planned asset contribution data. For example, a portion of salary income of user 102 may be contributed to the account until retirement (e.g. on a monthly basis), which may also be supplemented by an employer (e.g. as a percentage matching contribution up to a predetermined limit). As another example, a specific dollar amount may be contributed on an annual basis (e.g. by user 102 or by user 102's employer).

For salary contributions, contributions module 208 adjusts the projected account balances generated by return calculation module 204. More specifically, each annual account balance projection is increased by the corresponding projected salary contribution. Further, subsequent years salary contributions may be adjusted based on projected salary growth. For example, contributions module 208 may identify an initial account balance of $100,000 and an initial salary of $50,000, and may determine that a 5% contribution in the first year results in a year-end account balance of $102,500. In the subsequent year, contributions module 208 projects may project that the salary of user 102 will grow to $55,000, and, as such, the subsequent year's contribution will be $2,750.

To project salary growth, contributions module 208 receives salary and employment data (e.g., job title, profession, career field, employer identifier) from GUI computer system 114 and estimates a salary growth rate based on the employment data. For example, contributions module 208 may determine a salary growth rate of 5% for an accountant, and a salary growth rate of 4% for an engineer.

Contributions module 208 may further calculate an employer contribution. Certain employers may match employee contributions or may provide a predetermined amount, such as a fixed amount or a fixed percentage of user 102's salary. Contributions may be matched at varying rates, and may be limited by the employer. Contributions module 208 may receive employer contribution data (e.g. a match rate and a match limit) and adjust salary contributions based on the employer contribution data. Salary contributions may be adjusted by both projected salary growth and employer matching. For example, an employer may match 50% of an employee's contributions, up to a limit of $10,000 or 10% of the employee's salary, whichever is lower. For a salary of $50,000, and an employee contribution rate of 5%, the employer may match $1,250. As another example, with a salary of $200,000 and an employee contribution of 10%, the employer may match $10,000. As such, the employer may represent an example financial data source 116.

Additionally, contributions module 208 is configured to determine the post-tax amount of contributions, where applicable. Contributions module 208 may identify an effective tax rate (e.g. based on the salary data) and project a net contribution. For example, $2,500 may be contributed to a taxable account. Contributions module 208 determines the effective tax rate for the user is 15%, and adjusts the account balance by $2,125.

Contributions module 208 is further configured to compare calculated contributions to account-specific limits. Certain accounts may have pre-tax or post-tax contribution restrictions. For example, post-tax retirement accounts may be limited to $18,000 of contributions per year. GUI computer system 114 determines when contributions are projected to exceed the limit, and may cap the contribution amount based on the limit. In some embodiments, GUI computer system 114 alerts user 102, via GUI 301, that a contribution limit has been or will be reached. In other embodiments, GUI computer system 114 reallocates the contributions between restricted accounts (e.g., post-tax retirement account) and other accounts (e.g., health savings account, taxed account).

Contributions module 208 may also adjust projected account balances based on dollar amount contributions. For example, user 102 may contribute exactly $5,000 annually (e.g. in lieu of or in addition to any salary-based contributions). Contributions module 208 may account for direct contributions in addition to projected salary contributions.

Benefits module 210 is configured to consider the value of various benefit plans (e.g., social security payments, pension plans, insurance plans) based on information received from GUI computer system 114. For example, investment income and social security income may be available to user 102 during retirement. Further, user 102 may have specialized pension plans (e.g., defined benefit plans, defined contribution plans) or annuities.

GUI computer system 114 is configured to project social security income. In the example embodiment, social security income is projected by retrieving a social security benefit model from database 120, and user profile data (e.g., salary data, retirement data) from database 120. In some embodiments, GUI computer system 114 may adjust social security based on spousal social security income. More specifically, GUI computer system 114 may retrieve the user profile of a spouse, and determine if social security income should be projected based on a spousal benefit, or the combination of individual earnings-based benefits. In other words, benefits module 210 may receive a spouse profile (e.g., salary data, citizenship data, and retirement data) and determine if the 50% spousal benefit should be claimed instead of the earnings-based spousal benefit.

Benefits module 210 is further configured to project the income generated by pension plans, defined benefit plans, defined contribution plans, insurance policies, and annuities. In some embodiments, benefits module 210 receives user-input benefit data, such as start years, end years, and amounts. Additionally, benefits module 210 may retrieve income data associated with a user-input benefit from one of financial data sources 116. For example, benefits module 210 may query the provider of an employer pension plan to determine a projected pension income. Similarly, benefits module 210 may project the cash flow of insurance policies and annuities. In certain embodiments, benefits module 210 may be further configured to adjust benefit income based on projected inflation. More specifically, benefits module 210 may apply an inflation rate to a benefit value.

Replacement income module 212 is configured to receive a replacement income amount based on user profile data (e.g., income data, income projection data). Replacement income module 212 is configured to estimate expenses in retirement, also known as retirement need. In the example embodiment, retirement need is calculated as a percentage of the projected salary at the time of retirement. In some embodiments, retirement need growth is projected based on inflation. For example, after the initial retirement need is calculated, the amount may grow by a projected inflation rate for each year of retirement. In other embodiments, retirement need growth is projected based on an age-dependent growth factor determined by replacement income module 212. For example, expenses may grow more rapidly based on age due to healthcare costs.

In certain embodiments, replacement income module 212 may adjust retirement need based on the life expectancy of the user, and a spouse of the user. The retirement need may decrease after the life expectancy of one household member. For example, the retirement need in years after the life expectancy of a household member may be decreased by a retirement need discount factor. More specifically, replacement income module 212 may retrieve age and life expectancy data from GUI computer system 114, and determine the number of years with a reduced household.

Users may have multiple accounts (e.g., Taxable Accounts, Post-Tax Accounts, Pre-Tax Accounts), and withdrawals from these accounts may have specific tax implications. Distributions module 214 is configured to determine when there is a net income need, and make distributions from specific accounts based on tax and/or penalty factors. Distributions module 214 calculates net income need by subtracting retirement need from the combination of investment income and benefits (e.g., social security).

Distributions module 214 is configured to determine an account ordering. For each account, distributions module 214 is configured to determine if a withdrawal penalty applies (e.g., an early withdrawal penalty) and/or a tax penalty. In some embodiments, distributions module 214 may evaluate specialized accounts, such as health savings accounts. Accounts without an early withdrawal and/or tax penalty may be ordered before other accounts. For example, an account comprised of post-tax contributions may be ordered before an account where taxes are calculated on distributions. For accounts of comparable tax/penalty status, older accounts may be ranked before younger accounts.

Distributions are calculated in response to net income need from accounts, starting from the account with the lowest tax/penalty ranking, until the net income need is met. For example, given a net income need of $500 after considering social security, the $500 may be withdrawn from a post-tax account that does not have an early withdrawal penalty.

In some embodiments, user profile data may include information about the user such as, for example, birth date, gender, salary, state of residence, current employee savings rate, plan match, profit sharing, retirement age, pension information, social security information (e.g., estimated social security amount, start age), balance information and current fund holdings, and loan information.

Figure 3:
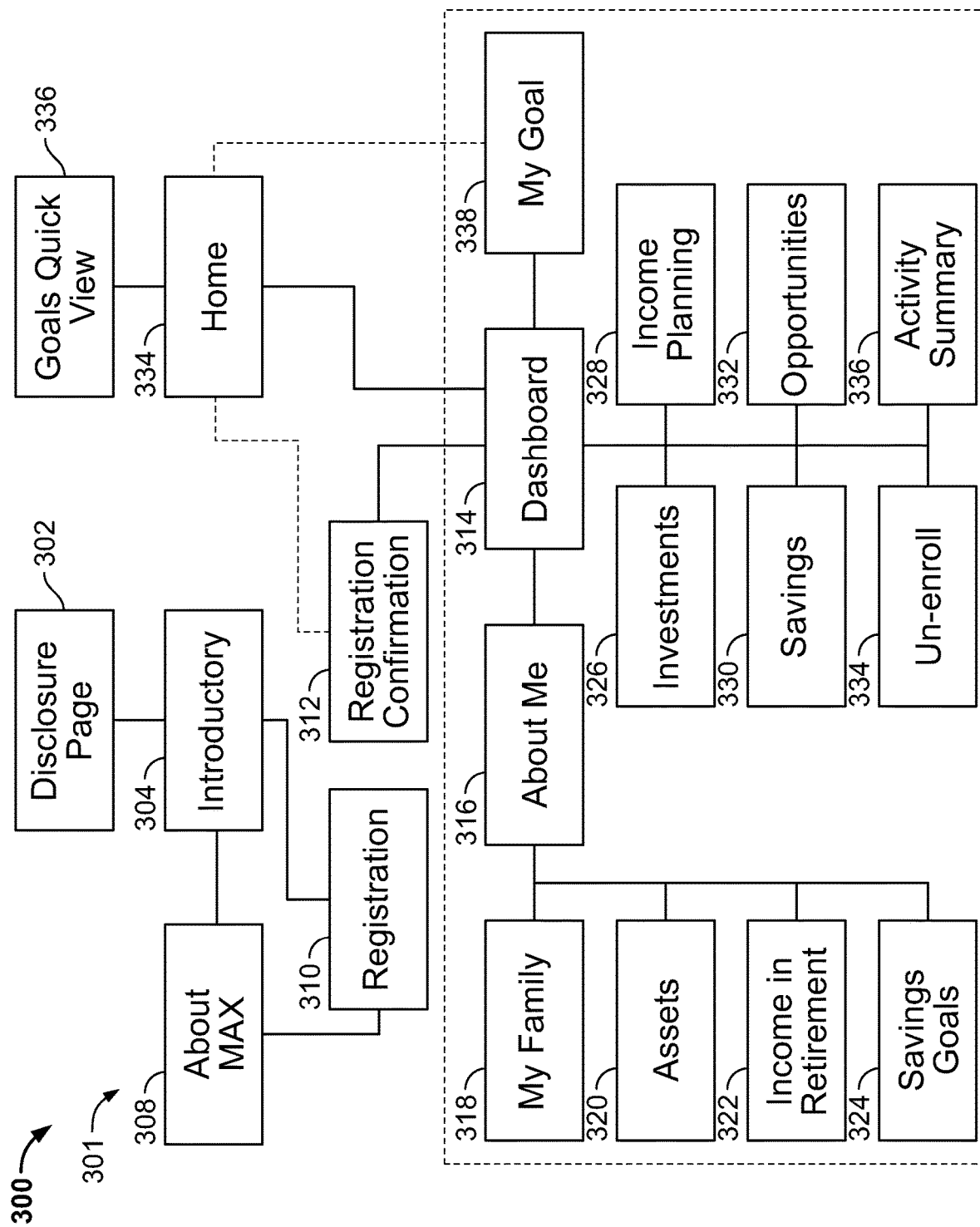
FIG. 3 illustrates an exemplary interface outline for a graphical user interface (GUI).

FIG. 3 illustrates an exemplary interface outline 300 for a graphical user interface (GUI) 301 implemented by GUI computer system 114 for the financial planning system driven by the at least one planning engine 150. GUI 301, such as a web interface, is configured to interface with planning engine 150 to receive and present financial data to a user. In some embodiments, each planning engine 150 provides an API, through which GUI 301 may send profile data retrieved from database 120 for a user and receive financial data and projections from the respective planning engine 150. In the exemplary embodiment, GUI computer system 114 is configured to generate GUI 301, as a series of a webpages, wherein the webpages contain instructions to capture financial data, store the financial data in database 120, and transmit financial data as needed to planning engine 150. A brief description of each page will be provided with respect to FIG. 3, and additional detail about certain pages will be described with respect to later figures.

In the exemplary embodiment, for at least some of the data entry/edit fields of GUI 301 discussed herein, GUI computer system 114 is configured to validate the information entered by a user. For example, the data entry/edit fields are configured to check user entries against minimum/maximum amounts or unaccepted characters. If information entered in the fields fails validation, GUI 301 is configured to display a red visual text to notify the user that the information entered has failed validation, and thus the information must be corrected in order to enable GUI computer system 114 to store the information.

In the exemplary embodiment, GUI computer system 114 receives a request from a user computer device, such as user computing device 112. GUI computer system 114 is configured to cause to be displayed disclosure page 302 to the user computing device 112. Disclosure page 302 displays disclaimer information and allows the user to continue to an introductory page 304.

Introductory page 304 is configured as an introductory page that displays basic data about the user's retirement accounts. Introductory page 304 allows the user to select an option to learn more about the levels of service available from the financial planning system associated with GUI computer system 114. Introductory page 304 also allows the user to select an option to enroll for enhanced services in the financial planning program. In one embodiment, the user selects the option to learn more about the financial planning system, and GUI 301 causes to be displayed an "about" page 308. In another embodiment, the user selects the option to enroll in the enhanced services, and GUI computer system 114 causes to be displayed a registration page 310.

About page 308 displays information about the financial planning system and also allows the user to access registration page 310.

Registration page 310 allows the user to register for the enhanced services. Registration page 310 captures demographic and salary data from the user and displays a summary of fees for utilizing the enhanced services. Registration page 310 also allows the user to agree to enroll in the enhanced services, in which case GUI 301 causes a registration confirmation page 312 to be displayed on the user computing device 112.

Registration confirmation page 312 displays a notice to the user confirming the success of registering for the enhanced services, as well as a current list of allocations associated with the user. Registration confirmation page 312 also allows the user to access the retirement dashboard, in which case planning engine 150 causes to be displayed dashboard page 314. Further, after the user agrees to enroll in the enhanced services through registration page 110, a request to return to the home page will cause to be displayed home page 334. Home page 334 displays financial goals and projections associated with the user, based on user profile data and account data received from the user.

Home page 334 is configured to display a homepage associated with the user. The homepage displays financial goals and projections associated with the user, based on user profile data and account data received from the user. Home page 334 maintains an appearance and feel similar to introductory page 304. For example, Home page 334 and introductory page 304 each include financial projections generated by the projection and optimization modules 152 of the at least one planning engine 150 based on a first set of data fields in the user profile data. For example, Home page 334 and introductory page 304 each display a graphic which represents that percentage of a savings goal that a user has achieved. Further, Home page 334 and introductory page 304 each allow the user to select the aforementioned graphic, which causes to be displayed a goals quick view page 336. Goals quick view page 336 displays more detailed information about a user's retirement goals, and allows the user to update certain pieces of information. This functionality is available to both users who receive the first, basic level of functionality of GUI 301 and the at least one planning engine 150, and users who have enrolled in the second, enhanced level of functionality of GUI 301 and the at least one planning engine 150.

Home page 334 has some differences from introductory page 304, relating to enhanced services. For example, Home page 334 allows the user to select a link to the "dashboard", which causes to be displayed Dashboard page 314. As used herein, the term "link" may be used to refer to a hyperlink, a button, or other such virtual component that allows a user to interact with GUI 301 to access (e.g., "link to") additional or different content. Moreover, in some embodiments, Home page 334 allows the user to add information to database 120 regarding members of the user's household, which functionality is not available from introductory page 304.

Dashboard page 314 allows the user to navigate among a plurality of modules associated with the enhanced services that allow a user to manage different aspects of the user's financial planning. Dashboard page 314 allows the user to select at least one of an about me page 316, an investments page 326, an income planning page 328, a savings page 330, an opportunities page 332, an un-enroll page 334, an activity summary page 336, and a my goal page 338. In response to receiving a selection of a given page, GUI 301 causes to be displayed the corresponding page on the user computing device 112. These pages enable the user to input or edit different aspects of user profile data, corresponding to values in respective database fields of the user profile in database 120, subject to constraints and validations applied by GUI computer system 114.

About me page 316 allows the user to access a my family page 318, an assets page 320, an income in retirement page 322, and a savings goals page 324. A user selection of a given page causes GUI 301 to cause to be displayed the corresponding page to the user computing device 112.

My family page 318 generally captures personal user profile data (e.g. demographic data, spouse and dependents data, and salary data) from the user. In some embodiments, my family page 318 directs the user through a number of data input pages which are configured to request and capture user profile data from the user. When a user completes the data entry requests, my family page 318 automatically directs the user to assets page 320. Assets page 320 captures asset data (e.g. asset identifiers and asset compositions) for outside accounts and other long-term assets from the user and allows the user to access income in retirement page 322.

Income in retirement page 322 allows the user to input data about sources of income the user expects to receive in retirement. Income in retirement page 322 captures data (e.g. income data and benefit data) from the user and allows the user to select which member of the family is associated with the captured data. When a user completes the data entry requests, income in retirement page 322 directs the user to savings goals page 324.

Savings goals page 324 allows the user to input data about the user's savings goals. For example, the user may input data regarding a child's wedding that the user expects to have to pay for during retirement. Savings goals page 324 captures user profile data (e.g. financial needs to be met in retirement, apart from the steady state) from the user and allows the user to select which member of the family is associated with the captured data. When a user completes the data entry requests, savings goals page 324 directs the user back to about me page 316.

Investments page 326 displays an overview of financial projections associated with a user's portfolio, wherein the financial projections are based on user profile data. Investments page 326 also allows the user to select between a plurality of data displays. For example, investments page 326 allows the user to select at least one of an equities/bonds display, an asset class display, and a funds display. Investments page 326 also captures user account preferences (e.g. risk preference data).

Income planning page 328 displays information related to a user's draw from the financial account, and from outside accounts and other benefits, during retirement. For example, income planning page 328 displays a graphical projection of whether the user will achieve financial goals based on user profile data and account data. Income planning page 328 is configured to display an alert if an output from planning engine 150 indicates that the user is projected to fall short of financial goals. Income planning page 328 also allows the user to model alternative plans by entering alternative user profile data, such as modified financial goals and retirement dates.

Savings page 330 allows the user to view different contribution rate amounts and types, and select between the contribution rate amounts and types. Savings page 330 displays a recommended contribution rate based on user profile data and account data and captures contribution data based on a user selection of a given contribution rate.

Opportunities page 332 allows the user to respond to recommendations generated by system 100. Un-enroll page 334 allows a registered user to un-register from the enhanced services, for example to revert to basic services. Activity summary page 336 allows the user to review recent transactions.

My goal page 338 allows the user to set retirement goals. My goal page 338 captures user profile data such as financial goal data and desired retirement age. My goal page 338 also displays a household income goal based on the financial goal data for different members of a household.

Figure 4:
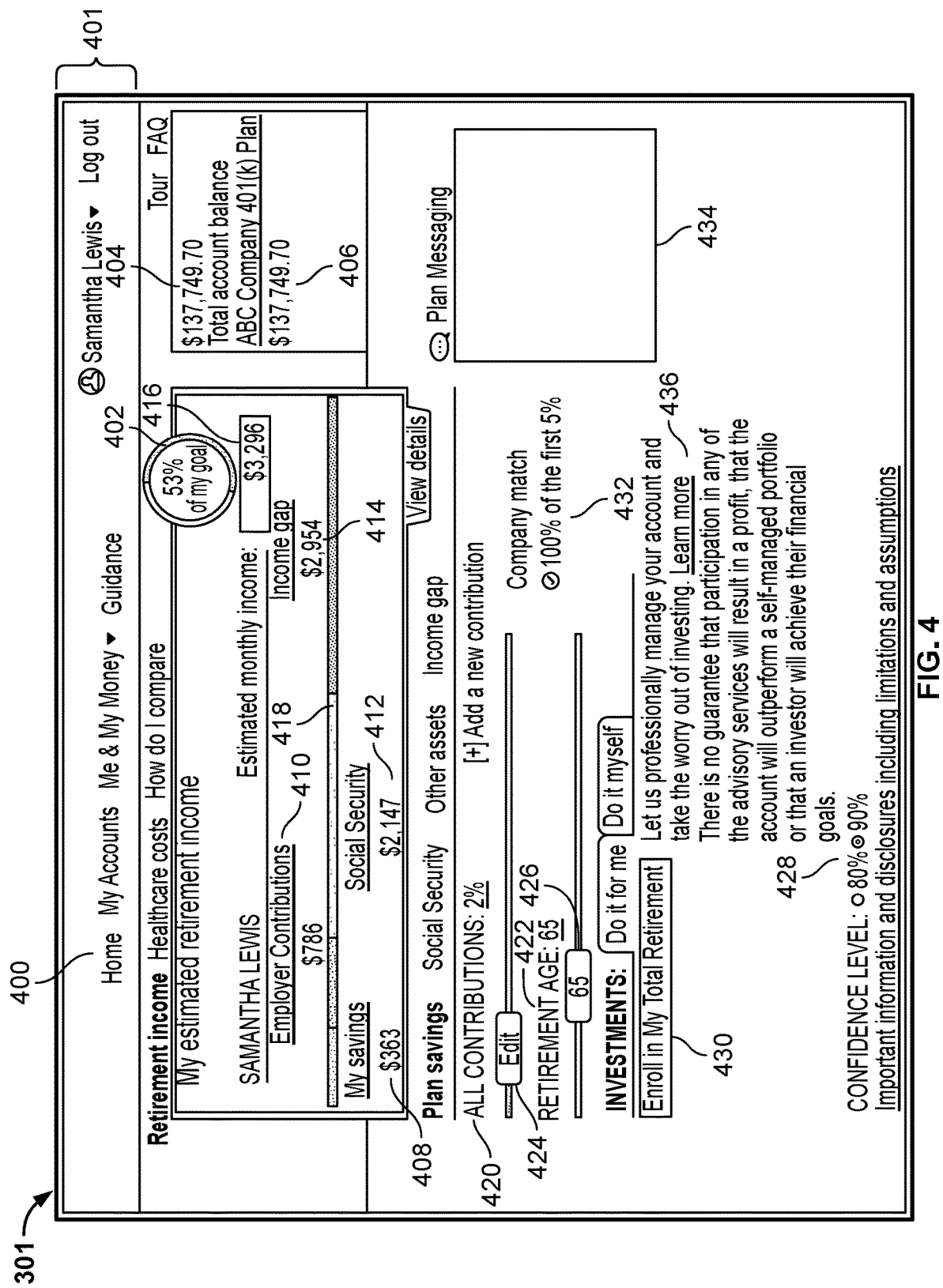
FIG. 4 depicts an example introductory page, such as introductory page of GUI shown in FIG. 3, which is generated and transmitted by planning engine.

FIG. 4 depicts an example introductory page 400, such as introductory page 204 of GUI 301, which is generated and transmitted by planning engine 150. In the illustrated embodiment, introductory page 400 is shown as displayed for a base-level user. Introductory page 400 provides a top-level menu 401 that appears in a substantially identical format and a substantially identical location for both base-level and enhanced-level users. Introductory page 400 is configured to display basic information associated with the user's account, such as the user's financial goals, progress toward the financial goals, a total account balance, or high-level user preferences. In some embodiments, the user information on introductory page 400 is obtained from the employer, as one of financial data sources 116, based on information provided by the employee when the user was hired as an employee and/or when the user becomes eligible for participation in the 401(k) plan associated with the financial account. For example, the data may be obtained from a recordkeeper of the 401(k) plan. Introductory page 400 also allows the user to change certain user preferences and/or update data in a first set of data fields of the user's profile in database 120, obtain more information about the levels of service available for the financial account, and register for an enhanced service level provided by the financial planning system. GUI computer system 114 is configured to receive a log-in request from the user and, based on the log-in request, cause to be displayed introductory page 400 to a user computing device 112.

Introductory page 400 is configured to transmit values from the user profile for the first set of data fields to planning engine 150, and to display financial projections generated by planning engine 150 using the user's values from the first set of data fields. In some embodiments, introductory page 400 is configured to call a single planning engine 150 for basic financial projections, regardless of whether the user is registered for basic services or enhanced services. This facilitates protecting a user who is newly registered for enhanced services from seeing significant numerical changes or formatting changes upon logging in, thereby increasing an initial user satisfaction with the enhanced services and increasing an adoption and retention rate for the enhanced services. For example, in some embodiments, the planning engine 150 includes multiple planning engines each supporting a different level of services for the financial account, and introductory page 400 is configured to call a first planning engine 150 for basic financial projections, regardless of whether the user is registered for basic services or enhanced services. Alternatively, the at least one planning engine 150 is a single planning engine 150.

Figure 5:
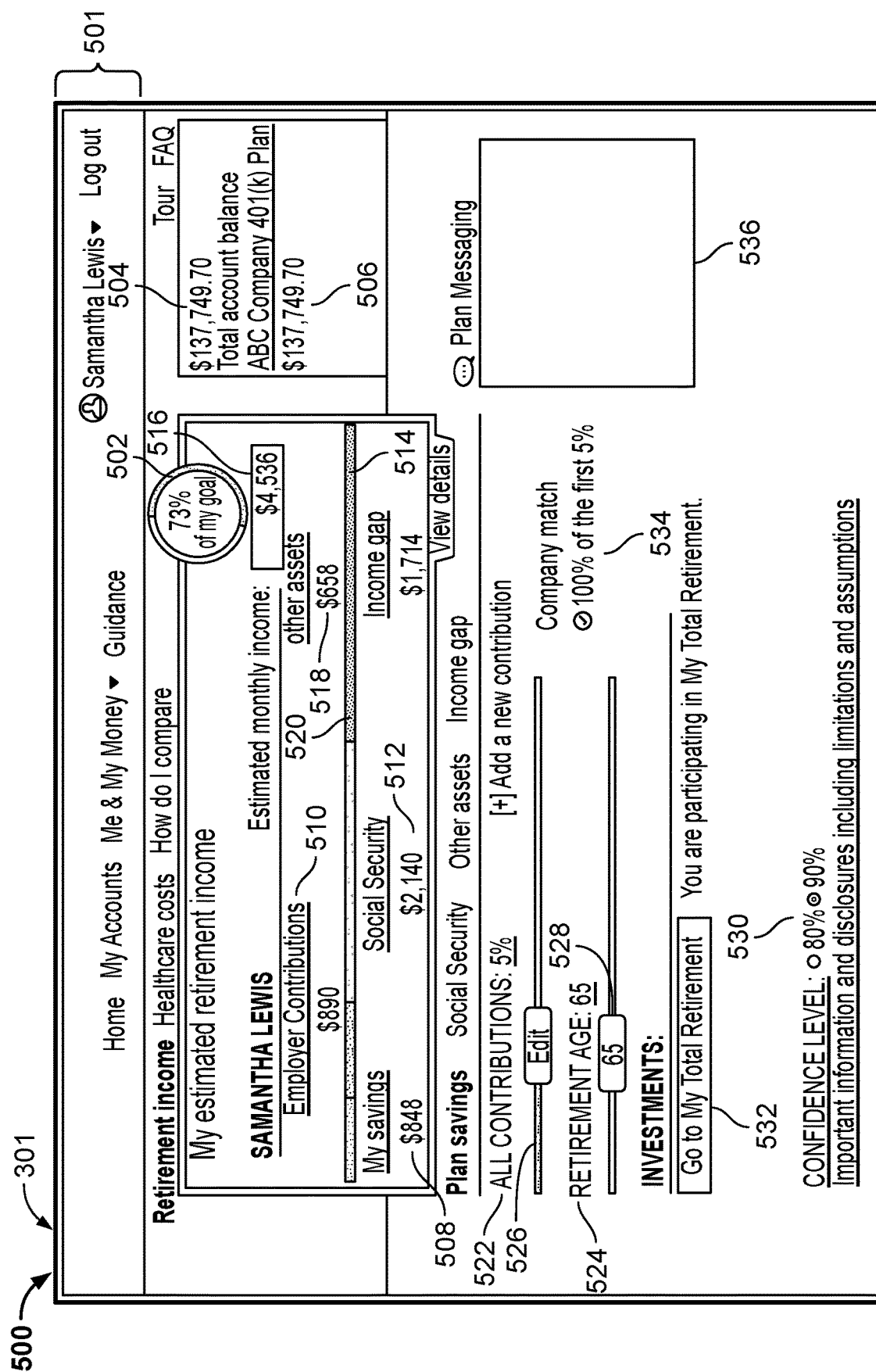
FIG. 5 depicts an example homepage, such as Home page, which is causes to be displayed as the introductory page by GUI for a user enrolled in the enhanced level service (e.g., after becoming an enhanced-level user).

Introductory page 400 is configured to display total account balance 404 and benefits plan 406 for the user's financial account. Introductory page 400 is also configured to display goal summary 402 and estimated income 416 to both base-level and enhanced-level users based on financial projections generated by planning engine 150. Specifically, planning engine 150 generates estimated retirement income 416 based on user profile data and account data, and generates goal summary (or "comparison") 402 based on a comparison of estimated income 416 to a user goal for retirement, as derived from database 120 from user profile data (e.g. an estimated monthly income goal, an estimated retirement goal). The goal summary 402 is configured to appear in substantially identical format and substantially identical location on introductory page 400 for both base-level and enhanced-level users, as shown in FIG. 5. Goal summary 402 is also configured to capture user input requesting access to edit fields in the user profile stored in database 120. Specifically, goal summary 402 is configured to transmit a user request to GUI 301, which causes to be displayed a goals configuration display such as goals configuration display 600 (shown in FIG. 6) and goals configuration display 700 (shown in FIG. 7).

Planning engine 150 is further configured to generate income components 408, 410, and 412 based on user profile data and account data. In the exemplary embodiment, income component 408 represents income generated from a savings account, a component of investment income which is calculated by investment income module 206 (shown in FIG. 2). Income components 410 and 412 represent employer contributions and social security benefits respectively, both of which are components of a benefits plan value, which is calculated by benefits module 210 (shown in FIG. 2). In an alternative embodiment, income component 410, which represents employer contributions, is a component of investment income which is calculated by investment income module 206. Planning engine 150 is further configured to determine income gap 414 based on a comparison of estimated income 416 to user-input financial goals (e.g. an estimate monthly income goal). Using projections returned from planning engine 150, GUI 301 is configured to display income tracking bar 418, which is a visual representation of income components 408, 410, and 412 and income gap 414 using different colors on a single bar. Introductory page 400 is also configured to capture a user's preferred confidence level 428 for the projections. In the exemplary embodiment, the user selects from two pre-determined values, and the selected value is transmitted to planning engine 150. Planning engine 150 uses confidence level 428 as an input for generating financial projections such as estimated income 416 and income components 408, 410, and 412.

Introductory page 400 is further configured to capture user profile data and account data through interactive sliders 424 and 426, and store the captured data to database 120. In an alternative embodiment, introductory page 400 is configured to capture data using any suitable graphical control and/or to display any number of interactive sliders. In the exemplary embodiment, interactive sliders 424 and 426 allow the user to input contribution data and retirement age data respectively. In alternative embodiments, interactive sliders 424 and 426 capture other types of user profile data and/or account data. In some embodiments, interactive sliders 424 and 426 are configured to "snap" to certain intermediated pre-determined values which are generated by GUI 301. In some embodiments, introductory page 400 displays recommended values and/or starting points for interactive sliders 424 and 426.

Introductory page 400 is further configured to display current slider values 420 and 422, which are configured to display numeric values related to the data captured by interactive sliders 424 and 426 respectively. In some embodiments, slider values 420 and 422 display the numeric value selected by interactive sliders 424 and 426 respectively. In other embodiments, slider values 420 and 422 display a value generated by planning engine 150 based on at least the input captured from interactive sliders 424 and 426. Introductory page 400 is further configured to display company match tracker 432, which is generated by GUI 301 based on account data such as benefits data and contribution data.

Introductory page 400 is configured to receive user input requesting more information about the financial planning system through a "learn more" link 436. Learn more link 436 causes to be displayed an informational page such as informational page 800 (shown in FIG. 8A) or about page 208 (shown in FIG. 2).

If the user is a base-level user, introductory page 400 is configured to receive user input requesting enrollment in enhanced services by displaying an enrollment request 430 to the base-level user. Enrollment request 430 may be similar to "Do It For Me" link 860 (shown in FIG. 8C). Enrollment request 430, when activated by the base-level user, also causes to be displayed an enrollment page such as registration page 900 (shown in FIG. 9) or registration page 210 (shown in FIG. 2). If the user is already an enhanced-level user, the introductory page is configured to provide a "Go to My Total Retirement" link (or "dashboard request") 532 (as shown and described with respect to FIG. 5 below). Dashboard request 532 appears in a dashboard-link location substantially identical to the location of enrollment link 430 for base-level users.

FIG. 5 depicts an example homepage 500, such as Home page 334, which is causes to be displayed as the introductory page by GUI 301 for a user enrolled in the enhanced level service (e.g., after becoming an enhanced-level user). In other words, Homepage 500 is introductory page 400 as it appears to a user 102 who is enrolled for enhanced services. Homepage 500 is configured to provide a substantially similar look and experience to the user as introductory page 400. For example, Homepage 500 includes top-level menu 501 identical to top-level menu 401. In other words, the overall layout of homepage 500 is recognizable and/or familiar to user 102, based on introductory page 400 as it appeared to the user prior to enrollment for enhanced services.

Just as in introductory page 400 in FIG. 4, Homepage 500 is configured to display a total account balance 504 and a benefits plan 506 for the user's financial account, as well as goal summary 502 including the identical comparison of estimated income 516 to the user goal for retirement as in goal summary 402. Goal summary 502 is likewise configured to capture user input, such as a user clicking or otherwise selecting goal summary 502, to provide access to configure inputs used by planning engine 150 in generating financial projections by causing to be displayed a goals configuration display such as goals configuration display 600 (shown in FIG. 6) and goals configuration display 700 (shown in FIG. 7).

GUI 301 is again configured to generate income components 508, 510, and 512 based on user profile data and account data, identical to income components 408, 410, 412, and an other-assets component 518 based on other assets entered into database 120 by the user (not shown in FIG. 4). Planning engine 150 is again configured to determine income gap 514 based on a comparison of estimated income 516 to user-input financial goals (e.g. an estimated monthly income goal), and GUI 301 is again configured to cause to be displayed an income tracking bar 520, which is a visual representation of income components 508, 510, 512, and 518 and income gap 514 using different colors on a single bar. Homepage 500 is also configured to capture a user's preferred confidence level 530 for financial prediction. In the exemplary embodiment, the user selects from two pre-determined values, and the selected value is transmitted to planning engine 150. Planning engine 150 uses confidence level 530 as an input for generating financial projections, such as estimated income 516 and income components 508, 510, 512, and 518.

Homepage 500 is likewise configured to capture user profile data and account data through interactive sliders 526 and 528, and to display current slider values 522 and 524 and company match tracker 534, identical to those displays as shown in FIG. 4.

As noted above, in contrast to introductory page 400 as it appears to base-level users, Homepage 500 is configured to receive user input for enhanced-level users requesting access to a dashboard through dashboard request 532. Dashboard request 532 causes to be displayed a dashboard, such as dashboard 1100 (shown in FIG. 11) or dashboard page 214 (shown in FIG. 2), which provides access for enhanced-level users to the enhanced-level services as described below. In the example embodiment, dashboard request 532 is displayed on homepage 500 in a substantially identical location as enrollment request 430 appears on introductory page 400. Thus, the option to register for base-level users through enrollment request 430 is effectively replaced by the dashboard request 532 on a similar page once the user becomes an enhanced-level user. For example, newly registered users have a familiar starting point from which to move forward to the changes and benefits of registration in an otherwise familiar environment within GUI 301.

Figure 6:
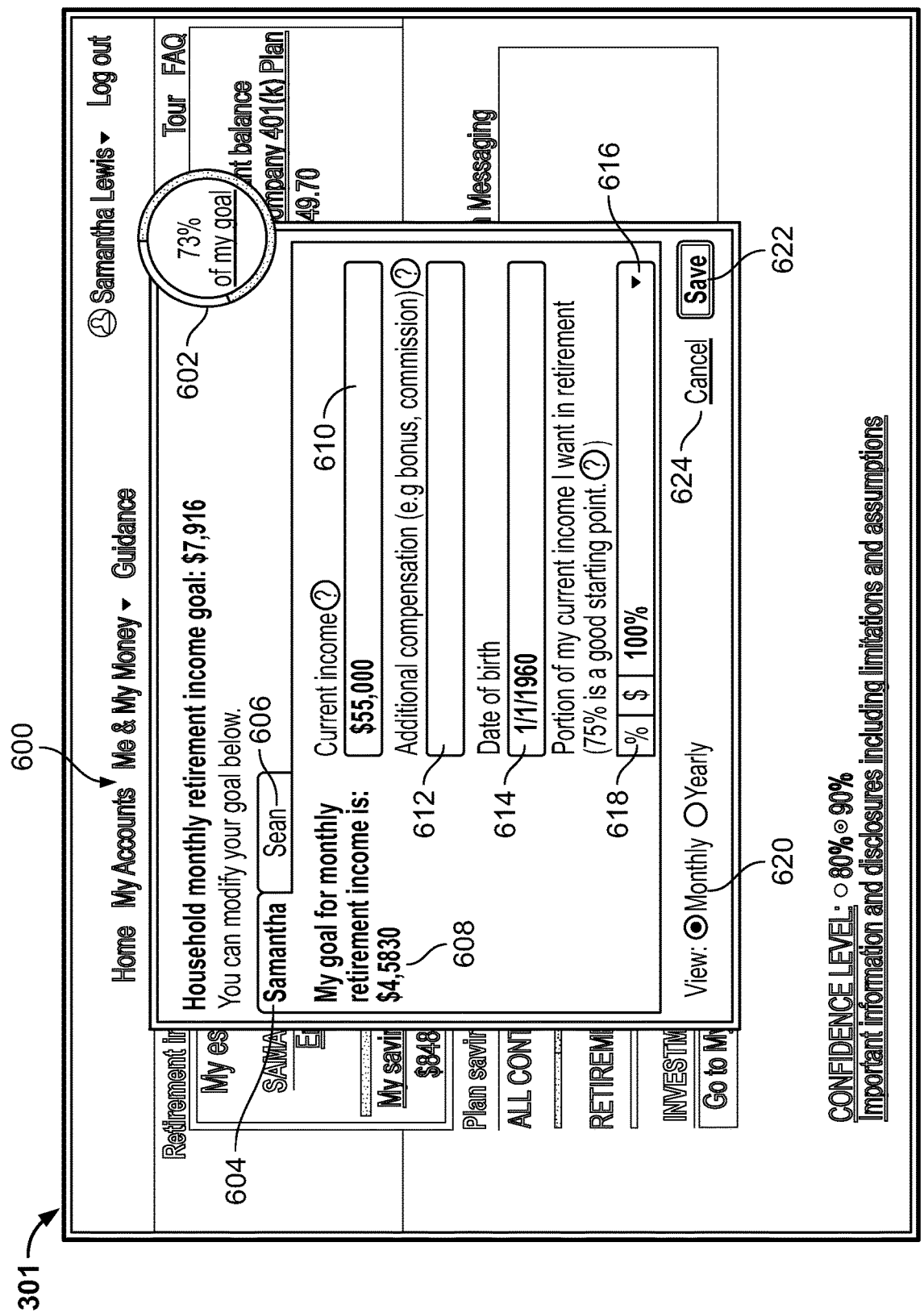
FIG. 6 depicts goals configuration display of GUI, which allows a user to change (e.g., edit) values for certain data fields in database, which are to be used as inputs used by planning engine to generate financial projections.

FIG. 6 depicts goals configuration display 600 of GUI 301, which allows a user to change (e.g., edit) values for certain data fields in database 120, which are to be used as inputs used by planning engine 150 to generate financial projections. Display 600 is caused to be displayed based on a user request received through a goal summary icon, such as goal summary 402 (shown in FIG. 4) and goal summary 502 (shown in FIG. 5). In the example embodiment, display 600 is configured as a pop-up overlay displaying over homepage 500 or introductory page 400 to display inputs used by planning engine 150 in calculating financial projections, such as income goal 608 and goal summaries 402, 502, and 602. Display 600 is further configured to capture user inputs, such as user profile data and account data (e.g., current income, additional compensation, date of birth, portion of current income desired in retirement), and store the data in database 120.

Display 600 is configured to display a goal summary 602, which is substantially similar to goal summaries 402 and 502. In some embodiments, goal summary 602 is configured to update goal summary 602 based on captured user input. Display 600 is further configured to display tabs for family members 604 and 606. GUI 301 causes to be displayed family member tabs 604 and 606 that enable editing of corresponding user profile data in database 120, which also can be initiated from dashboard 1100 (shown in FIG. 11) for an enhanced-level user. Display 600 is configured to allow the user to switch between a display for each family member associated with tabs 604 or 606. Specifically, display 600 is configured to toggle between information specific to each family member in the displayed data fields based on receiving user input selecting the corresponding family member tab 604 or 606. In some embodiments, GUI 301 enables the user to toggle between more or fewer than two plurality of family member tabs, wherein the number of family members is based on user profile data.

Display 600 is configured to display income goal 608, which is generated by GUI computer system 114 based on financial goals captured from the user, who is associated with the first tab 604. Display 600 is further configured to capture current income data 610, additional compensation data 612, date of birth 614, retirement income amount data 616, income format data 618, and income period data 620 with respect to family member tab 604 (i.e., the user). For example, retirement income amount data 616 is expressed in a format 618 of a percent of pre-retirement income. In the exemplary embodiment, the current income 610 and additional compensation 612 are summed and multiplied by the retirement income amount data 616. Income goal 608 is calculated based on income period data 620 applied to the sum of current income 610 and compensation 612, as modified by retirement income amount 616.

In some embodiments, income format data 618 captured through display 600 causes display 600 to alter the input options for income amount data 616. For example, a user may select "$" for input retirement format data 618, in which case display 600 may allow the user to input income amount data 616 as a dollar amount. In another example, a user may select "%" for income format data 618, in which case display 600 may allow the user to input income retirement amount data 616 as a percentage of current income 610.

Display 600 is also configured to receive a user request to save any updated inputs through a save request 622. Save request 622 causes planning display 600 to store any data input by a user in database 120. Save request 622 also causes to be displayed an updated underlying page, such as introductory page 400 (shown in FIG. 4) or homepage 500 (shown in FIG. 5). Alternatively, a cancel request 624 discards any changed and reverts to non-updated introductory page 400 or homepage 500.

Figure 7:
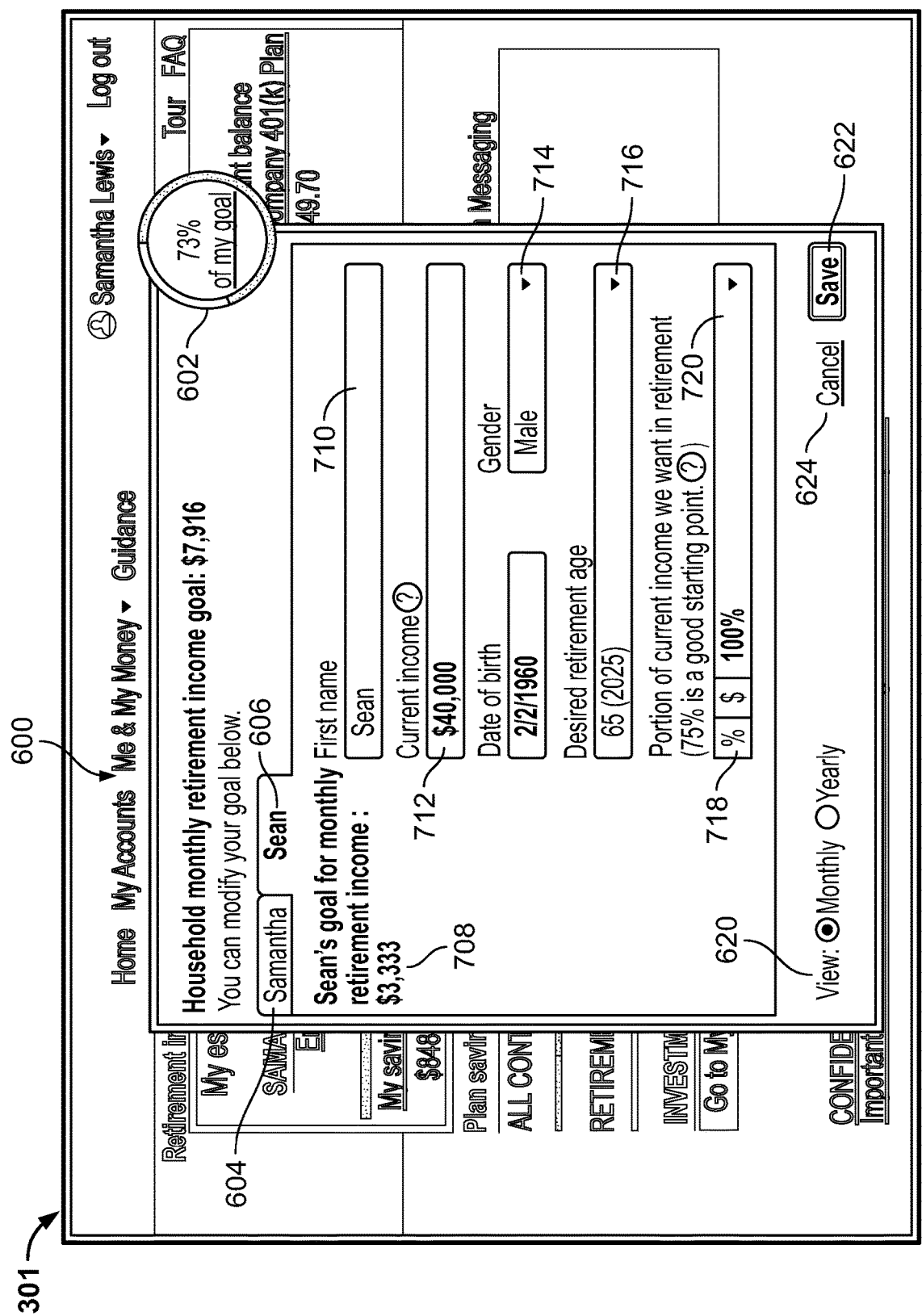
FIG. 7 depicts goals configuration display having second member tab selected.

FIG. 7 depicts goals configuration display 600 having second member tab 606 selected. With second family member tab 606 selected, display 600 is still configured to display goal summary 602 and update goal summary 602 based on captured user input. Display 600 is further configured to display family members tab 604 and 606 to allow the user to toggle between a display for each family member 604 or 606. Moreover, display 600 is configured to display income goal 708 based on financial goals captured from the user with respect to the second family member. Display 600 is further configured to capture current income data 710, additional compensation data 712, date of birth 714, retirement income amount data 716, income format data 718, and income period data 720 with respect to the second family member. In the exemplary embodiment, the current income 710 and additional compensation 712 are summed and modified by the retirement income amount data 716 as described above to calculate income goal 708.

When second family member tab 606 is selected, display 700 is also still configured to receive a user request to save any updated inputs through save request 622 or discard changes via cancel request 624.

Figure 8A:
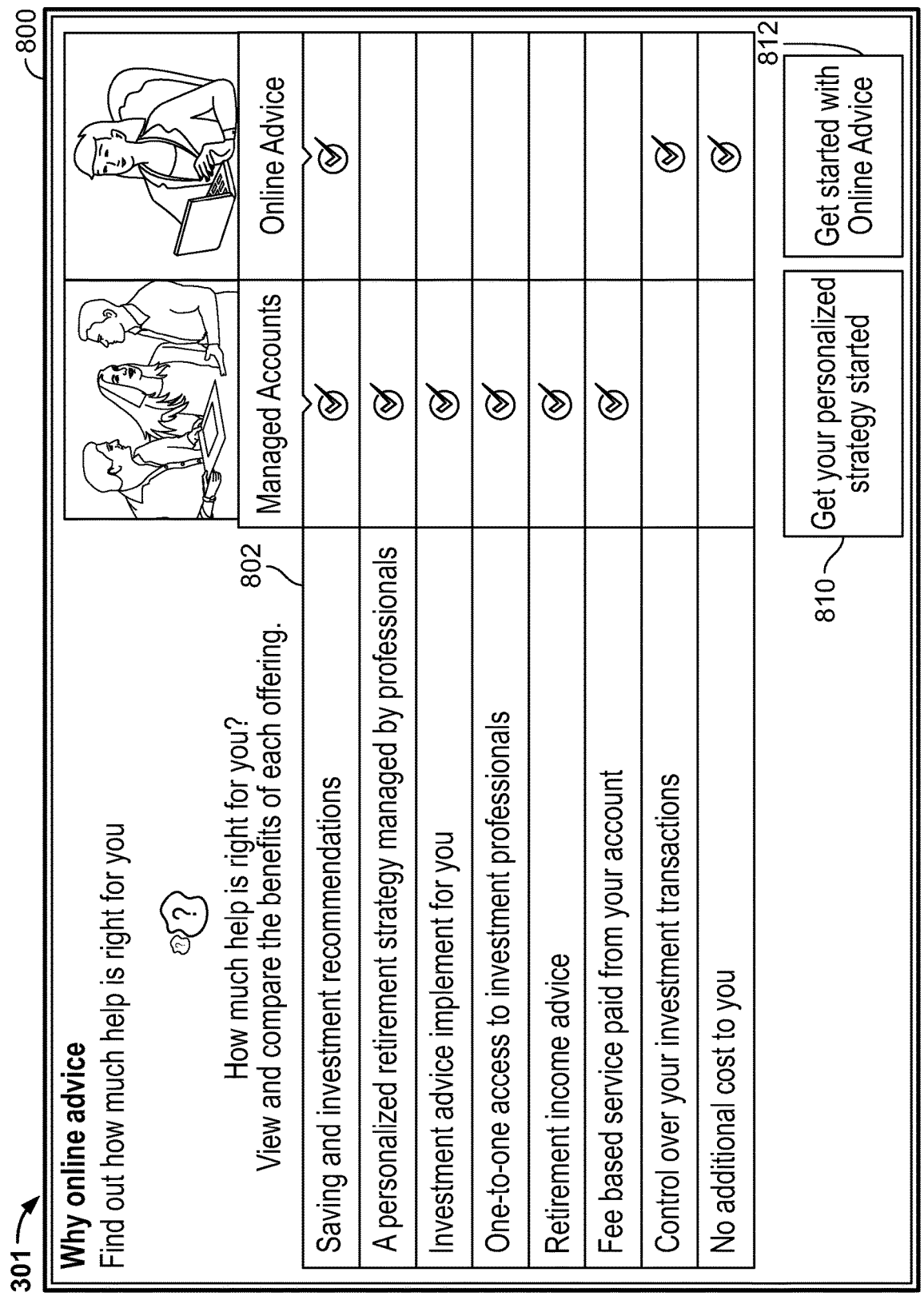
FIG. 8A depicts an exemplary informational page of GUI which provides a user with a tabular comparison of services available through the financial planning system.

FIG. 8A depicts an exemplary informational page 800 of GUI 301 which provides a user with a tabular comparison of services available through the financial planning system. Informational page 800 identifies various services available to enhanced-level users (e.g., under the "Managed Accounts" column) and options for online advice available through an online advice service. Informational page 800 is caused to be displayed upon reception of user input requesting more information, such as learn more link 436 (depicted in FIG. 4). In the exemplary embodiment, informational page 800 is configured to display a comparison table 802, which identifies services available through the financial planning system, basic services available to unregistered users, and services available through both. Informational page 800 is also configured to allow the user to learn more about the enhanced services via a continue link 810, or to register for online advice via an online advice link 812.

FIG. 8B depicts an exemplary informational sub-page 820 of GUI 301 which provides a user with more information about the financial planning system. Informational sub-page 800 is caused to be displayed upon reception of user input requesting more information, such as continue link 810.

In the exemplary embodiment, informational sub-page 820 is configured to display a system overview 822, which describes some aspects of the financial planning system relevant to a potential consumer or user. Informational sub-page 820 is also configured to display a video overview link 824, which is configured to display a video further describing the financial planning system. Informational sub-page 820 is also configured allow the user to proceed to a registration page, such as registration page 210 (shown in FIG. 2) or registration page 900 (shown in FIG. 9) based on receiving user input through a registration link 830. In the example embodiment, registration link 830 appears in multiple locations on informational sub-page 820 to facilitate ease of registration for the enhanced services. Alternatively, informational sub-page 820 includes any suitable number of registration links 830.

In alternative embodiments, informational sub-page 820 is generated and transmitted by planning engine 150 as part of informational page 800, directly upon reception of user input requesting more information, such as learn more link 436 (depicted in FIG. 4), or in response to any other suitable link or request.

Figure 8C:
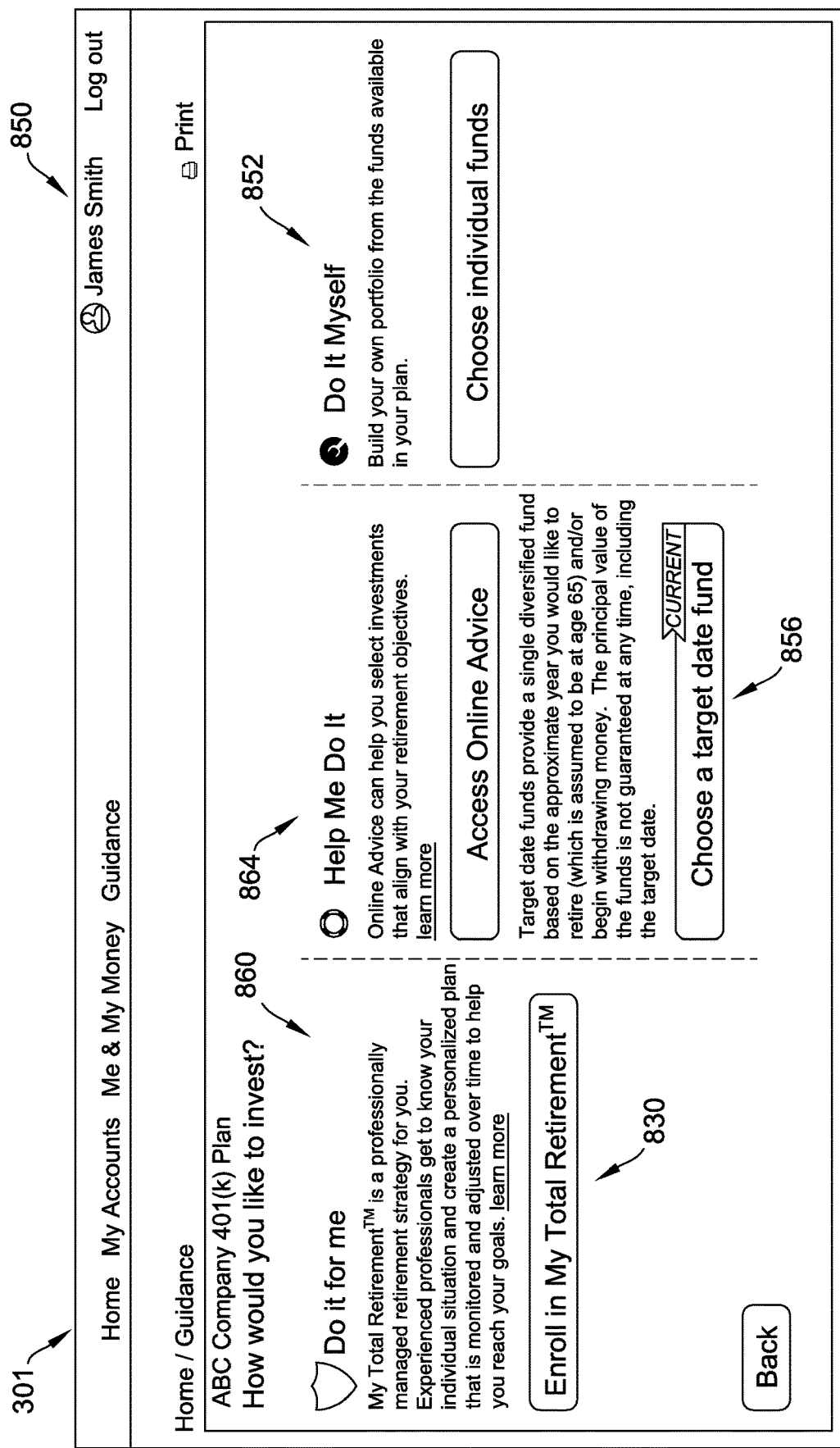
FIG. 8C depicts another exemplary informational page of GUI which provides a user with a comparison of services available through the financial planning system.

FIG. 8C depicts another exemplary informational page 850 of GUI 301 which provides a user with a comparison of services available through the financial planning system. Informational page 850 is caused to be displayed by user selection of the "guidance" link in top-level menu 401/501 (shown in FIGS. 4 and 5). Informational page 850 provides guidance links that allow for base-level users to directly administer their own financial account through a "Do It Myself" link 852, allowing the user to select funds for their own plan. Informational page 850 also allows users to access online advice through a "Help Me Do It" link 854 or to choose target dated funds through link 856.

Figure 9:
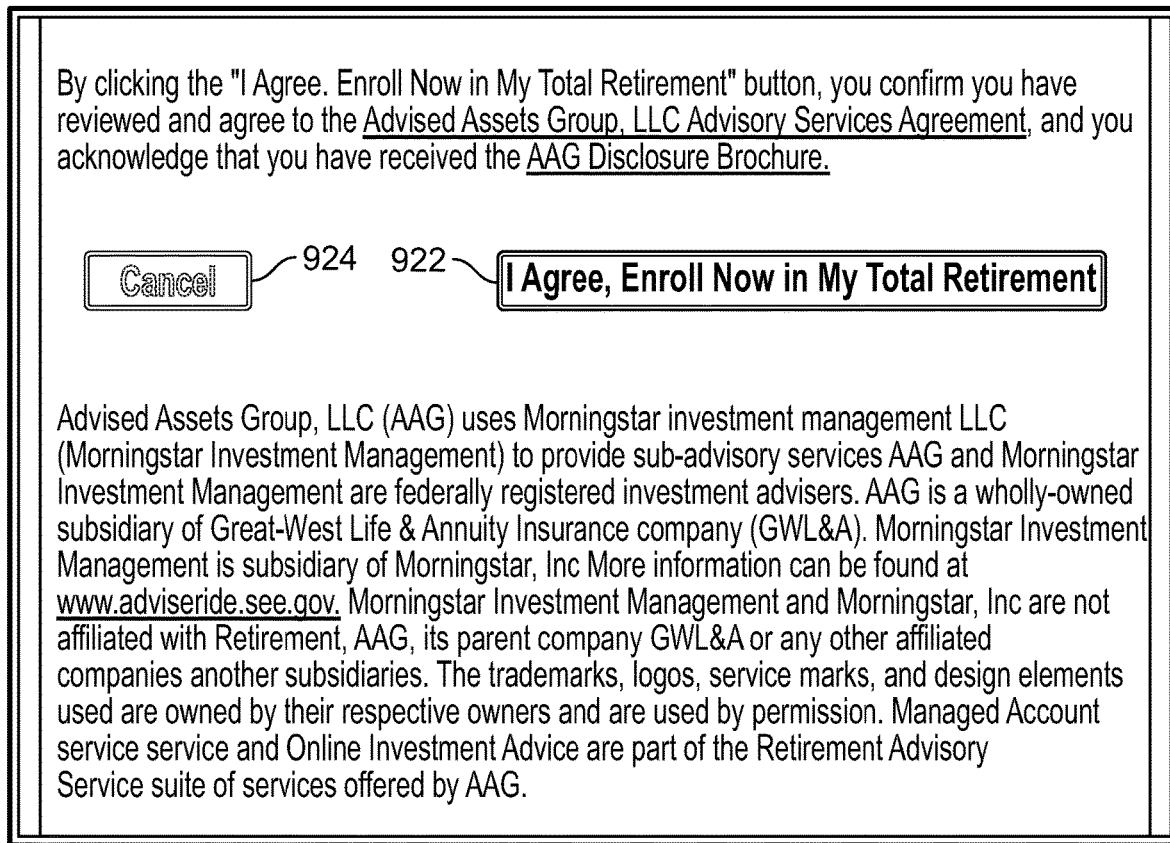
FIG. 9 depicts registration page of GUI. Registration page allows a user to register for the financial advisory system and input relevant personal and financial information.

In the example embodiment, the informational page 850 also allows the base-level user to enroll in (e.g., register for) the enhanced level of services by providing an instance of enrollment link 830 in a "Do It For Me" section 860. The enhanced service level allows enhanced-level users access to additional plan management functionality provided by or through the at least one planning engine 150. FIGS. 9 and 10 describe aspects of user enrollment in the enhanced service level. Aspects of the enhanced service level functionality are described below with respect to FIG. 11 and the succeeding figures.

FIG. 9 depicts registration page 900 of GUI 301. Registration page 900 allows a user to register for the enhanced service level and input relevant personal and financial information. Registration page 900 is caused to be displayed upon reception of a user request to enroll in the financial planning system, such as through enrollment request 430 (shown in FIG. 4) or registration link 830 (shown in FIGS. 8B and 8C).

Registration page 900 is configured to confirm or update existing data, such as data stored in a first set of data fields in database 120 associated with the basic level of service for the user, through registration input fields 902. In the exemplary embodiment, registration page 900 confirms demographic data such as first name 904, last name 906, birthdate 908, state of residence 910, and gender 912. Registration page 900 is further configured to confirm contact data such as phone number 916 and email address 918. Registration page 900 is also configured to confirm income data 914. Registration page 900 is configured to store any updated data in database 120.

Registration page 900 is further configured to display fee table 920. Fee table 920 is generated and transmitted by planning engine 150. In the exemplary embodiment, fee table 920 displays values for amounts of assets under management and associated annual rates for managing the amounts of assets. GUI 301 is configured to retrieve fee structure data, such as amounts of assets under management and associated annual rates, from a database such as database 120 (shown in FIG. 1).

Registration page 900 is also configured to receive an enrollment agreement request for the enhanced services through enrollment confirmation link 922. Enrollment confirmation link 922 receives a user request and causes to be displayed a registration confirmation page such as registration confirmation page 212 (shown in FIG. 2) or enrollment confirmation page 1000 (shown in FIG. 10). Alternatively, a user may select a cancel request 924 and decline to register for the enhanced services.

FIG. 10 depicts enrollment confirmation page 1000 of GUI 301. Enrollment confirmation page 1000 displays confirmation of enrollment 1002 to a user. Enrollment confirmation page 1000 is also configured to display initial asset allocations 1004.

GUI 301 is configured to call the at least one planning engine 150 to generate and transmit initial asset allocations 1004 upon receiving an enrollment agreement request, such as through enrollment confirmation link 922 (shown in FIG. 9). Initial asset allocations 1004 include asset data such as asset identifiers and asset compositions. In some embodiments, initial asset allocations 1004 are determined by return calculations module 204 (shown in FIG. 1B) based on user profile data and account data.

Enrollment confirmation page 1000 is configured to display additional information 1006, which includes more information about the enhanced services, steps for moving forward with the enhanced services, and/or any other information that may be useful to a newly registered user.

Enrollment confirmation page 1000 is also configured to allow the user to proceed to a dashboard page, such as Dashboard page 214 (shown in FIG. 2) or retirement dashboard 1100 (shown in FIG. 11), by receiving user input through dashboard request 1008.

Figure 11:
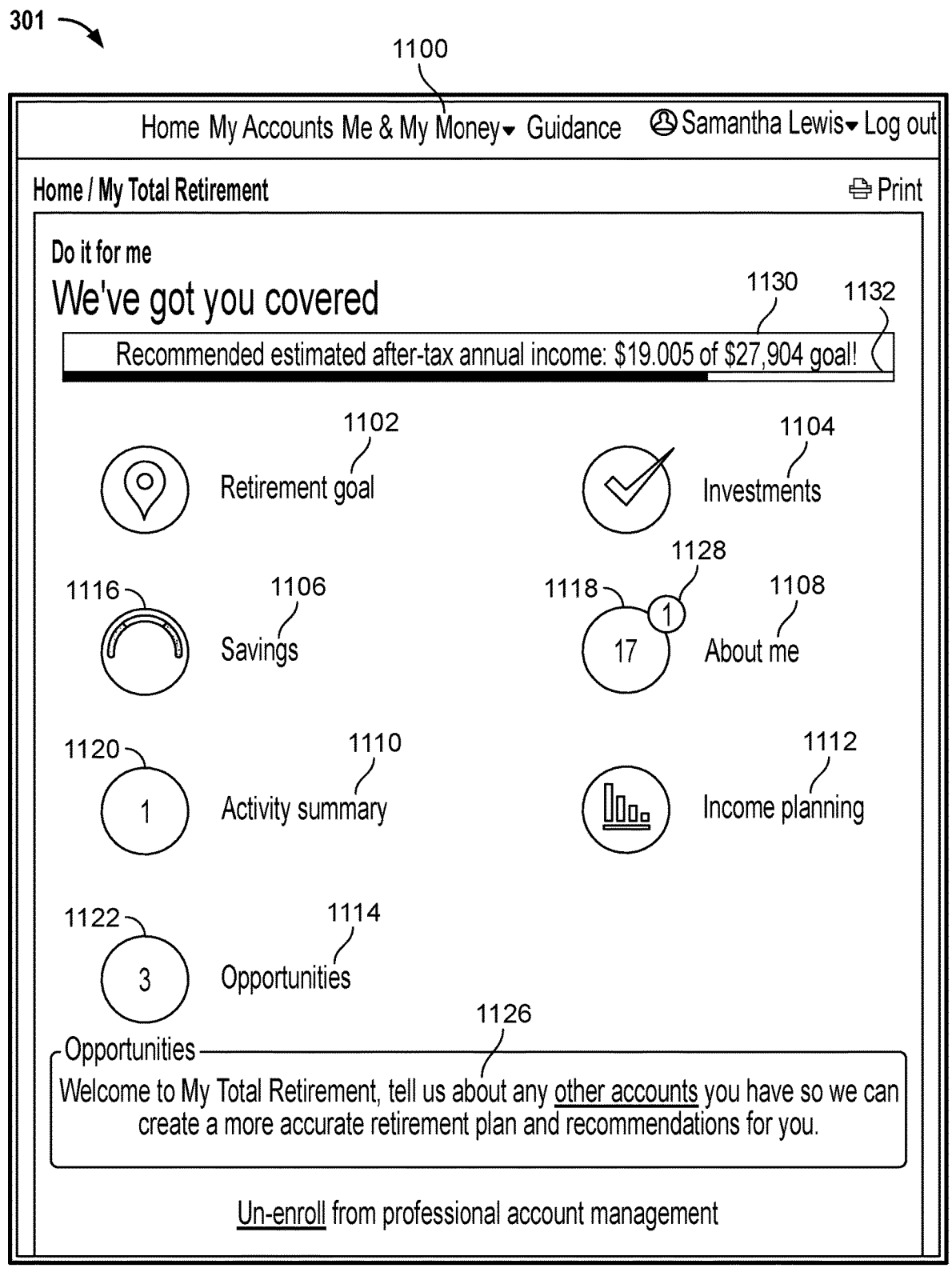
FIG. 11 depicts an exemplary dashboard of GUI, such as dashboard, provided for enhanced-level users.

FIG. 11 depicts an exemplary dashboard 1100 of GUI 301, such as dashboard 214, provided for enhanced-level users. Dashboard 1100 provides links to financial information for detailed retirement planning. In the example embodiment, retirement goal link 1102 and about me link 1108 allow user 102 to edit financial goal data and user profile data stored in database 120. Savings link 1106 and investments link 1104 allow user 102 to review the status of retirement account contributions and currently selected investments and edit related database fields. Activity summary link 1110 provides summaries of recent account activity. Income planning link 1112 enables the user to review and model expected income during retirement, and opportunities link 1114 provides user 102 with prioritized recommendations to incrementally improve the user's ability to meet retirement goals. For example, opportunities link 1114 allows user 102 to provide targeted additional information or make targeted changes to further optimize the account.

Savings link 1106 is, in the example embodiment, adjacent to savings indicator 1116, which visualizes a retirement goal. For example, where investment income module 164 determines that a retirement goal (or any other financial goal) will not be met, savings indicator 1116 may display as red. Activity indicator 1120 is adjacent to activity summary link 1110, and displays a total number of instances of recent user activity. Opportunities indicator 1122 is adjacent to opportunities link 1114, and displays a total number of opportunity recommendations available to user 102. About me indicator 1118 is adjacent to about me link 1108, and may display a number of alerts. For example, a total number of profile alerts may be displayed in the indicator. Additionally, a number of priority alerts 1128 may also be displayed in a contrast color, such as red. Opportunity area 1126 displays a message recommending an identified candidate modification to the user profile data in database 120, and an associated jump link to a page of GUI 301 enabling user 102 to execute the identified candidate modification.

Dashboard page 1100 also includes an estimated income widget 1130 that displays a comparison of another estimated retirement income amount generated by the at least one planning engine 150 to a user goal for retirement, as derived from database 120 from user profile data (e.g. an estimated monthly income goal). The estimated income amount included in estimated income widget 1130 differs from the estimated income included in goal summary 402 (shown in FIG. 4 and also identical to goal summaries 502, 602, 702), based on the improved projections associated with the enhanced services. For example, goal summary 402 relies on a relatively less complex projected before-tax income using only values from a first set of data fields in database 120. In contrast, estimated income widget 1130 displays a relatively more complex projected after-tax income based on values for both the first set of data fields and a second set of data fields, wherein the values for the second set of data fields from database 120 are passed to the at least one planning engine 150 solely for users enrolled in the enhanced services. In some embodiments, the at least one planning engine 150 includes a first planning engine that supports basic-level services and operates on values drawn solely from the first set of data fields, and a second planning engine 150 that supports enhanced-level services and operates on values drawn from both the first and second sets of data fields. Estimated income widget 1130 is programmed to update dynamically in response to the user 102 interacting with GUI 301 to make a change to the user profile that impacts the projected income and/or the user goal. Accordingly, for users 102 enrolled in enhanced services, estimated income widget 1130 facilitates an immediate visualization by the user of the impact of each change implemented by the user with respect to the financial account.

In the example embodiment, estimated income widget 1130 also displays a progress indicator 1132 that indicates progress to the user goal. For example, in FIG. 11, the user's projected retirement income is approximately two-thirds of the user goal, and progress indicator 1132 is a bar that correspondingly extends approximately two-thirds of the displayed width of estimated income widget 1130. Alternatively, if the user's projected retirement income meets or exceeds the user goal, progress indicator 1132 is a bar that fills the entire displayed width of estimated income widget 1130. Further in the example embodiment, progress indicator 1132 is a first color (e.g., green) if the user's projected retirement income meets or exceeds the user goal, and is a second color (e.g., red) if the user's projected retirement income is less than the user goal. In alternative embodiments, progress indicator 1132 is displayed in any suitable fashion.

Dashboard 1100 is also configured to display, in an opportunity area 1126, one or more opportunities for a participant in response to GUI computer system 114 determining that at least one opportunity exists for improving a performance of the participant's account. For example, GUI computer system 114 identifies opportunities for display in opportunity area 1126 using an opportunity rules engine to analyze the user profile in database 120. In the example embodiment, opportunity area 1126 displays a message associated with a first identified opportunity, and an opportunity indicator 1122 displayed on dashboard 1100 displays a total number of opportunities identified by GUI computer system 114.

Figure 12:
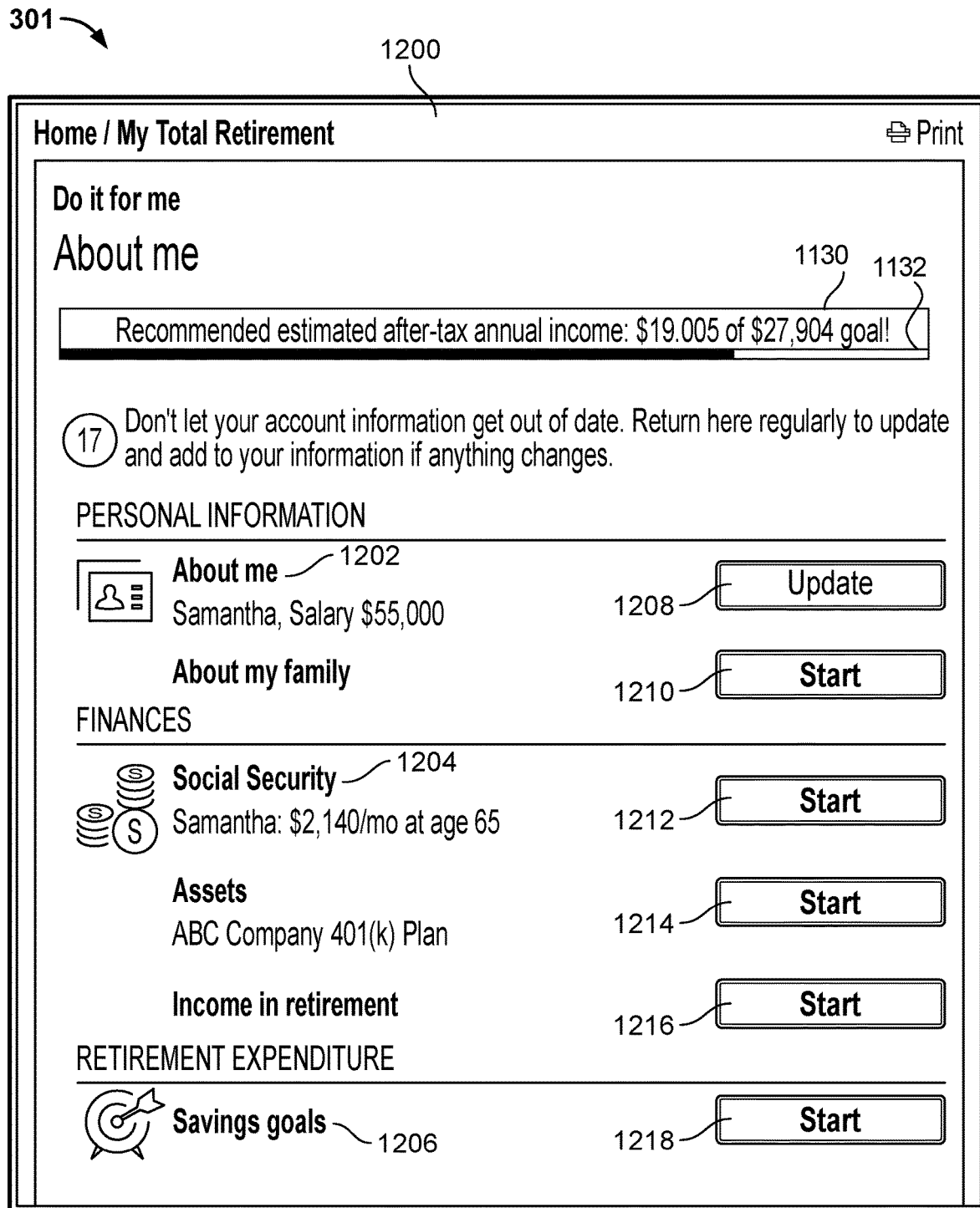
FIG. 12 depicts an exemplary about me page (or "user profile page") of GUI, such as about me page, which may be opened using about me link.

FIG. 12 depicts an exemplary about me page (or "user profile page") 1200 of GUI 301, such as about me page 216, which may be opened using about me link 1108. About me page 1200 displays an overview of data fields including personal profile information 1202, financial information 1204, and retirement expenditures information 1206. User 102 may review about me page 1200 to update information, or determine what information still needs to be provided for null fields (i.e., those fields for which the user has yet to specify a value), to enable all projection and optimization modules 152 to execute fully and accurately, and to update specific sections of information as available. For example, user 102 may update salary data or add a dependent.

About me update link 1208 facilitates user 102 submitting salary data, demographic data (e.g., age, birthdate), and spouse information. Family information link 1210 facilitates user 102 submitting dependent data, as shown in FIGS. 13-16, such as the names and birthdates of dependents. Profile information 1202 may summarize previously submitted user profile data, such as a name and salary.

Financial information 1204 includes social security link 1212, assets link 1214, and income in retirement link 1216. Financial information 1204 may include preview data, such as estimated social security benefits and indicators of benefit plans. Social security link 1212 causes to be displayed social security page 4600 (shown in FIG. 46), which enables the user to edit a benefit start age and an expected benefit. Social security page 4600 includes a "Use our estimated monthly benefit" option, which displays a social security benefit table 4700 (shown in FIG. 47) if selected. Retirement expenditures information 1206 includes savings goals link 1218, such that user 102 may define a savings goal to meet a discrete, one-time expense expected to arise during retirement, such as a child's wedding or a particular vacation plan.

Figure 13:
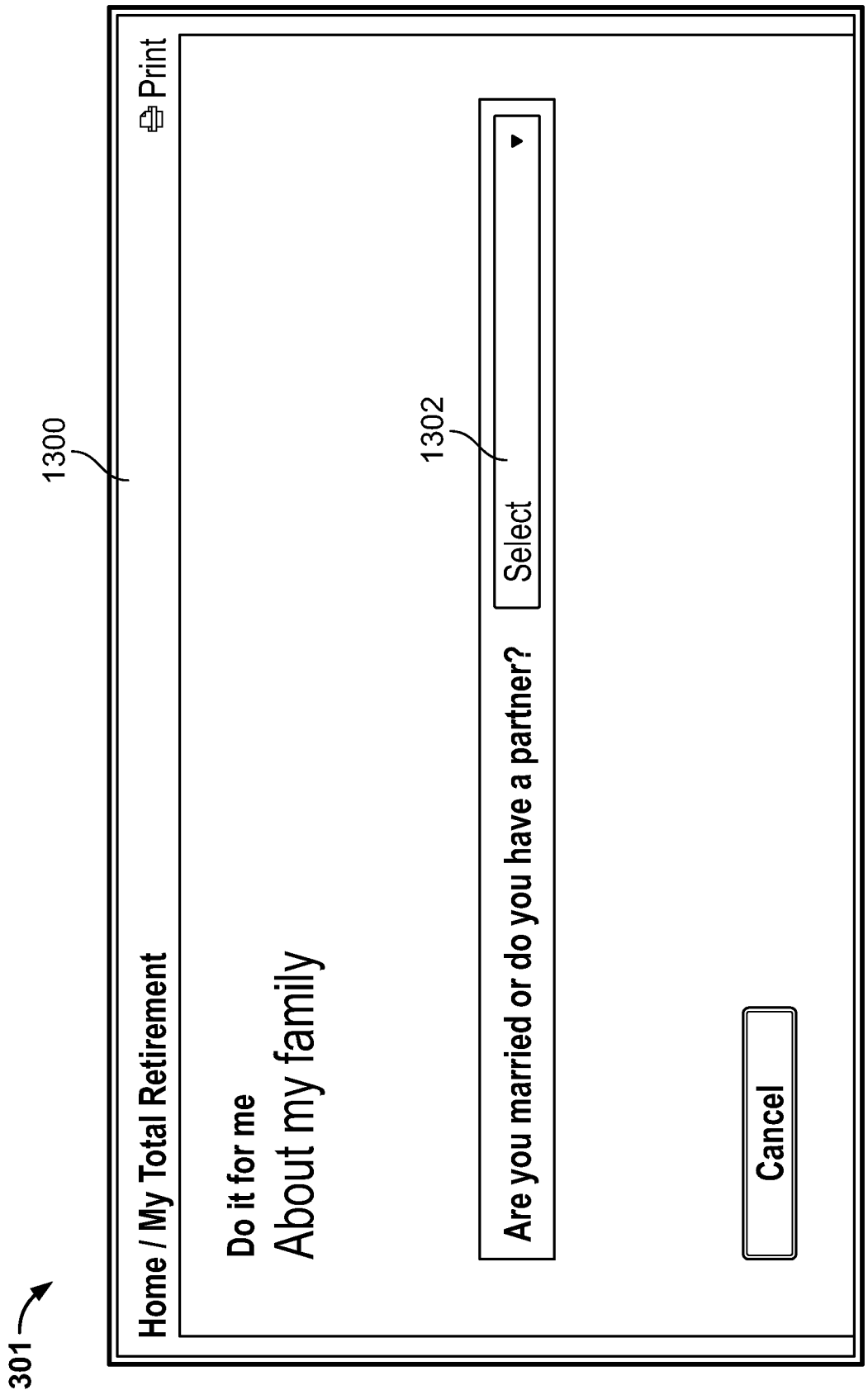
FIG. 13 depicts an exemplary spouse status page of GUI, which may be opened via about me link, and facilitates user selecting if they have a spouse or partner.

FIG. 13 depicts an exemplary spouse status page 1300 of GUI 301, which may be opened via about me link 1208, and facilitates user 102 selecting if they have a spouse or partner. More specifically, user 102 may identify a spouse or partner using selector 1302. FIG. 14 depicts the exemplary spouse status page 1300 with a spouse detail region 1400. In response to indicating a spouse/partner, spouse status page 1300 is enlarged to include spouse detail region 1400 to capture spouse data, as shown in FIG. 14.

Spouse detail region 1400 is configured to capture spouse data from user 102. In the example embodiment, in response to user 102 indicating that he or/she has a partner using selector 1302, and spouse detail region 1400 prompts user 102 for additional spouse data, such as first name 1404, birthdate 1406, gender 1408, salary 1412, desired retirement age (e.g., retirement goal) 1414, and income replacement 1416. Spouse data captured by spouse detail region 1400 may be used by replacement income module 212 and benefits module 210 to calculate income needed in retirement and/or spouse-based social security benefits.

Spousal status page 1300 is configured to facilitate the transmission of spouse data through continuation request 1420. Continuation request 1420 is also configured to facilitate access to another page, such as dependent status page 1500 (shown in FIG. 15). Alternatively, the back button 1422 may be used to discard changes.

Figure 15:
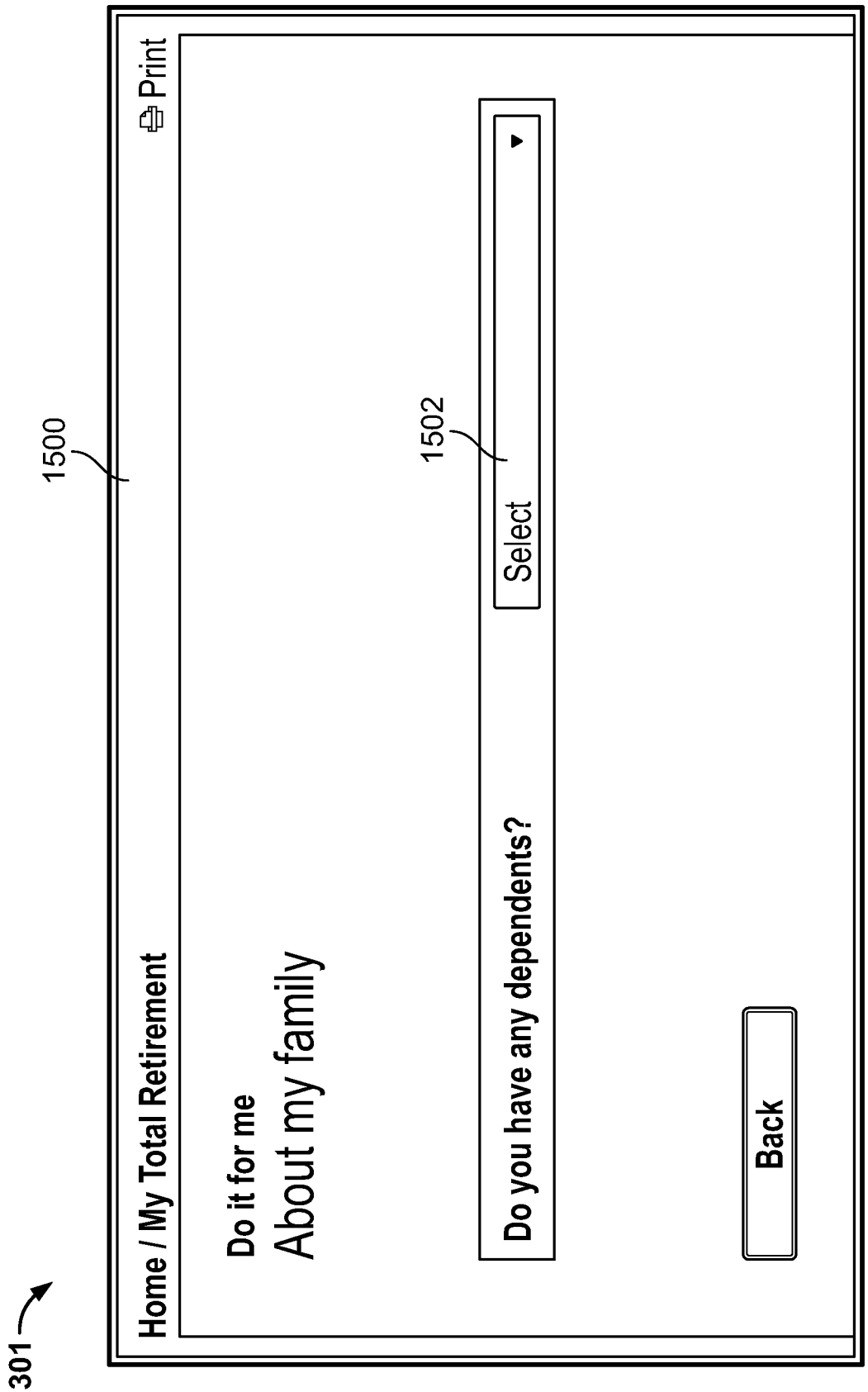
FIG. 15 depicts an exemplary dependent status page.

FIG. 15 depicts an exemplary dependent status page 1500. Dependent status page 1500 of GUI 301 may be opened using about my family information link 1210 and facilitates user 102 identifying if they have dependents, such as young children or special needs relatives. More specifically, user 102 may identify dependents using selector 1502. FIG. 16 depicts the dependent status page 1500 with a dependent detail region 1600. In response to indicating at least one dependent using selector 1502, dependent status page enlarges to include dependent detail region 1600 to capture dependent data, as shown in FIG. 16.

Dependent detail region 1600 is configured to capture dependent data from user 102, such as the name and age of any dependents. In the example embodiment, two dependents are reported, with ages 12 and 7. Dependent detail region 1600 includes first name fields 1604, and adjacent birthdate fields 1606, for a number of potential dependents. Fields for additional dependents may be added with link 1612. Dependent data is transmitted to server computing device 114 in response to save link 1614 being selected. Alternatively, changes may be discarded using back link 1616.

FIG. 17 depicts an exemplary asset status page 1700. Asset status page 1700 of GUI 301 may be opened using assets link 1214 and facilitates user 102 reporting assets, such as other retirement plans, pensions, and the like. For example, user 102 may report an individual retirement account, which may be used to project additional investment income in retirement. Asset status page 1700 displays asset examples 1702 to user 102. Add now link 1704 facilitates user 102 reporting detailed investment assets, which may be used by investment income module 206.

Figure 48:
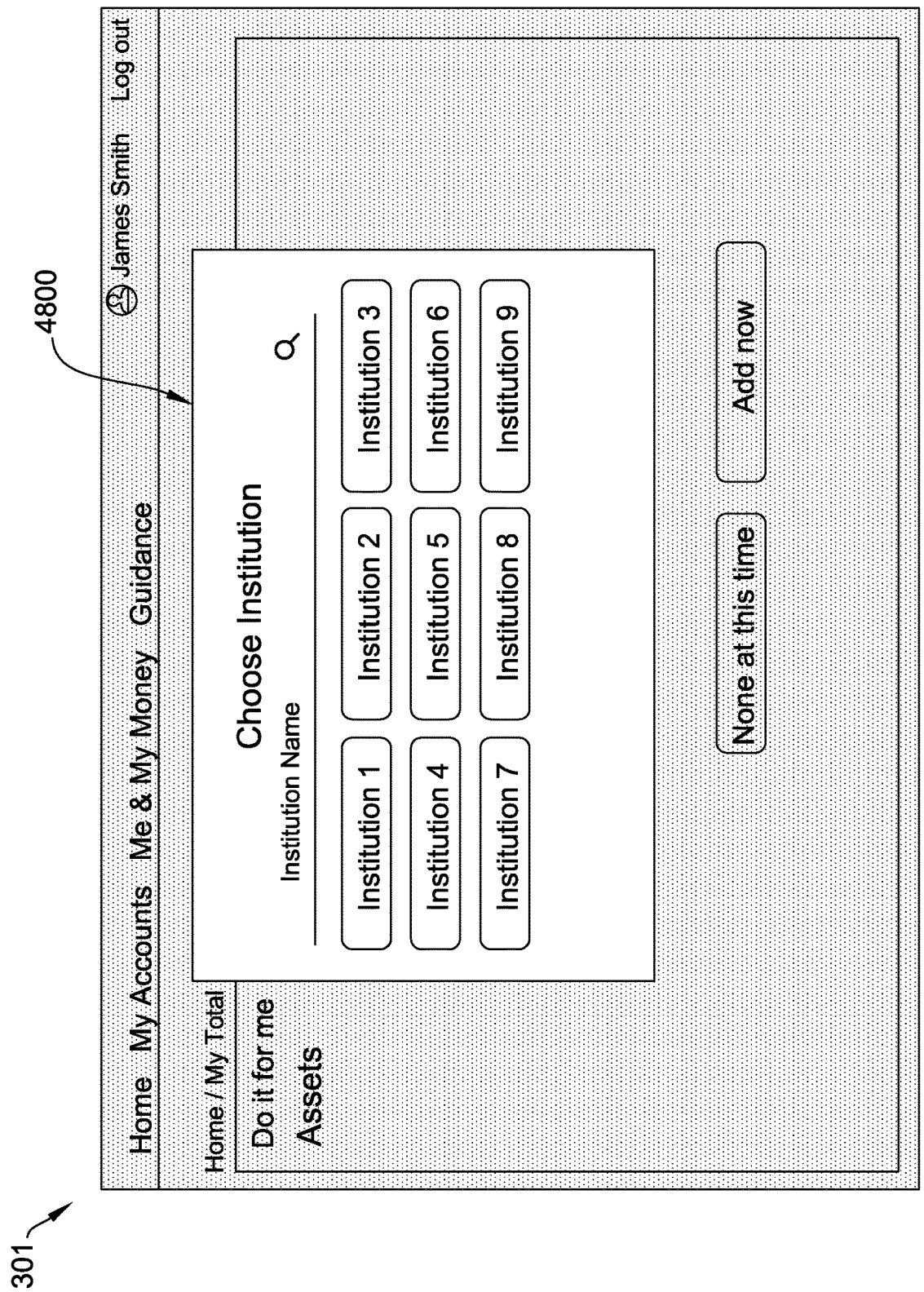
FIG. 48 depicts an exemplary institution selection page that allows the user to identify a third-party institution which may manage investments of the user.
Figure 49:
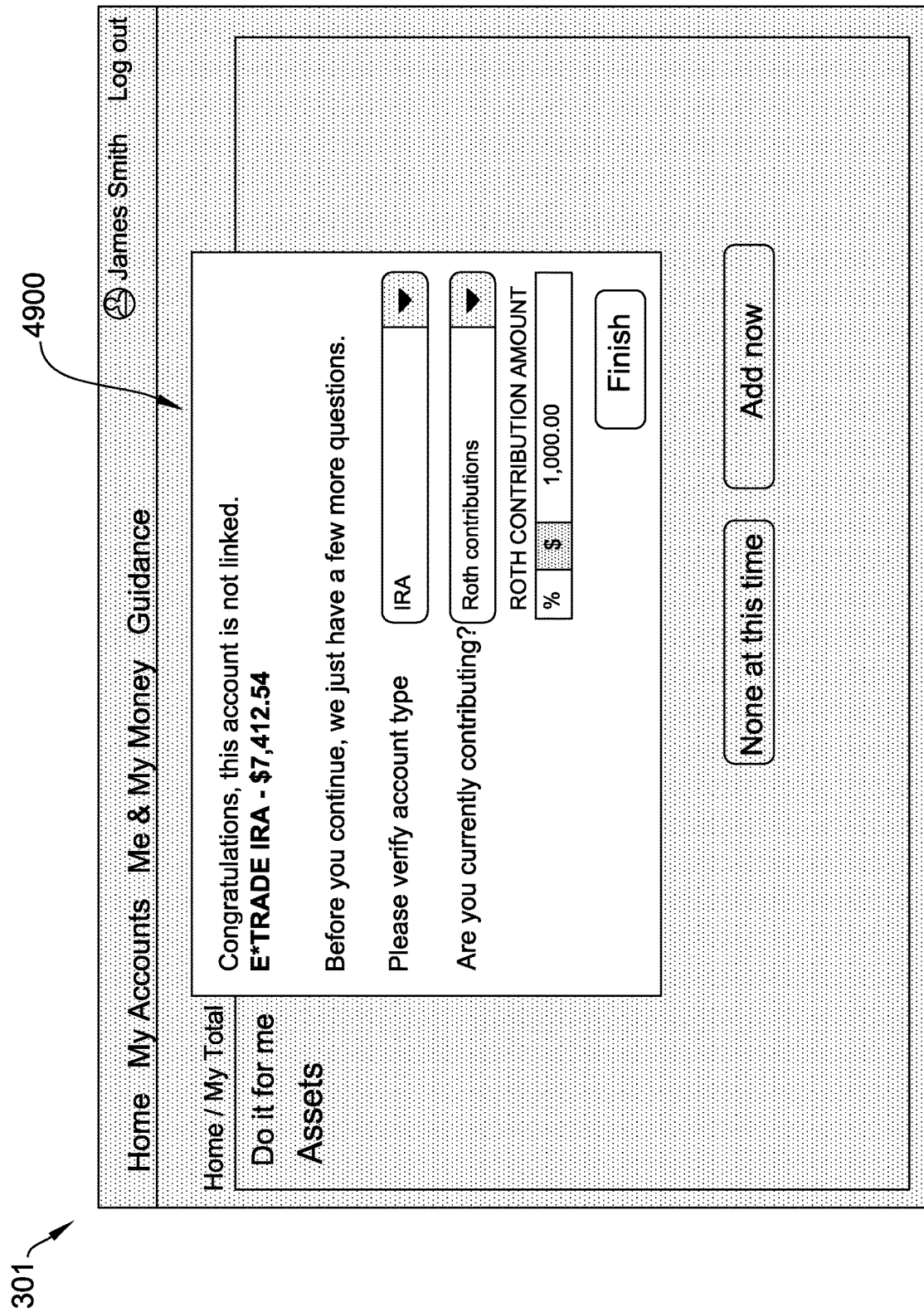
FIG. 49 depicts an exemplary account link page that allows the user to identify information about a linked account.
Figure 54:
FIG. 54 is an exemplary assets page that allows the user to add and view their accounts.

After selecting add now link 1704, user 102 is directed to an add asset page 5000, a first embodiment of which is shown in FIG. 50 and an alternative "pop-up" embodiment 5600 of which is shown in FIG. 56, where user 102 has the ability to enter data corresponding to the asset being added. For example, user 102 may enter information corresponding to the following data fields: the account owner, the account type, the account provider, what type of contribution (e.g., pre-tax contribution, Roth contribution, post-tax contribution, mix contribution, and no contributions) participant is currently contributing, the amount of the contribution if there is one, how is the account invested, and the account balance. GUI computer system 114 uses the account provider field to differentiate between multiple accounts that the participant may hold and are stored in database 120. When entering the account provider, GUI 301 is configured to perform an auto complete list on the account provider field, so that user 102 may select from the account provider from a dropdown list. If the account provider is not listed on the auto complete list, user 102 may enter the account provider manually. Other data fields may be configured to display an auto complete list that mitigates incorrect data entry enabling the system to collect and store accurate data. Details of other data entry fields on the add asset page 5000 are shown in FIGS. 51-53. In some embodiments, GUI 301 further enables a user to identify and link existing investment accounts held by the user at third-party institutions, as shown in FIGS. 48 and 49. An other-assets summary page 5400 after data entry is completed is illustrated in FIG. 54.

Figure 18:
FIG. 18 depicts an exemplary supplemental income page.

FIG. 18 depicts an exemplary supplemental income page 1800. Supplemental income page 1800 of GUI 301 may be opened using income in retirement link 1216 and facilitates user 102 identifying supplemental retirement income, such as part time employment or rental income. For example, seasonal rental income may be reported, which may offset the need for investment retirement income. Supplemental income page 1800 includes income examples 1802. Yes link 1804 facilitates user 102 reporting retirement income, which may be used by replacement supplemental income module 212.

FIG. 19 depicts an exemplary supplemental income detail page 1900. Supplemental income detail page 1900 of GUI 301 may be opened using yes link 1804, and facilitates user 102 detailing supplemental retirement income. For example, projected hobby income during retirement may be reported, which may offset expenses in retirement. In some embodiments, replacement income module 212 adjusts supplemental income based on inflation. User 102 may identify user 102 or the user's spouse as the income source using earner identifier 1902, and provide income description 1904. User 102 further identifies if the income is a pension 1908, and if the income is taxable 1914. Based on pension identifier 1908 and taxable identifier 1914, estimated annual amount 1906 may be adjusted. More specifically, replacement income module 212 may adjust amount 1906 based on cost of living adjustment identifier 1910, and adjustment amount 1912. Estimated dates of retirement 1916 and life expectancy 1918 may also be input for use by projection and optimization modules 152.

Supplemental income detail page 1900 is configured to facilitate the transmission of supplemental income data through save preferences button 1920. Save preferences button 1920 is also configured to facilitate access to another page, such as supplemental income page 1800 (shown in FIG. 18). Alternatively, the cancel button 1922 may be used to discard changes.

FIG. 20 depicts an exemplary supplemental income summary region 2000 as a part of the supplemental income page 1800. In response to entry of supplemental income using page 1900, supplemental income page 1800 is updated to include supplemental income summary region 2000, which is configured to display a summary of supplemental retirement income information submitted by user 102. For example, previously submitted sources of supplemental retirement income may be displayed in a list. In the example embodiment, the display includes a supplemental income identifier 2002, supplemental income amount 2004, and date updated 2006 for each source of supplemental income previously input by the user. For example, supplemental income identifier 2002 includes the name of user 102 received from user identifier 1902 (shown in FIG. 19) and the description of the supplemental income received from income description 1904 (shown in FIG. 19). Supplemental income amount 2004 includes the estimated annual amount of income received from estimated annual amount 1906 (shown in FIG. 19.).

Supplemental income summary region 2000 is also configured to allow the user to add more sources of supplemental income through add income request 2008. In some embodiments, add income request 2008 is configured to bring the user to supplemental income detail page 1900 (shown in FIG. 19). Supplemental income summary region 2000 is further configured to allow the user to complete the income in retirement reporting process through completion button 2010. Completion button 2010 allows the user to access another page in the financial advisory system interface, such as savings goals page 224 or savings goals page 2100.

Figure 21:
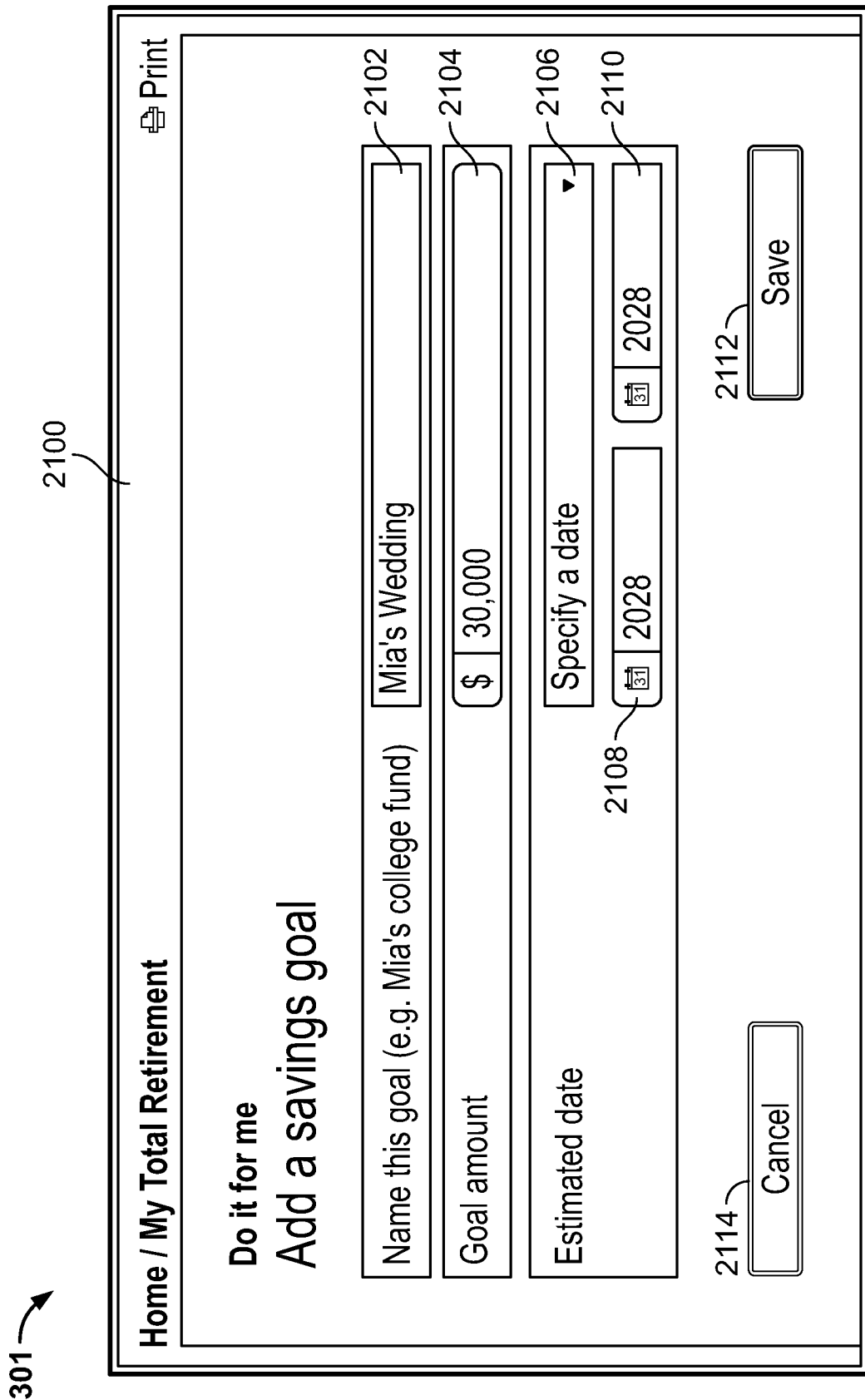
FIG. 21 illustrates savings goals page of GUI, which may be opened using savings goals link and is configured to allow user to add additional savings goals which may or may not be related to retirement.

FIG. 21 illustrates savings goals page 2100 of GUI 301, which may be opened using savings goals link 1218 and is configured to allow user 102 to add additional savings goals which may or may not be related to retirement. For example, savings goals page 2100 allows user 102 to add a goal to save a certain amount of money for a dependent's wedding by a certain date in the future. Savings goals page 2100 is configured to capture information from the user, including a name for the goal through goal description input 2102, a goal amount through goal amount input 2104, and a goal date through estimated goal date inputs 2106, 2108, and 2110. Savings goals page 2100 is also configured to allow the user to save the input information through save button 2112, or alternatively discard any changes using cancel button 2114. Save button 2112 is also configured to allow the user to access another page in the financial advisory system interface, such as savings goals summary 2200.

FIG. 22 illustrates savings goals summary page 2200 of GUI 301, which is configured to display a summary of savings goals input by user 102 in response to selection of save button 2112. For example, previously submitted savings goals may be displayed in a list. In the exemplary embodiment, GUI 301 causes to be displayed a savings goal identifier 2202, savings goal amount 2204, savings goal date 2206, and a date updated 2208 for each savings goal previously input by the user. For example, savings goal identifier 2202 includes the name for the goal captured by goal description input 2102 (shown in FIG. 21). Savings goal amount 2204 includes the goal amount captured by goal amount input 2104 (shown in FIG. 21). Savings goal date 2206 includes the goal date captured through estimated goal date inputs 2106, 2108, and 2110 (all shown in FIG. 21).

Savings goals summary page 2200 is also configured to allow the user to add more savings goals through add a goal request 2210. In some embodiments, add a goal request 2210 is configured to bring the user to savings goals page 2100 (shown in FIG. 21). Savings goals summary page 2200 is further configured to allow the user to complete the savings goals reporting process through completion button 2212. Completion button 2212 allows the user to access another page in GUI 301, such as investments page 226 or investments page 2300.

In the example embodiment, each of About me page 1200, retirement summary page 2000, and savings goals summary page 2200 includes estimated income widget 1130, as discussed above. Thus, on each of these pages, the user is provided with an immediate, dynamically updated summary of the impact of each update to database fields related to personal profile information 1202, financial information 1204, and retirement expenditures information 1206, without requiring the user to navigate back to dashboard page 1100 or a different account summary page.

FIG. 23 depicts investments page 2300 of GUI 301, which may be opened using investments link 1104 (shown in FIG. 11) and displays graphical and numeric descriptions of the composition of the user's 102 financial account. The investments page 2300 allows users to view aspects of their current investment strategy. The user can view their investments at the total portfolio level as well as view the details of each of their accounts. The account detail view displays all of the user's accounts that are associated with a group client, as well as any outside accounts that they have entered. The user may also update their outside assets from an account details view. GUI 301 causes to be displayed on investments page 2300 financial information based on user profile data and account data. Specifically, investments page 2300 is configured to display asset data, such as bond and equity composition 2304 of user's 102 assets, and optimized allocation strategy 2316.

In some embodiments, bond and equity composition 2304 is determined by return calculations module 204 (shown in FIG. 2) based on asset data such as asset identifiers and asset compositions. Planning engine 150, in some embodiments through return calculations module 204, is configured to generate a graphic composition display 2306 which graphically displays the adjacent numerical values.

Figure 25:
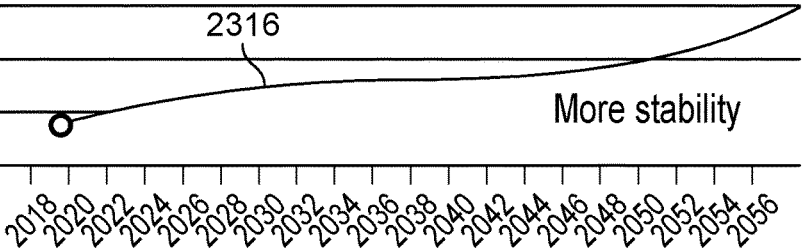
FIG. 25 depicts an exemplary fund composition within the investments page.

Investments page 2300 is also configured to allow the user to select from a number of ways to display financial information. Specifically, investments page 2300 includes display options 2308, 2310, and 2312. In the exemplary embodiment, display option 2308 is configured to display bond and equity composition 2304 through investments page 2300, as shown in FIG. 23. FIG. 24 depicts an exemplary asset class composition 2404 within the investments page 2300. Display option 2310 is configured to display asset class composition 2404 both numerically and graphically via graphic composition display 2306. FIG. 25 depicts an exemplary fund composition 2504 within the investments page 2300. Display option 2312 is configured to display fund composition 2504 both numerically and graphically via graphic composition display 2306.

Investments page 2300 is also configured to display a stability graph section illustrating a stability of the selected investment strategy over time in a "glide path" 2314, which displays a graphical representation of asset allocation (e.g., ordinate or Y-axis, in units of risk level) over time (e.g., abscissa or X-axis, in units of time). Optimized allocation strategy 2316 represents the optimal asset allocation over time. Glide path 2314 shows how the asset allocation of their enrolled accounts will be allocated to fixed income from the current year until life expectancy, illustrating investment strategy stability over time for the recommended investment strategy. In some embodiments, glide path 2314 may be modified with an override risk level (e.g., as shown and described below with respect to FIG. 27). Optimized allocation strategy 2316 is determined by planning engine 150, in some embodiments by return calculations module 204, based on user profile data and account data, such as demographic data (e.g. age) and asset data. In the example embodiment, the ordinate includes designations of investment strategy risk graded from most aggressive at the abscissa to most conservative away from the abscissa, which configures glide path 2314 to directly illustrate to the user an increase in stability over time.

Investments page 2300 is further configured to facilitate user 102 viewing alternative financial information through detail selection 2302. Detail selection 2302 allows the user to select between different options for the type of information displayed on investments page 2300. Investments page 2300 is also configured to facilitate user configuration of settings through constraints option 2318. Constraints option 2318 is configured transmit to another web page, such as investment constraints page 2600 (shown in FIGS. 26 and 27) of GUI 301, to user 102. In some embodiments, asset class composition 2404 is determined by return calculations module 204 (shown in FIG. 1B) based on asset data such as asset identifiers and asset compositions.

Investment page 2300 is also configured to enable user 102 to select, for example, composition display 2306, such as by hovering a pointer over composition display 2306, to view an investment type and corresponding percentage of the total investments depicted in composition display 206. For example, user 102 may hover over composition display 2306, such as a pie chart, where the color of the region being hovered enhances and/or changes, and a percentage and type of investment of the region being hovered are displayed.

Figure 26:
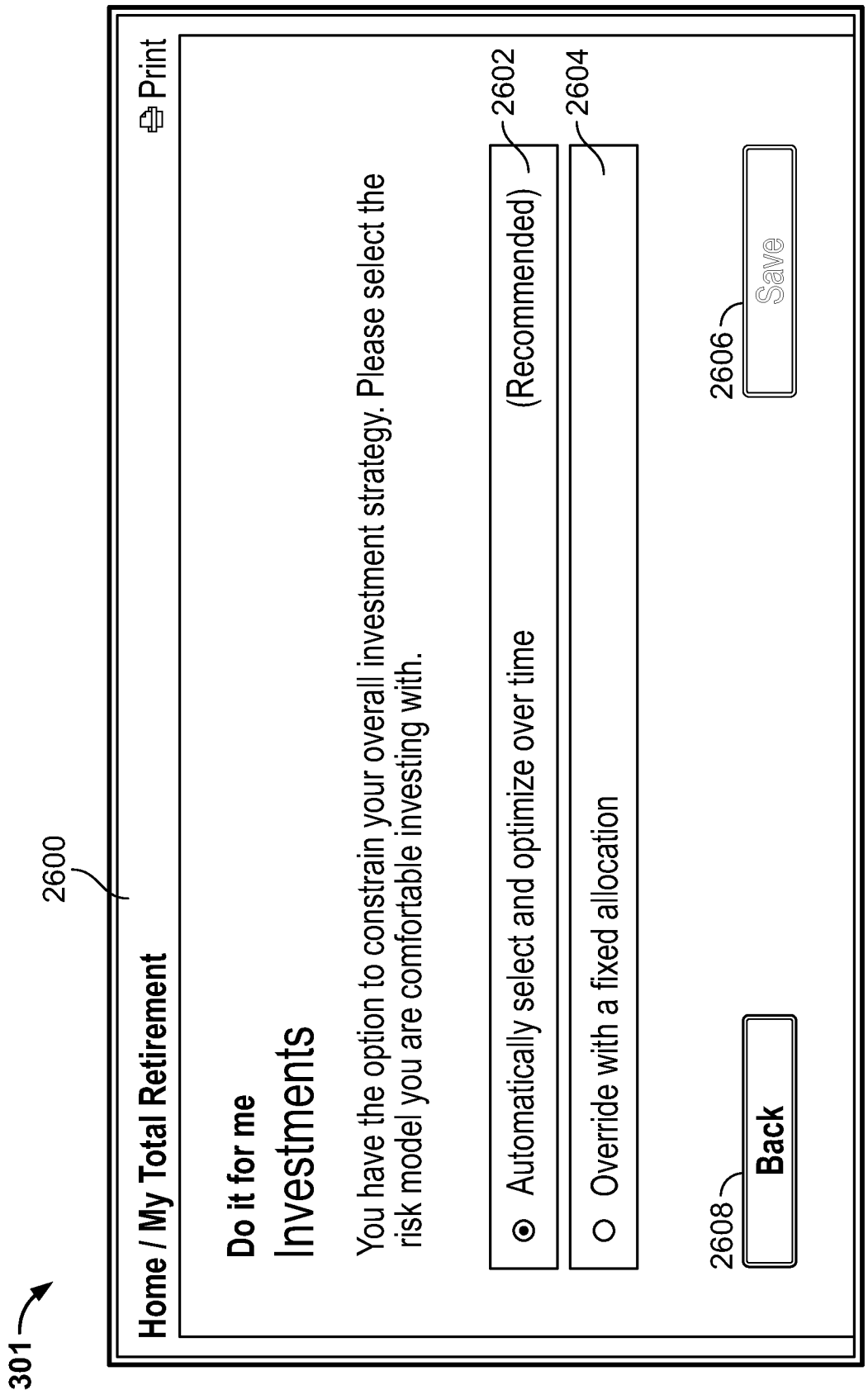
FIG. 26 depicts an exemplary constraints page for updating preferred constraints used by planning engine for determining financial projections.
Figure 27:
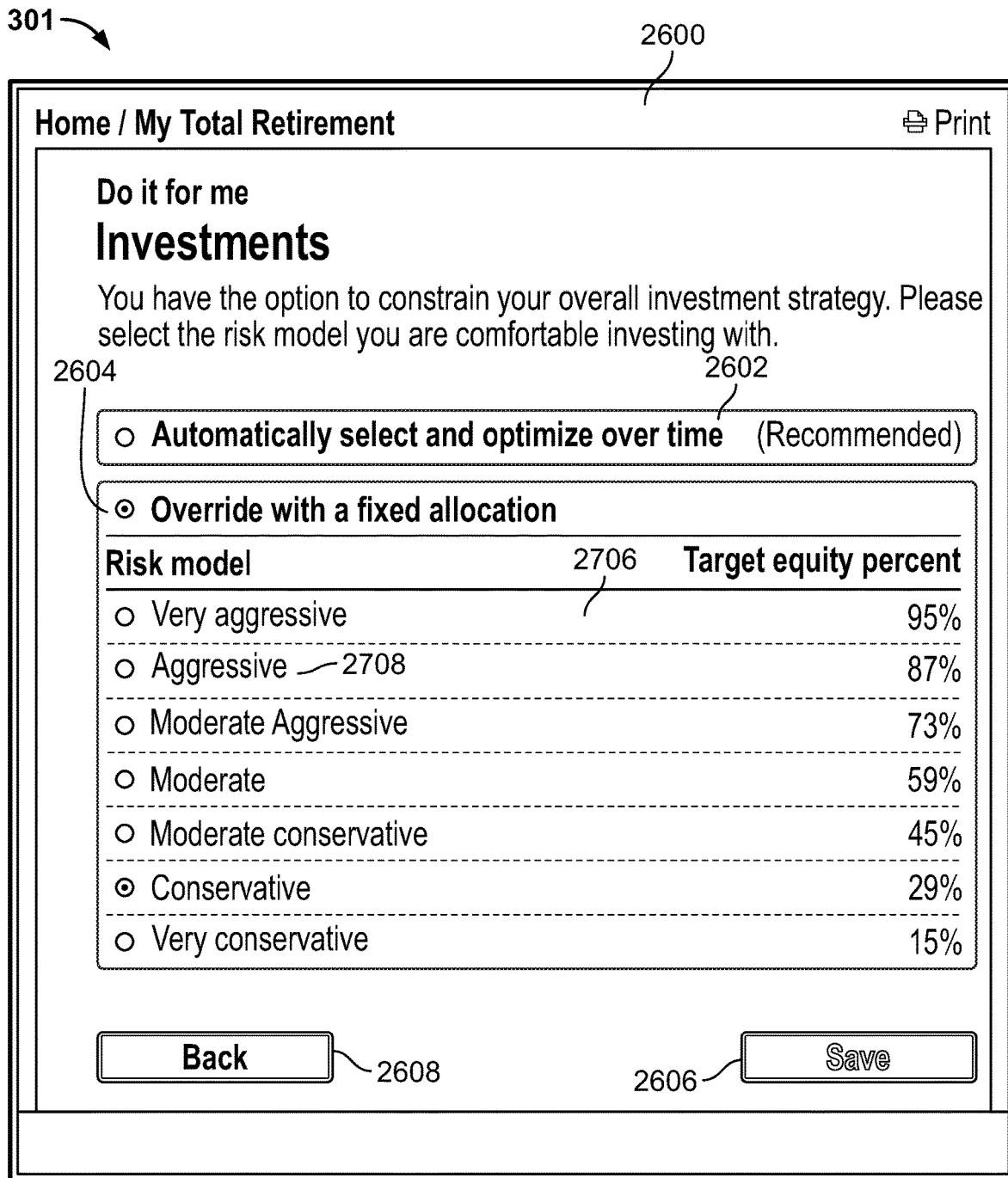
FIG. 27 depicts an exemplary strategy selection options and strategy selection indicators within the constraints page.

FIG. 26 depicts an exemplary constraints page 2600 for updating preferred constraints used by planning engine 150 for determining financial projections. Specifically, constraints page 2600 facilitates the user 102 selecting an investment strategy preference and an allocation preference. In the exemplary embodiment, user 102 can select from two investment strategy preferences: optimization option 2602 or manual option 2604. Optimization option 2602 is configured to cause planning engine 150 to determine an optimized allocation strategy based on user profile data and account data, such as age and asset composition. In some embodiments, planning engine 150 determines the optimal asset allocation strategy through return calculations module 204 (shown in FIG. 1B). FIG. 27 depicts an exemplary strategy selection options 2706 and strategy selection indicators 2708 within the constraints page 2600. Selection of manual option 2604 enlarges constraints page 2600 to display allocation options, such as strategy selection options 2706 labeled with strategy selection indicators 2708 (shown in FIG. 27) to facilitate the manual selection of a particular investment strategy by user 102. In the exemplary embodiment, strategy selection options 2706 are risk-based investment strategies based on a percentage of user's 102 portfolio which is invested in equities vs bonds. For example, a "very aggressive" strategy indicates a preference for 95% equities, while a "moderate" strategy indicates a preference for 59% equities. Planning engine 150, using return calculations module 204 in some embodiments, determines asset allocations based on the selected strategy option and other user profile data and account data.

In an alternative embodiment, strategy selection options 2706 are investment strategies based on a percentage of a user's profile which is invested in a particular asset class or fund. For example, a "very aggressive" strategy may indicate a preference for 50% of the portfolio to be placed in tech stocks. In another example, a "moderate" strategy may indicate a preference for 50% of the portfolio to be spread out evenly among a variety of funds.

Constraints page 2600 is configured to facilitate the transmission of investment strategy preference through save preferences button 2606. Save preferences button 2606 is also configured to facilitate access to another webpage, such as strategy change summary 2800 (shown in FIG. 28). Alternatively, the back button 2608 may be used to discard changes.

Figure 28:
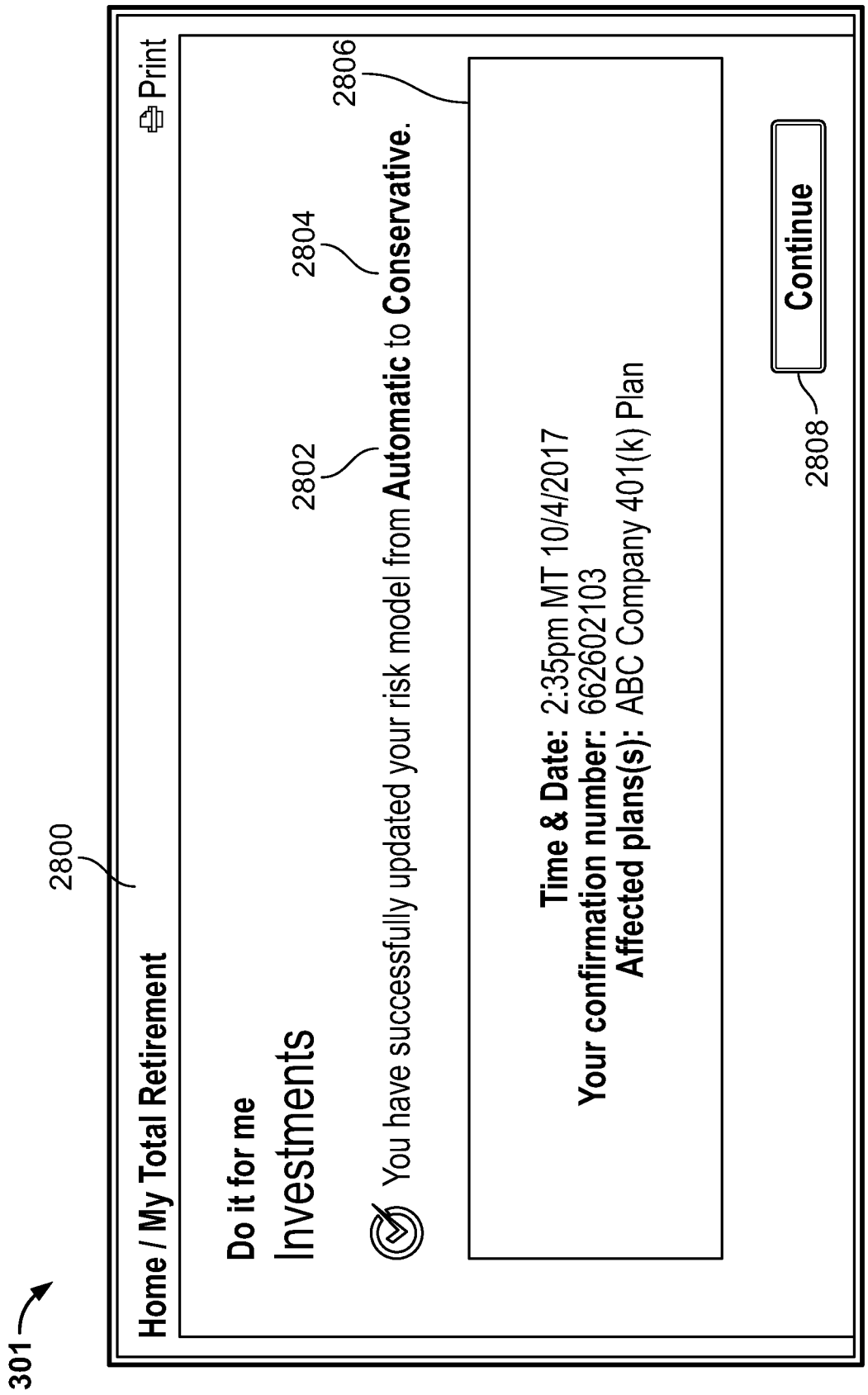
FIG. 28 depicts an exemplary strategy change summary page of GUI for displaying a summary of changes made to a user's investment strategy in response to selection of save preferences button.

FIG. 28 depicts an exemplary strategy change summary page 2800 of GUI 301 for displaying a summary of changes made to a user's 102 investment strategy in response to selection of save preferences button 2606. In the example embodiment, strategy change summary page 2800 displays a summary of changes to constraint preferences, for example, choosing a different optimization option 2602 or 2604 (shown in FIG. 26) or a different strategy selection option 2706 (shown in FIG. 27).

Strategy change summary page 2800 is configured to display a previous strategy indicator 2802 and a current strategy indicator 2804, which are updated based on changes to the investment strategy selected by user 102. Strategy change summary page 2800 is further configured to display change confirmation 2806. Change confirmation 2806 includes confirmation information which may be helpful for facilitating documentation of the change of strategy. In the example embodiment, change confirmation 2806 includes a date and time, a confirmation number, and an affected plan.

Strategy change summary 2800 is also configured to facilitate access to another webpage, such as update 2900 to investments page 2200, through continue request 2808.

Figure 29:
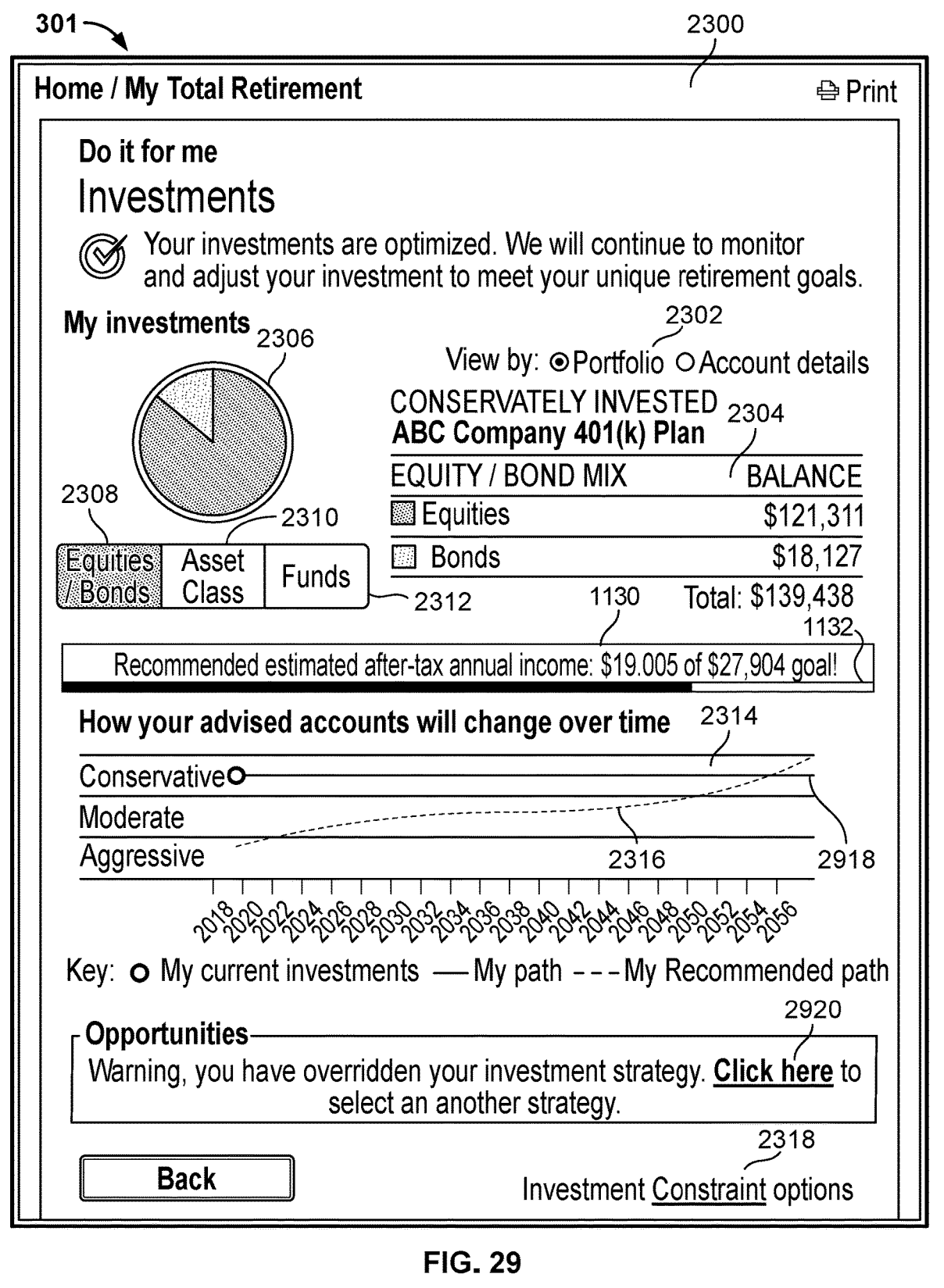

FIG. 29 depicts an exemplary update to investments page 2300 of GUI 301 (shown in FIGS. 23-25) in response to selection of one or more strategy selection options 2706.

The update is configured to display additional information in glide path 2314, which displays a graphical representation of asset allocation over time as described above. More specifically, manual allocation strategy 2918 graphically represents the user defined investment strategy, based on captured asset strategy preference data, and is overlaid on optimized allocation strategy 2316, which represents the optimal asset allocation strategy over time, as described above. Thus, the update enables the user to graphically compare the manually selected option 2706 to the optimized allocation strategy 2316 calculated by planning engine 150. In the example embodiment, the update causes optimal allocation strategy 2316 to appear as a dashed or muted line to indicate it is no longer the active strategy.

Figure 30A:
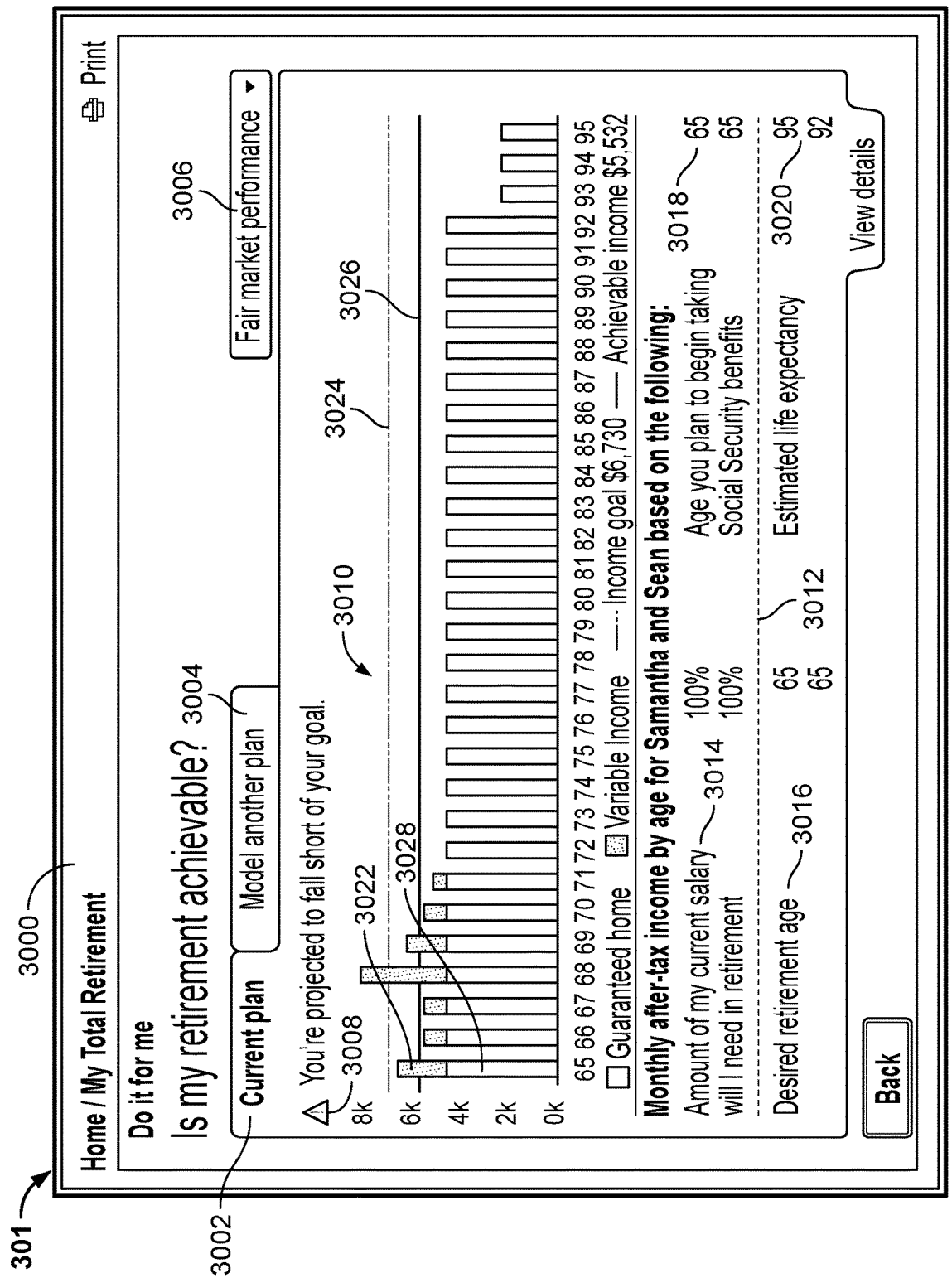
FIG. 30A depicts retirement summary page of GUI, which may be opened using income planning link and displays projected replacement income compared to a retirement goal.

The update also causes to be displayed a strategy alert 2920 on investments page 2300 in response to the user-selected investment strategy. In the example embodiment, GUI 301 causes to be displayed alert 2920 upon reception of a strategy selection option 2706 captured from user 102. Specifically, when user 102 elects to manually choose a strategy selection option 2706, strategy alert 2920 is displayed. Strategy alert 2920 provides a link to re-access investment strategy settings, which may include re-transmitting constraints page 2600 (shown in FIG. 26), in the event that the user decides to under the manual strategy selection FIG. 30A depicts retirement summary page 3000 of GUI 301, which may be opened using income planning link 112 and displays projected replacement income compared to a retirement goal. For example, user 102 may review the projected income replacement generated by their current contributions and retirement savings, and evaluate the annual projected retirement income.

Retirement summary page 3000 includes a current plan tab 3002 and a plan model tab 3004. In FIG. 30A, current plan tab 3002 is selected and displays data based on current financial data such as salary contributions, and asset allocations. Goal indicator 3008 is displayed in response to replacement income module 212 comparing the retirement goal to the projected retirement income. In the example embodiment, the retirement income is not projected to meet the retirement goal, so goal indicator 3008 indicates as much.

A projected retirement income graph 3010 is generated by advisory rules engine 202, using investment income module 206 and benefits module 210. Guaranteed income 3028 (e.g., annuities, social security, defined-benefit pensions) and variable income 3022 (e.g., investment income) are generated and displayed for each year of retirement in a two-color bar graph. In some embodiments, retirement income graph 3010 may further include retirement income goal 3024 and average projected annual income 3026. In the example embodiment, income goal 3024 is generated based on replacement income module 212. For example, income goal 3024 may be projected based on a portion of salary income at retirement. Average projected annual income 3026 (e.g., achievable income) defines an average expected investment income (e.g., average yearly income throughout the life expectancy of the user, from an optimal spend-down strategy based on the income factors of the user).

A current plan tab 3002 of retirement summary page 3000 also includes income factor information 3012 for user 102 and, in some embodiments, the spouse/partner of user 102. Replacement income percentages 3014 define a percentage of the projected salary at retirement needed for expenses in retirement. In the example embodiment, 100% of the salaries of user 102 and user 102's spouse are projected to be needed in retirement. Benefit age 3018 defines a projected age when user 102 and user 102's spouse begin receiving retirement benefits, such as a pension or social security. Similarly, retirement age 3016 defines a desired retirement age for user 102 and user 102's spouse. Additionally, estimated life expectancy 3020 defines a final year for which retirement income will be needed, and a number of years where partial retirement income may be needed, based on a reduced household.

Figure 30B:
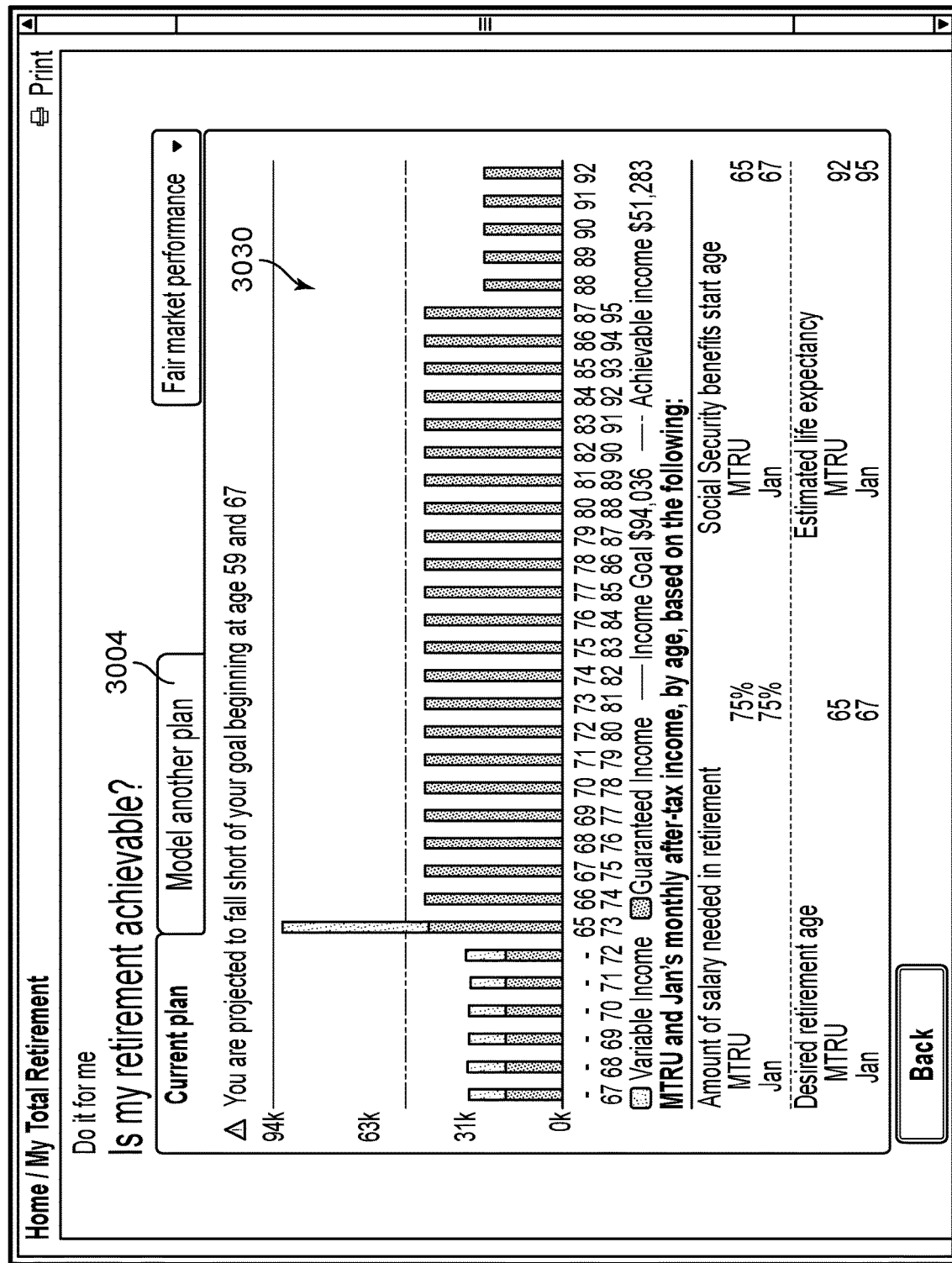
FIG. 30B illustrates another example projected retirement income graph similar to graph.

Projected retirement income graph 3010 is configured such that user 102 may select any year to view additional retirement income detail, such as the benefit and/or investment income for each year. In the example embodiment shown in FIG. 30A, the age of the user (e.g., the primary account holder) is displayed as the x-axis of projected retirement income graph 3010. FIG. 30B illustrates another example projected retirement income graph 3030 similar to graph 3010. In the example embodiment, the primary account holder has a spouse, and the spouses age is illustrated as a second x-axis of the graph 3030, immediately below the age values of the user.

Figure 31:
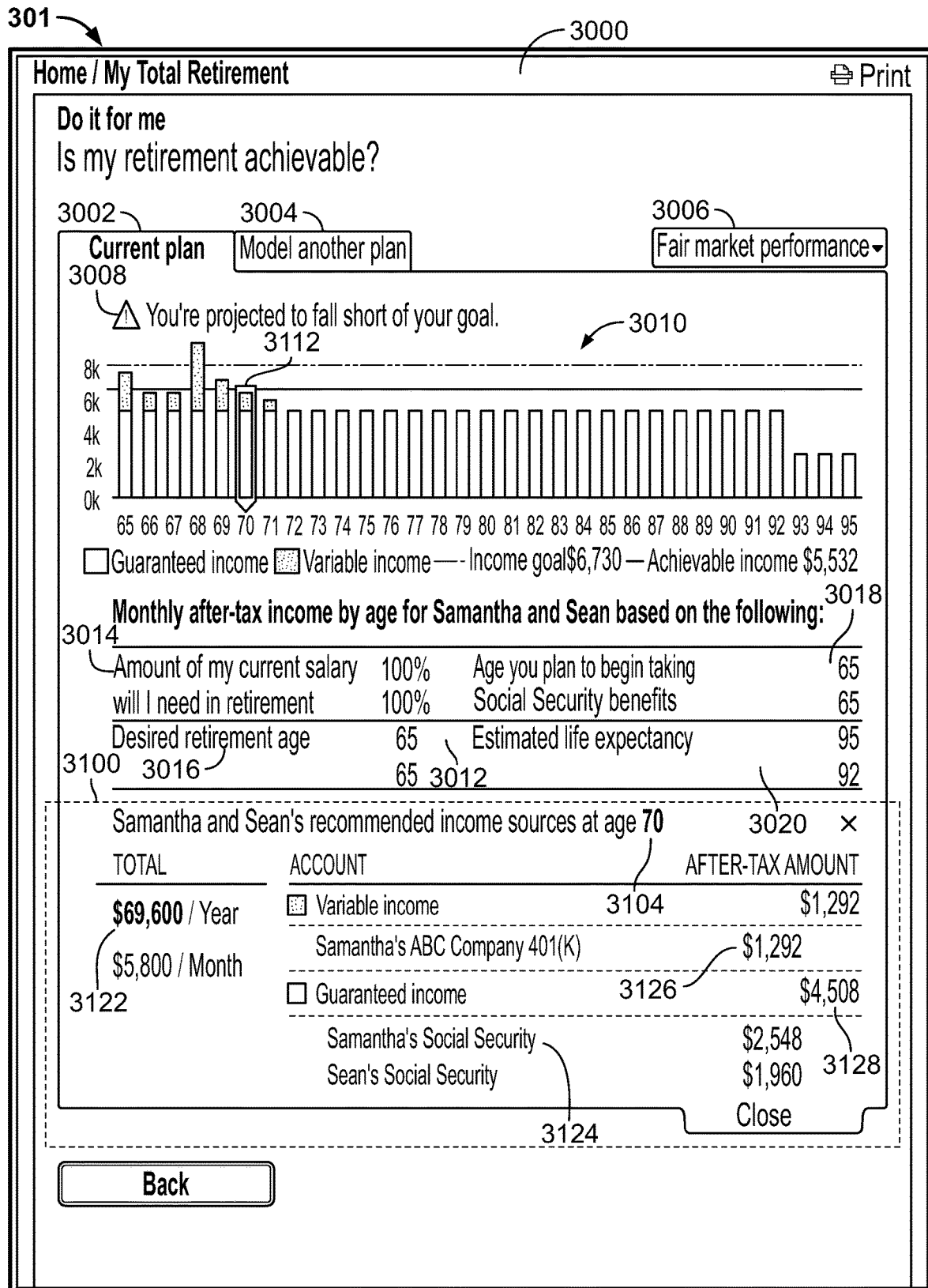
FIG. 31 depicts a current plan tab of retirement summary page enlarged to show an income detail region in response to user selecting a retirement year on retirement summary page.

FIG. 31 depicts a current plan tab 3002 of retirement summary page 2000 enlarged to show an income detail region 3100 in response to user 102 selecting the individual bar of the graph corresponding to a retirement year on retirement summary page 3000. For example, user 102 selects the year of interest by hovering a pointer over the corresponding bar. User 102 may review the investment income and/or benefit income projection generated by planning engine 150 in a specific year of retirement. For example, the income from retirement plans and social security may change over time. In the absence of a selection, the alphanumeric display in income detail region 3100 is for a default year, such as the initial year of retirement.

After user 102 selects a retirement year 3112 from projected retirement income graph 3010, income detail region 3100 is generated by GUI 301. Income detail region 3100 includes year identifier 3104, variable income (e.g., investment income) 3126, guaranteed income 3128 (e.g., benefit income), and projected year income 3122. In the example embodiment, projected 401(k) and social security income are aggregated to calculate a projected annual income at age 70. In the absence of a selection, the retirement year 3112 is set to a default year.

Figure 32:
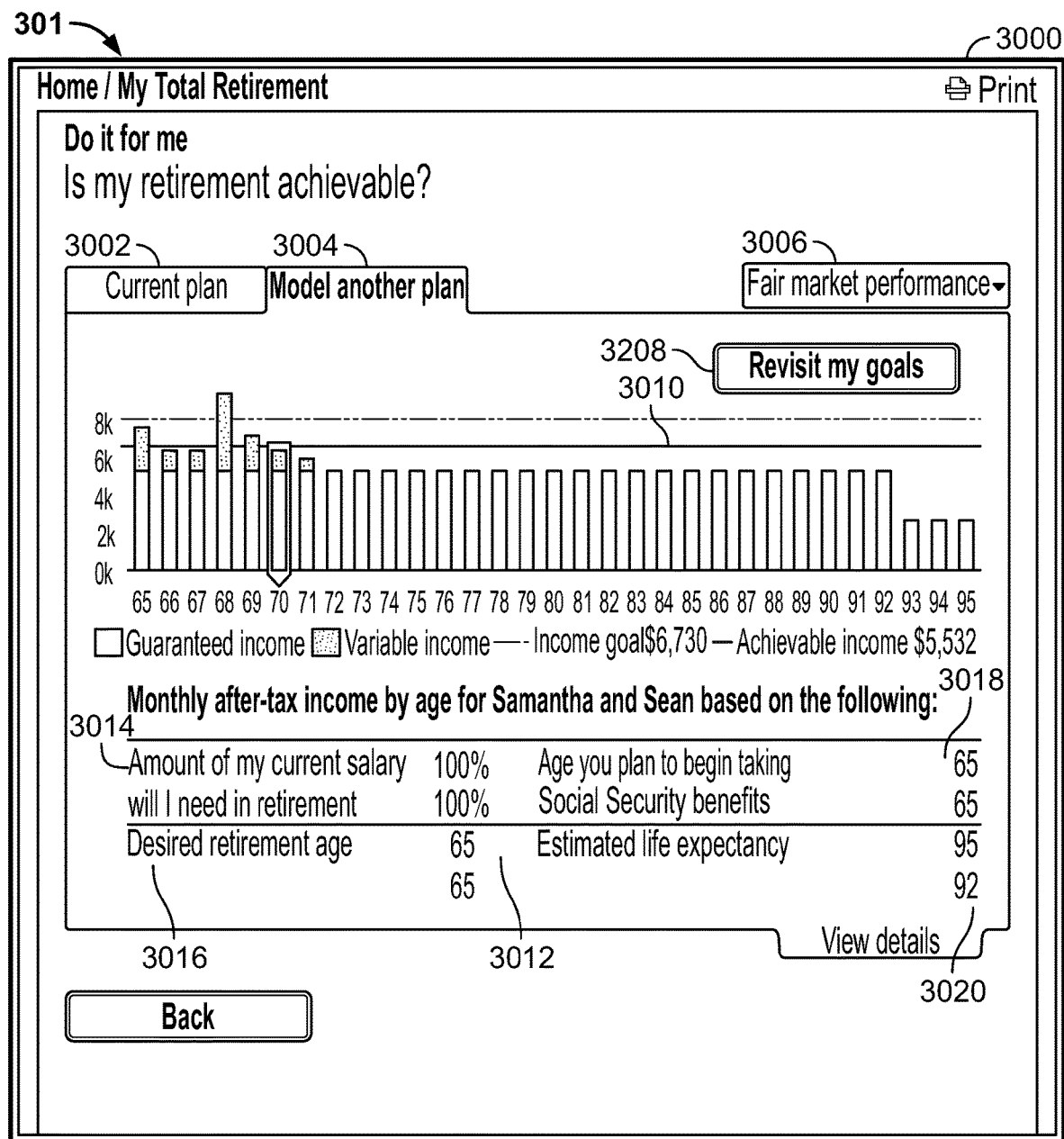
FIG. 32 depicts plan model tab selected on retirement summary page.

FIG. 32 depicts plan model tab 3004 selected on retirement summary page 3000. A revisit my goals link 3208 allows user 102 to modify financial data such as the retirement year, desired retirement age, and average life expectancy. In response to selection of revisit my goals link 3208, a revisiting goal page 3300 pops up, or overlays, retirement summary page 3000, as discussed with respect to FIG. 33. In other words, revisit my goals link 3208 allows user 102 to override calculated values with customized values for modeling purposes. Any overridden values are substituted for the corresponding income factor when modeling. Plan model tab 3004 initially displays projected retirement income graph 3010 based on current plan data. In response to the user inputting modelling values via revisit my goals link 202, planning engine 150 generates a model projected retirement income graph 3410 based on the updated financial data (e.g., retirement year, life expectancy), as shown in FIG. 34. Similarly, plan model tab 3004 initially displays income factor information 3012 as described above from current plan tab 3002, and planning engine 150. In the example embodiment, again using the income factors from the database 120 but having the customized model projected income factor from FIG. 33 substituted for the corresponding database factor, the plan model tab 3004 also displays a model income goal line, similar to income goal 3024, and a model average projected annual income, similar to average projected annual income 3026 (e.g., achievable income). In the example embodiment, the database 120 is not updated with the user's modeled values, unless the user takes additional affirmative action to modify the user's profile. Thus, the user is able to graph various scenarios in the modelling tab 3004, and to toggle back to the actual current plan performance on current tab 3002 for easy visual comparison against the same type of graph in the same display location, without fear of accidentally changing the actual financial account settings.

Figure 33:
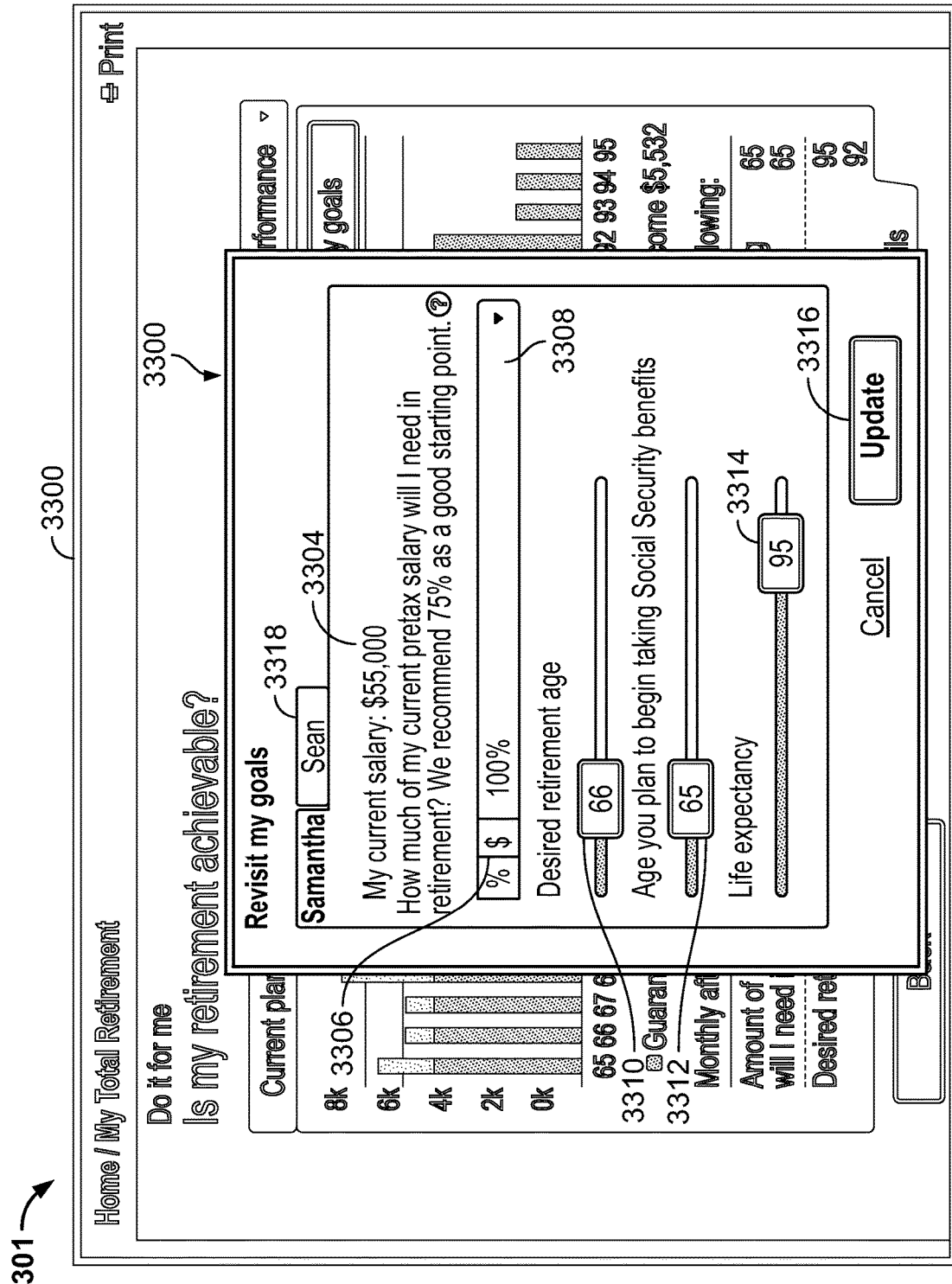
FIG. 33 depicts revisiting goals page, which facilitates user defining a model retirement goal for comparison purposes, by providing financial data such as model replacement income percentage, model retirement age, model social security age, and model life expectancy.
Figure 34:
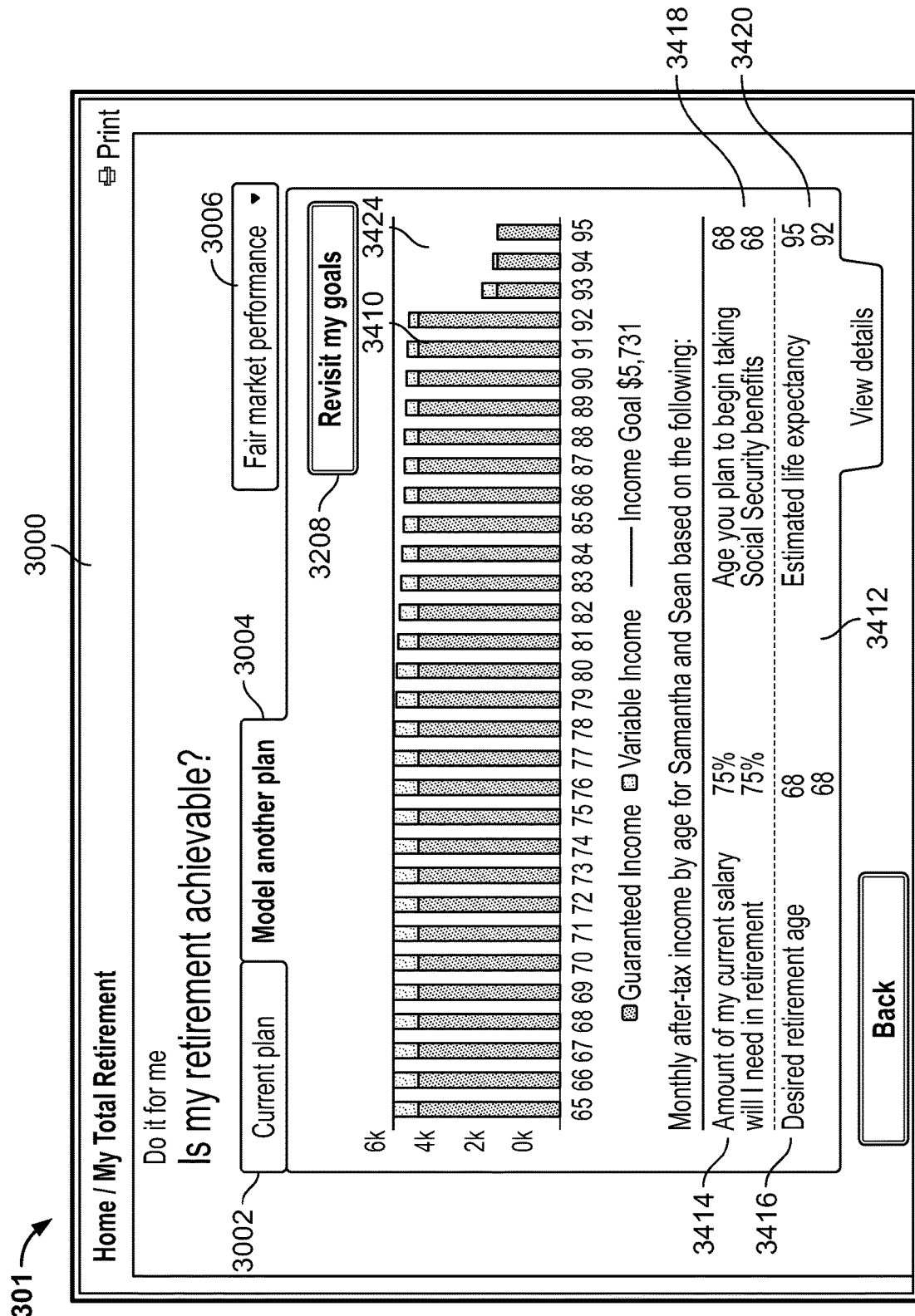
FIG. 34 depicts updated plan model tab.

FIG. 33 depicts revisiting goals page 3300, which facilitates user 102 defining a model retirement goal for comparison purposes, by providing financial data such as model replacement income percentage 3308, model retirement age, model social security age, and model life expectancy. User 102 selects what percentage of their current salary 3304 will be needed in retirement using model income percentage 2208. The desired model retirement age and model social security age may be adjusted using sliders 3310 and 3312. For example, user 102 may desire to model the effects of postponing retirement or an early retirement for comparison purposes. Model life expectancy may be adjusted for user 102 with slider 3314. For example, user 102 may reduce their life expectancy to model new health concerns. In certain embodiments, user 102 may define separate model values for their spouse/partner using tab 3318. More specifically, tab 3318 may include the same fields described above, but associated with the spouse of user 102. Update link 3316 is configured to save the updated model financial data, and trigger planning engine 150 to regenerate the model retirement income graph 3410 and model projected income factor information 3412 (shown in FIG. 34).

FIG. 34 depicts updated plan model tab 3004. In the example embodiment, updated plan model tab 3004 is generated in response to user 102 providing updated model financial data, such as a model retirement age and estimated life expectancy. Modeled retirement income graph 3410 is regenerated by planning engine 150. In the example embodiment, for modelling purposes, user 102 reduced their retirement income percentage to 75%, indicating they would need only 75% of their current salary. Updated plan model tab 3004 includes the updated model income factors 3412, including the replacement income percentage 3414, and model retirement income graph 3410 displays the adjusted retirement goal 3424.

User 102 may also customize the market prediction used to generate values on retirement summary page 3000. For example, user 102 may expect above or below average market growth. Market performance selector 3006 is configured to cause planning engine 150 to regenerate retirement income graph 3410 based on the customized market performance prediction selected by the user. More specifically, market performance selector 3006 may adjust the return rates used by return calculation module 204. For example, user 102 may select poor market performance from market performance selector 3006 to evaluate their ability to retire in poor market conditions. As another example, user 102 may select excellent market performance from market performance selector 3006 to determine if above-average market performance would allow them to meet their retirement goals.

In some embodiments, retirement summary page 3000 including both current plan tab 3002 and plan model tab 3004, with identical formats for projected retirement income graph 3010 and model retirement income graph 3410 and identical formats for income factor information 3012 and projected model income factor information 3412, facilitates GUI 301 providing improved functionality for each of comparison of multiple alternate account options to current account settings across a range of potential market conditions.

Figure 35:
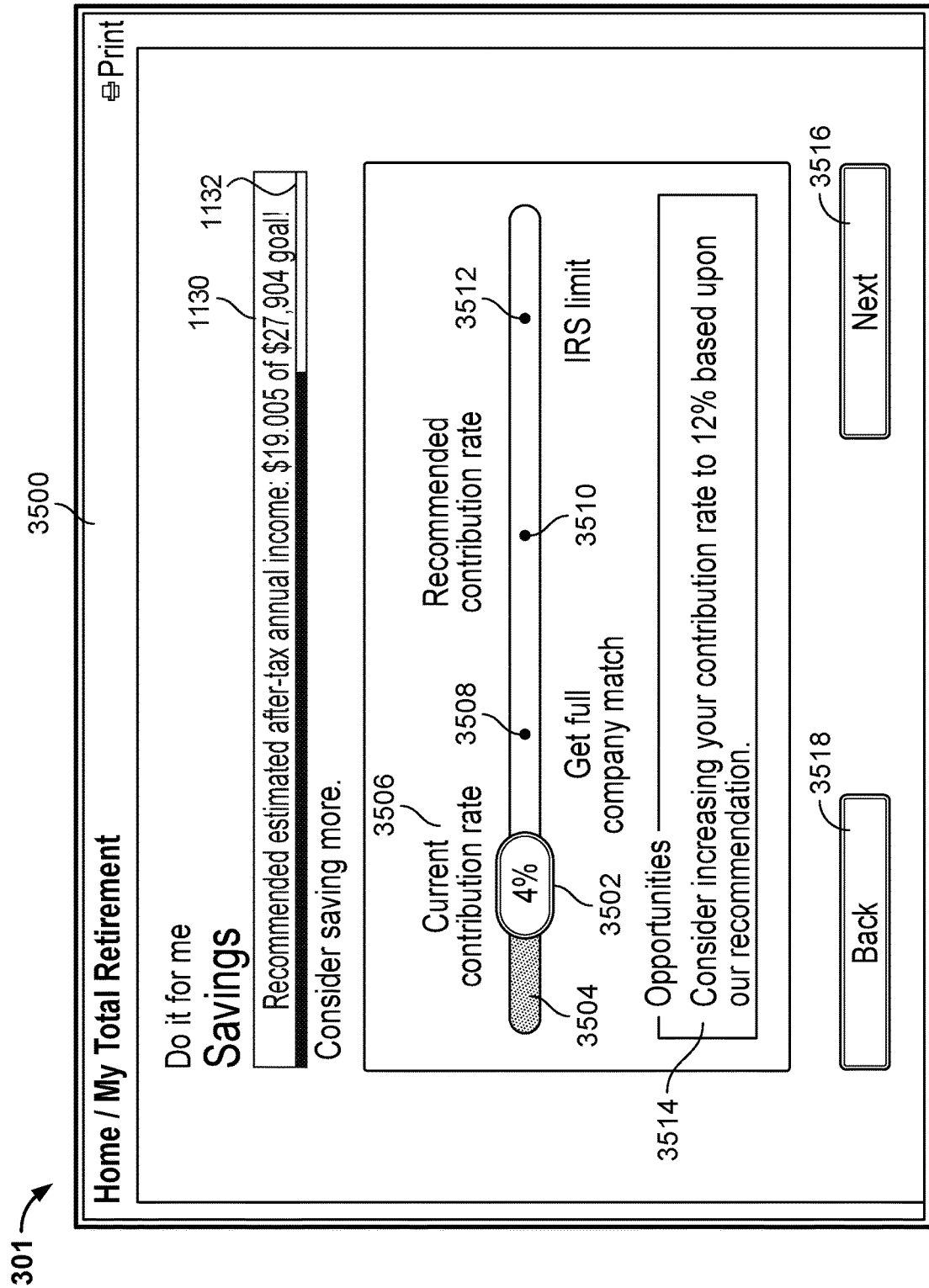
FIG. 35 depicts an exemplary savings rate page of GUI, which may be opened using savings link, and facilitates user input of account data, such as a desired contribution rate, and displays a plurality of contribution rate levels.
Figure 36:
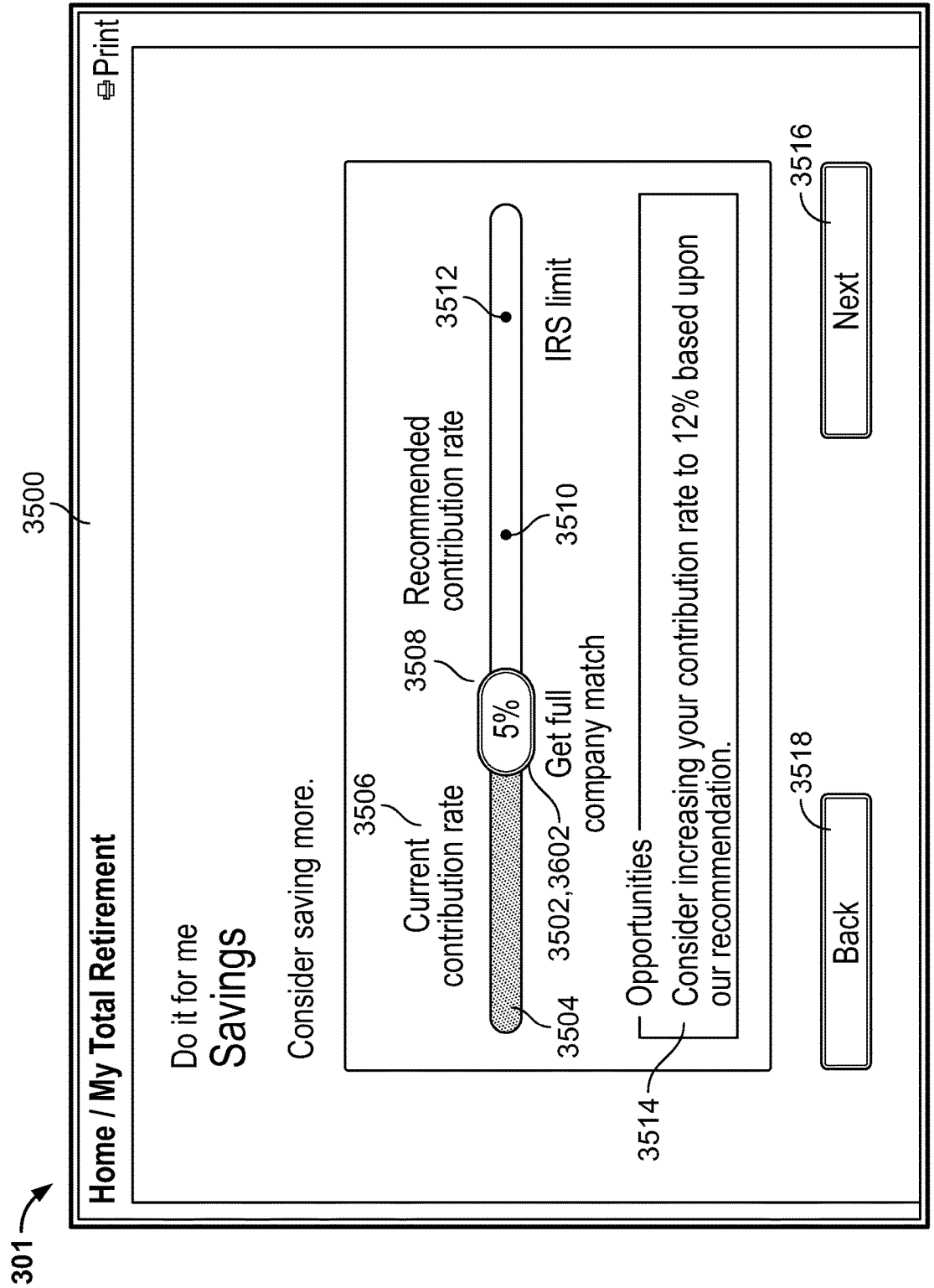
FIG. 36 illustrates slider moved to a new location, which, in the example embodiment, increases the contribution rate to 5%.

FIG. 35 depicts an exemplary savings rate page 3500 of GUI 301, which may be opened using savings link 1106, and facilitates user input of account data, such as a desired contribution rate, and displays a plurality of contribution rate levels. In the exemplary embodiment, savings rate page 3500 includes a contribution scale 3504 which includes a plurality of contribution rate levels such as a current contribution rate 3506, a company match rate 3508, a recommended contribution rate 3510, and an IRS limit rate 3512. Contribution scale 3504 is a component of a widget which also includes contribution slider 3502. Contribution slider 3502 facilitates interactive input of a desired contribution rate by user 102. Specifically, a user is able to change the location of contribution slider 3502 along contribution scale 3504, wherein a given contribution rate is determined by the position of contribution slider 3502 along contribution scale 3504. Contribution slider 3502 is also configured to display a numeric value (e.g., 4%) corresponding to the contribution rate determined by contribution slider 3502. FIG. 36 illustrates slider 3502 moved to a new location 3602, which, in the example embodiment, increases the contribution rate to 5%.

The plurality of contribution rate levels are dynamically generated and transmitted by planning engine 150 based on the user profile data in database 120. In some embodiments, contributions module 208 (shown in FIG. 1B) generates and transmits the plurality of contribution rate levels. In some embodiments, planning engine 150 and/or contributions module 208 retrieve financial data from a database such as database 120 (shown in FIG. 1A) and use the financial data to generate at least one of the plurality of contribution rate levels. Current contribution rate 3506 is based on contribution data collected from user 102 or from the employer as a financial data source 116. Company match rate 3508 is based on contribution and or benefits data collected from user 102. Recommended contribution rate 3510 is generated by planning engine 150, in some cases by contributions module 208, based on user profile data and account data, such as age, salary, asset data, and financial goals. IRS limit rate 3512 is based on user profile data, account data, and financial data retrieved from database 120 or financial data source 116 (shown in FIG. 1A).

Savings rate page 3500 is also configured to display an opportunities alert 3514, which is generated by planning engine 150 based on user profile data and account data, such as financial goals and contribution data. In some embodiments, opportunities alert 3514 is generated by contributions module 208. Savings rate page 3500 is also configured to facilitate the transmission of a desired contribution rate through continuation request 3516. Continuation request 3516 is also configured to facilitate user access to another webpage, such as savings type page 3700 (shown in FIG. 37). Alternatively, the changes on savings rate page 3500 may be discarded using back request 3518.

Figure 37:
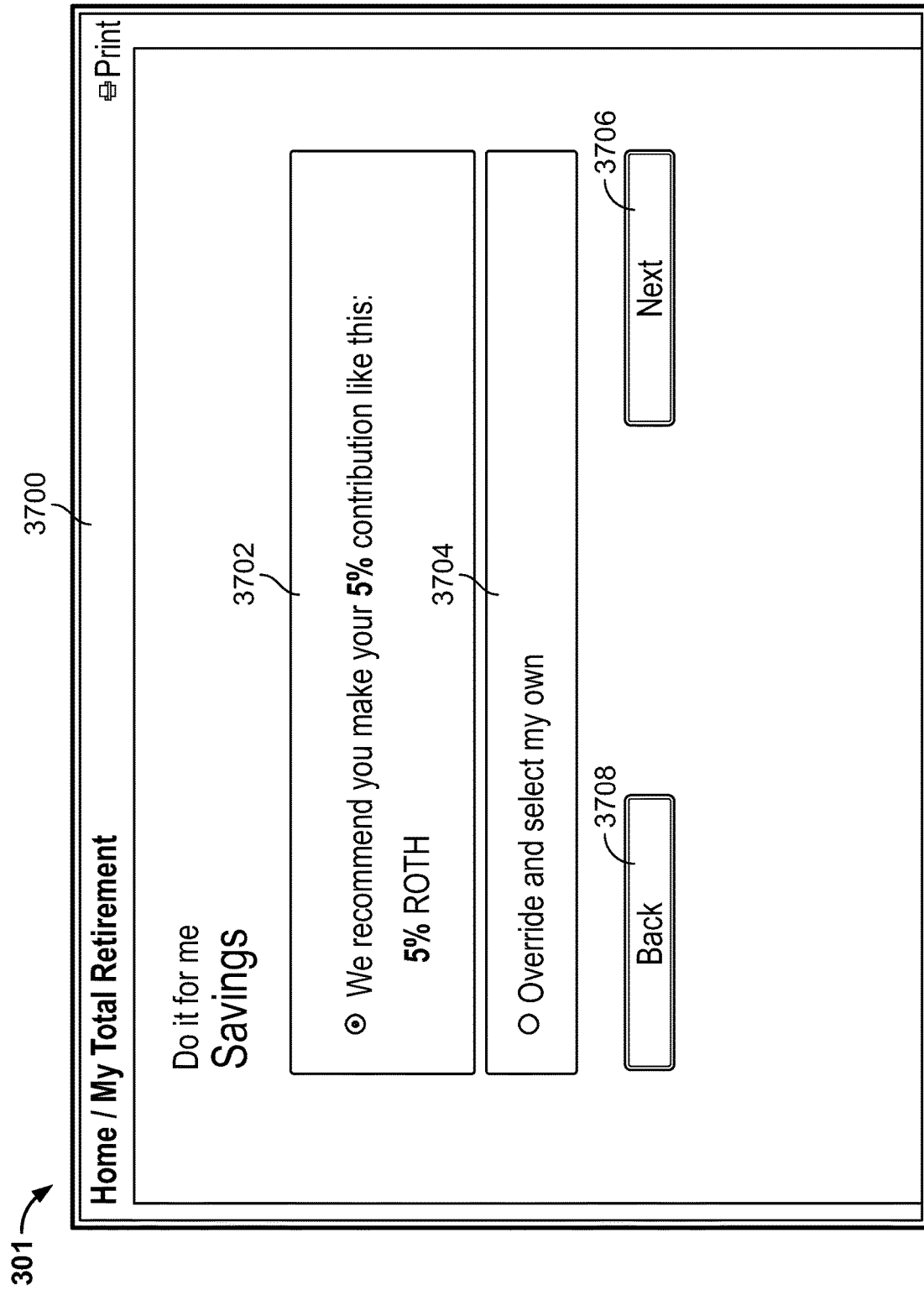
FIG. 37 depicts an exemplary savings type page of GUI, which may open automatically in response to selecting a savings contribution using savings rate page.

FIG. 37 depicts an exemplary savings type page 3700 of GUI 2001, which may open automatically in response to selecting a savings contribution using savings rate page 3500. In the example embodiment, savings type page 3700 facilitates user selection of the type of account(s) (e.g., savings type) to which the user's savings contributions will be divided. The options include a recommended contribution type 3702, which is generated and transmitted by planning engine 150 based on user profile data, account data, and financial data, such as age, financial goals, assets, and contribution data. For example, based on user 102's age, financial goals, and desired contribution rate, planning engine 150 may determine that an entire desired contribution rate (e.g., savings rate) of 5% should be contributed to a Roth IRA. In some embodiments, contributions module 208 (shown in FIG. 1B) generates the recommended contribution account type. The options also include a manual contribution type 3704, which facilitates the manual selection by user 102 of specific account types for the savings contribution.

Figure 38:
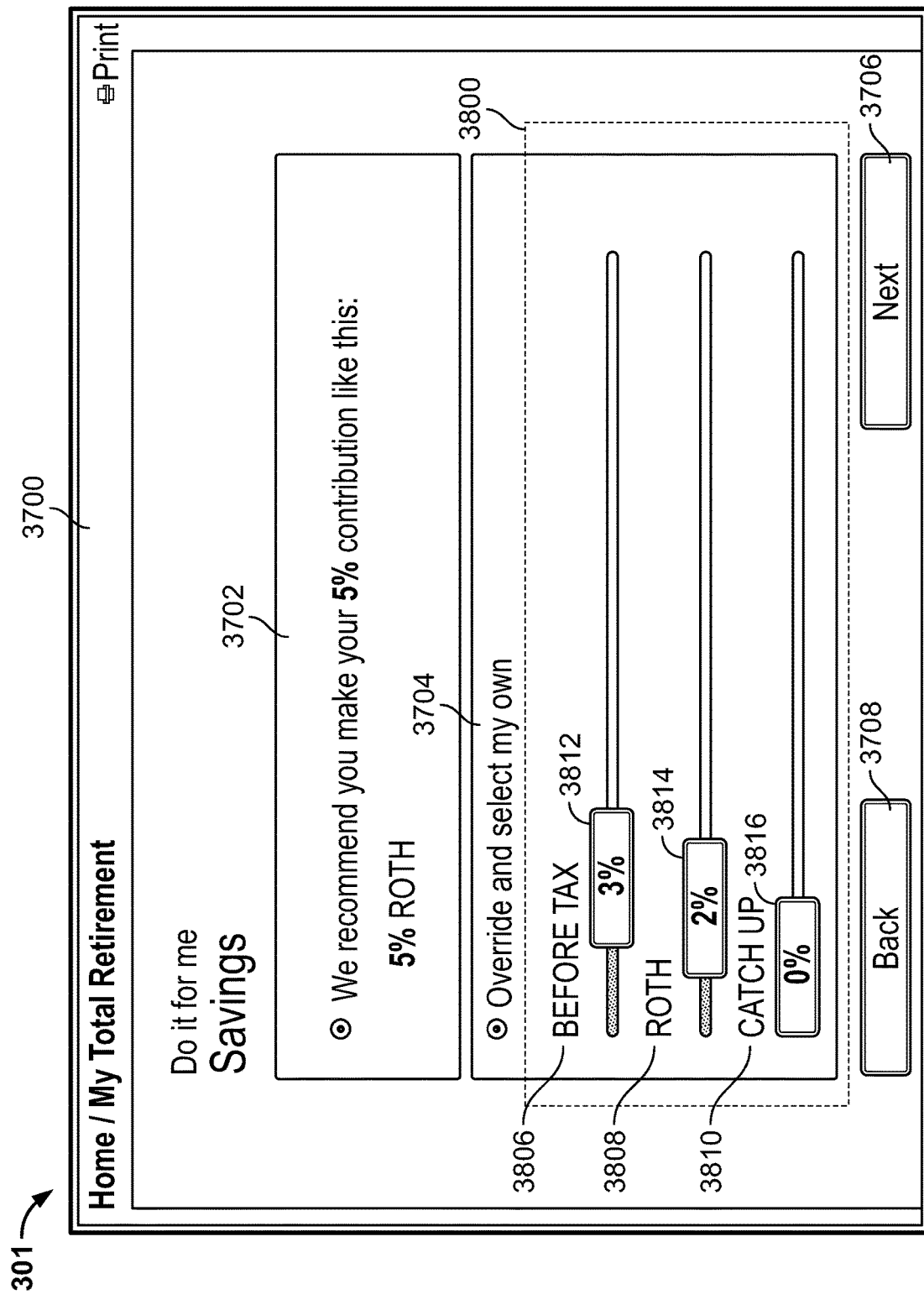
FIG. 38 depicts savings type page enlarged to include an exemplary manual selector region in response to selection of manual contribution type.

FIG. 38 depicts savings type page 3700 enlarged to include an exemplary manual selector region 3800 in response to selection of manual contribution type 3704. In the example embodiment, manual selection region 3800 facilitates the manual selection of specific account types for the user's savings contribution. More specifically, manual selection region 3800 is configured to display a plurality of account types, such as account types 3806, 3808, and 3810. For example, account type 3806 may represent a "Before Tax" account, account type 3808 may represent a "Roth" account, and account type 3810 may represent a "Catch Up" account. Manual selection region 3800 is also configured to display contribution sliders 3812, 3814, and 3816 to facilitate receiving contribution rates from user 102 for the respective account types.

Savings type page 3700 is also configured to facilitate the transmission of contribution preferences and selected contribution account types through continuation request 3706. Continuation request 3706 is further configured to facilitate access to another webpage, such as contribution review page 3900. Alternatively, back button 3708 may be selected to discard changes.

FIG. 39 depicts an exemplary contribution review page 3900 of GUI 301, which displays a summary of changes made to a user's 102 contribution preferences via pages 3500 and 3700 and receives user input confirming the changes from a submit changes button 3906.

Contribution review page 3900 is configured to display a requested change summary 3902, which contains indications for previous contribution preferences and updated contribution preferences, based on changes made by user 102. Contribution review page 3900 is further configured to display change detail 3904. Change detail 3904 includes information detailing the updated contribution preferences which will be applied to a given account.

Contribution review page 3900 is also configured to facilitate access to another webpage, such as contribution confirmation page 4000, through submit changes button 3906. Alternatively, the changes may be discarded using cancel button 3908.

Figure 40:
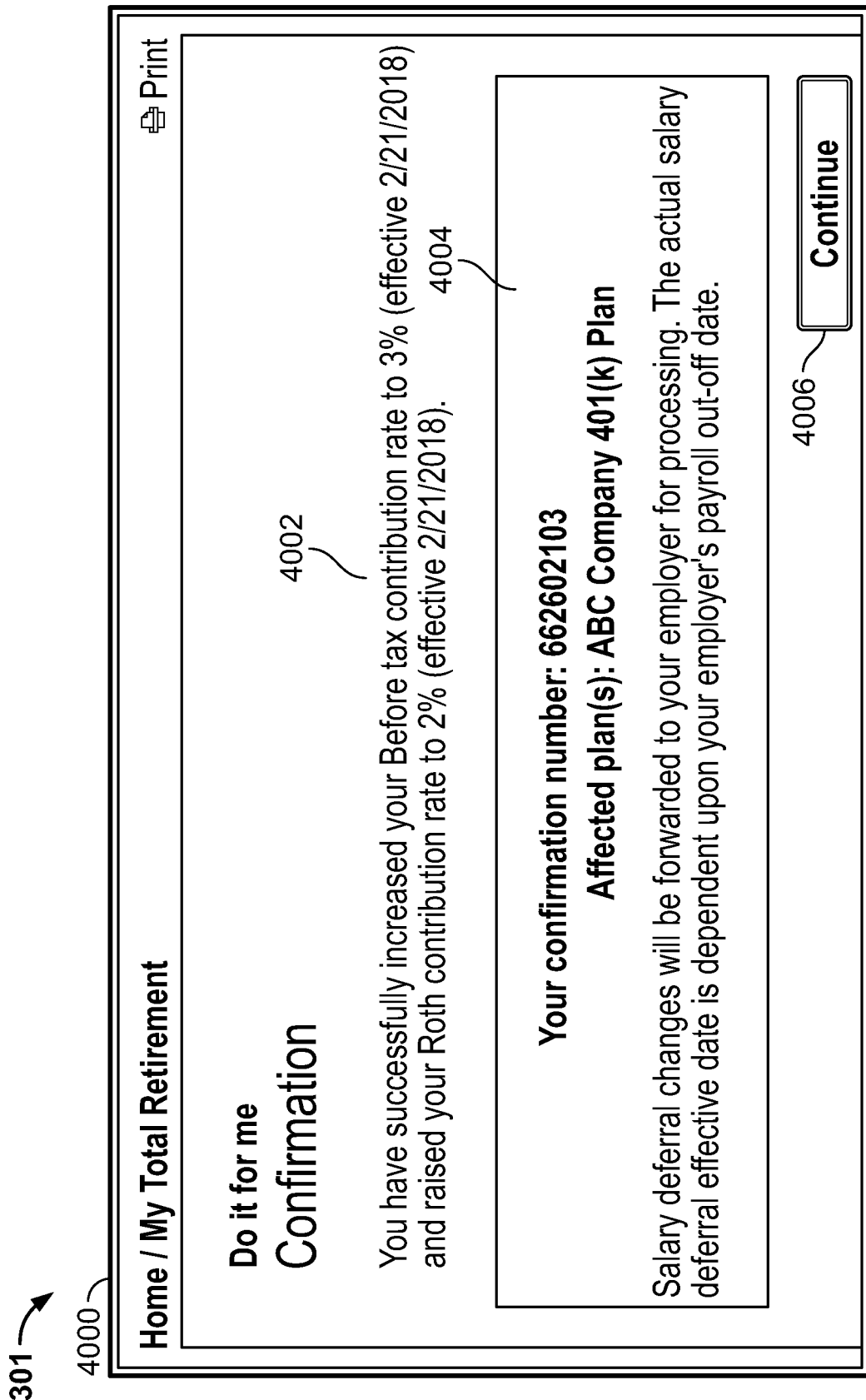
FIG. 40 depicts an exemplary contribution confirmation page of GUI, which displays a confirmation notice of changes made to a user's contribution preferences in response to selection of submit changes button.

FIG. 40 depicts an exemplary contribution confirmation page 4000 of GUI 301, which displays a confirmation notice of changes made to a user's 102 contribution preferences in response to selection of submit changes button 3906.

Contribution confirmation page 4000 is configured to display confirmed change 4002, which contains indications for previous contribution preferences and updated contribution preferences, based on changes made by user 102. Contribution confirmation page 4000 is further configured to display confirmation summary 4004. In the exemplary embodiment, confirmation summary 4004 includes a confirmation number and an account which is affected by the changes to contribution preferences.

Contribution confirmation page 4000 is also configured to facilitate access to another webpage, such as savings goal page 4100, through continue request 4006.

Figure 41:
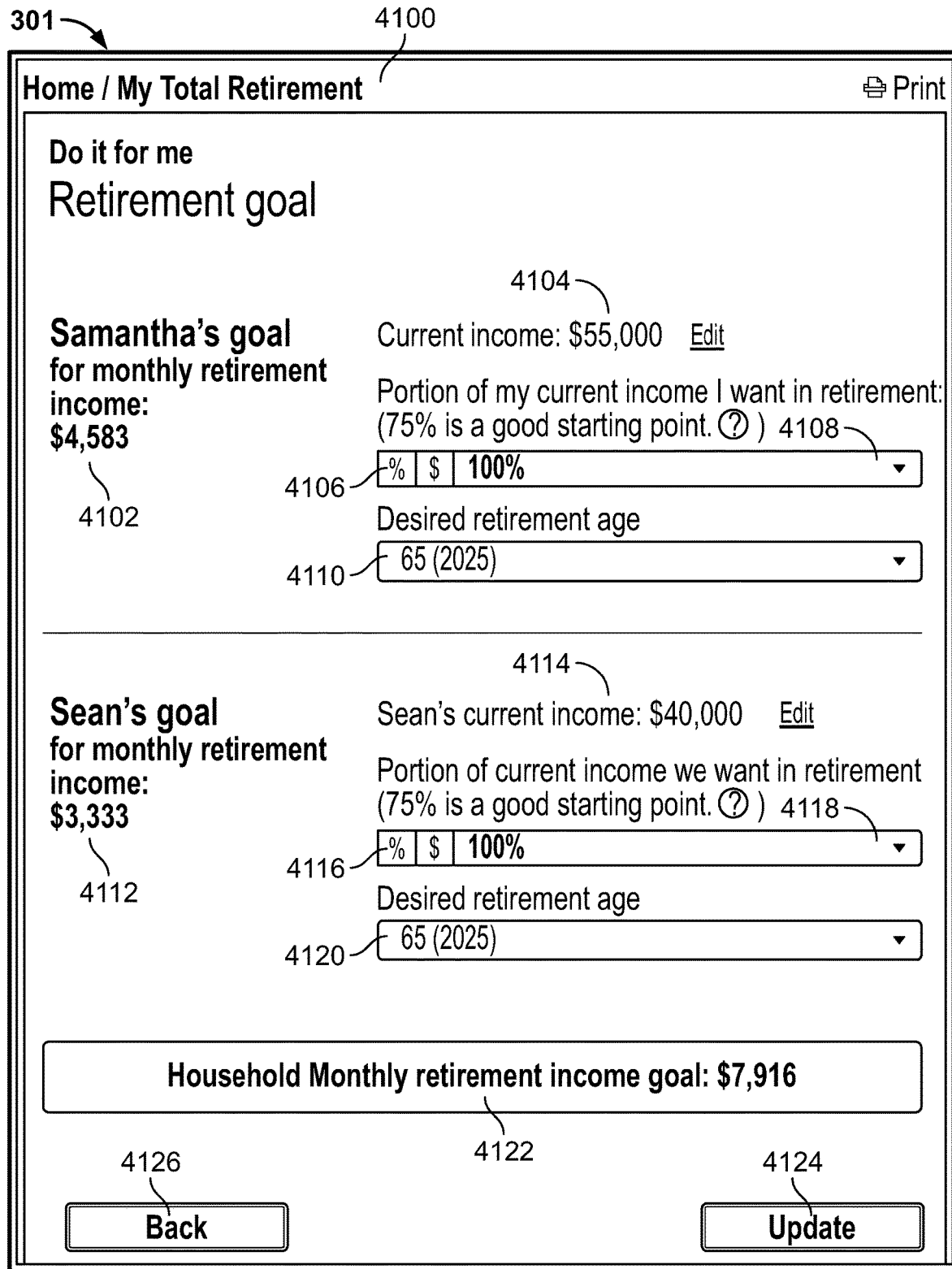
FIG. 41 depicts an exemplary savings goal page of GUI, which may be opened using retirement goal link, and which displays financial information related to a user's financial goals.

FIG. 41 depicts an exemplary savings goal page 4100 of GUI 301, which may be opened using retirement goal link 1102, and which displays financial information related to a user 102's financial goals. In the exemplary embodiment, savings goal page displays financial information related to user 102's retirement goals and facilitates the input of user profile data and account data, such as financial goals and retirement age.

Savings goal page 4100 is configured to display user goal 4102 and spouse goal 4112. User goal 4102 and spouse goal 4112 are generated by planning engine 150 based on user profile data and account data such as current income, such as user current income 4104 and spouse current income 4114, and retirement income goals, such as desired user retirement income amount 4108 and desired spouse retirement income amount 4118. In the exemplary embodiment, based on current incomes 4104 and 4114 and desired retirement income amounts 4108 and 4118, planning engine 150 calculates a monthly retirement income, displayed as user goal 4102 and spouse goal 4112. Savings goal page 4100 is also configured to accept user input defining retirement income format for the user and spouse via format inputs 4106 and 4116. In the example embodiment, format inputs 4106 and 4116 are set to "%", such that the desired retirement income amounts 4108 and 4118 are entered as a percentage of respective current incomes 4104 and 4114. In an alternative embodiment, format inputs 4106 and 4116 are set to "$", such that the desired retirement income amounts 4108 and 4118 are entered as an absolute dollar amount. Savings goal page 4100 is also configured to display a household income goal 4122, based on user goal 4102 and spouse goal 4112.

Savings goal page 4100 is configured to facilitate the transmission of updated savings goals by accepting user changes using an through update request 4124. Update request 4124 is also configured to facilitate access to another webpage, such as retirement dashboard 1100 (shown in FIG. 11). Alternatively, changes may be discarded using back button 4126.

In some embodiments, the financial planning system provides online advice services to users. Users may register for online advice through an enrollment page (not shown) (e.g., via online advice link 812 of FIG. 8A), or may otherwise access the online advice through the "Help Me Do It" link 304 on introductory page 300 (shown in FIG. 3). The user may enter or edit profile data via the about me page 1200 (shown in FIG. 12).

Figure 42:
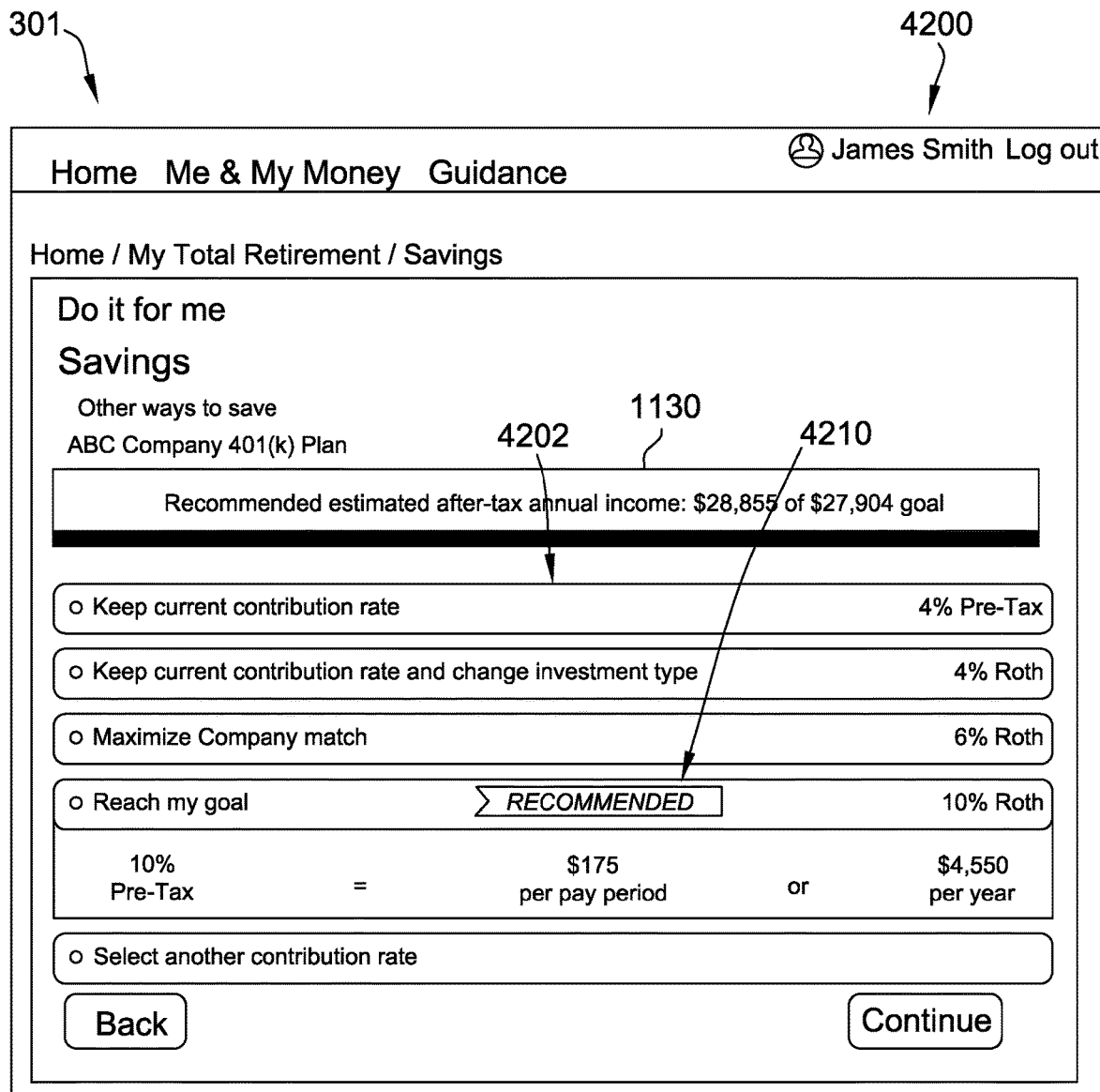
FIG. 42 depicts an alternative exemplary embodiment of savings rate page, here designated savings rate page.

FIG. 42 depicts an alternative exemplary embodiment of savings rate page 3500, here designated savings rate page 4200. In some embodiments, savings rate page 4200, rather than savings rate page 3500 (shown in FIG. 35), is caused to be displayed by selection of savings link 1106 (shown on the dashboard 1100 of FIG. 11) or by selection of a jump link in opportunities area 1126. Savings rate page 4200 presents a series of savings rate and savings type (e.g., tax-deferred or non-tax-deferred contributions to a 401(k) plan) options similar to savings rate page 3500, but in an alternative user-friendly format.

In some embodiments, GUI computer system 114 identifies a 401(k) plan of the user and analyzes the plan data against the user's current profile in database 120 to identify any of four savings options 4202 that may be applicable for the user: (A) maintaining a current contribution rate; (B) maintaining a current savings rate but changing a current savings type (i.e., change investment type) (e.g., to Roth IRA), (C) maintaining a current savings type but changing a current savings rate to equal a company match rate (e.g., increase the current savings rate to "maximize" the user's benefit from the company match policy if the user is currently not taking advantage of company match rate), or (D) changing the current savings rate to reach a user goal. The GUI computer system 114 dynamically determines which of these options are relevant to the user, and causes to be displayed on savings rate page 4200 (or, alternatively, savings rate page 3500) the relevant savings options as options from which the user may select. For example, if the user's current savings type (i.e., pre-tax versus Roth contributions) is already optimal for the user's situation, the "change investment type" option is not displayed. For another example, if the user's contribution rate already meets or exceeds the company match rate, the "maximize company match" option is not displayed. For another example, if the user's contribution rate and type already enable the user's projected income in retirement to meet the user's goal, the "reach my goal" option is not displayed. The option for the user to manually enter a user-selected savings rate and type is also provided, and is presented as the final option in the dynamically generated list. The savings functionality allows participants to view their current savings strategy and view savings recommendations for all accounts that are enrolled in enhanced services.

One problem with conventional recommendation systems is the generation of too many recommendations that overwhelm the user, recommendations that are too complex for the user to grasp, or recommendations that result in changes that appear extreme to the user. The dynamic generation and display of relevant savings options on savings rate page 4200 provides the user with incremental, easily understood options for improving the user's income in retirement.

As discussed above with respect to dashboard 1100, in some embodiments, GUI computer system 114 includes an opportunity rules engine configured to analyze the profile data of the user and identify recommendations for the user based on the user profile data, and without calling the at least one planning engine 150 to directly evaluate the candidate modifications. In some embodiments, the opportunity rules engine operates on a predetermined ordered list of candidate modifications that have been proved to be incremental, easily accepted ways to improve users' ability to meet retirement goals. The opportunity rules engine is programmed to identify, based on the respective user profile and without calling the at least one planning engine 150 to directly evaluate the candidate modifications, one of the candidate modifications that is not considered to be an "extreme" change from the value currently in the user profile and is likely to benefit the user, and to display in opportunity area 1126 a message recommending the identified candidate modification, and an associated jump link to a page of GUI 301 enabling the respective user to execute the identified candidate modification. In some embodiments, by identifying and displaying only a single, incremental modification, GUI 301 increases a likelihood the that the user will consider and adopt the recommendation. Additionally or alternatively, by providing a jump-link directly to a page of GUI 301 that enables the user to execute the recommendation, GUI 301 further increases a likelihood the that the user will adopt the recommendation.

Examples that may be included in the ordered list of candidate modifications include changes to the savings rate and savings type of the user's contributions to the financial account (which may include options similar to the dynamically generated options listed above), as well as addition of profile data for fields which the user has not yet entered data (e.g., replacing null values for the user in the "other assets" or "family information" fields of database 120). It should be noted that whether or not the user is currently reaching the user's goal is known from an initial call to planning engine 150 to obtain the numbers needed for estimated income widget 1130, but the other potential candidate modifications to savings rate and type are evaluated by the opportunities rules engine without calling planning engine 150. The opportunity rules engine may identify the candidate from the ordered list by selecting a first candidate modification in the ordered list and determining whether the selected candidate modification has been implemented in the user profile. If the selected candidate modification has been implemented, the opportunity rules engine skips that candidate modification and selects the next candidate modification from the ordered list. In some embodiments, if the selected candidate modification has not been implemented, the opportunity rules engine identifies the candidate modification for display in the opportunity area 1126. In other embodiments, if the selected candidate modification has not been implemented, the opportunity rules engine compares the candidate modification to a current value of at least one associated data field in the user profile, and evaluates (e.g., based on a look-up table in database 120) whether the candidate modification would be classified as an "extreme" change relative to the current value. If the candidate modification is not extreme, the opportunity rules engine identifies the selected candidate modification for display. If the candidate modification is determined to qualify as "extreme," the opportunity rules engine skips that candidate modification, selects the next candidate modification from the ordered list, and repeats the process.

For example, in the context of savings advice page 4200, the opportunity rules engine is configured to analyze the profile data of the user and identify one of the savings options as a savings recommendation 4210. The list of savings options may sorted into an ordered list of candidate modifications for the user based on the user profile data and without calling the planning engine 150. In the example embodiment, the savings recommendation 4210 is further identified on the savings advice page 4200 with a "RECOMMENDED" flag. In some embodiments, the savings recommendation 4210 may be presented on the dashboard 1100 in opportunity area 1126. When the user selects the opportunity area 1126 from the dashboard 1100, or in some cases a highlighted portion of the message displayed in opportunity area 1126, the opportunity area 1126 acts as a jump link, causing the savings advice page 4200 to be displayed to the user along with the savings recommendation 4210 flagged as shown in FIG. 42.

As discussed above, in some embodiments, the user profile includes family information fields for the user (e.g., spousal data, dependents data) and the ordered list of candidate modifications includes replacing null values for the respective user in the family information field. Further, the opportunity rules engine may provide a jump link associated with the candidate modification that allows the user to bypass the user profile summary page and go directly to the family information fields to replace the family information fields.

In some embodiments, the ordered list of candidate modifications includes a sequence of candidate savings modifications including maintaining a current savings rate and changing a savings type, changing the current savings rate to equal a company match rate, and changing the current savings rate to meet the user goal. Each candidate modification may include a jump link that links to savings rate page 3500, allowing the user to change the savings rate directly. The savings rate page 3500 may include the opportunity area, wherein after activation of the jump link, the message is propagated to the opportunity area of the savings rate page 3500.

Figure 57:
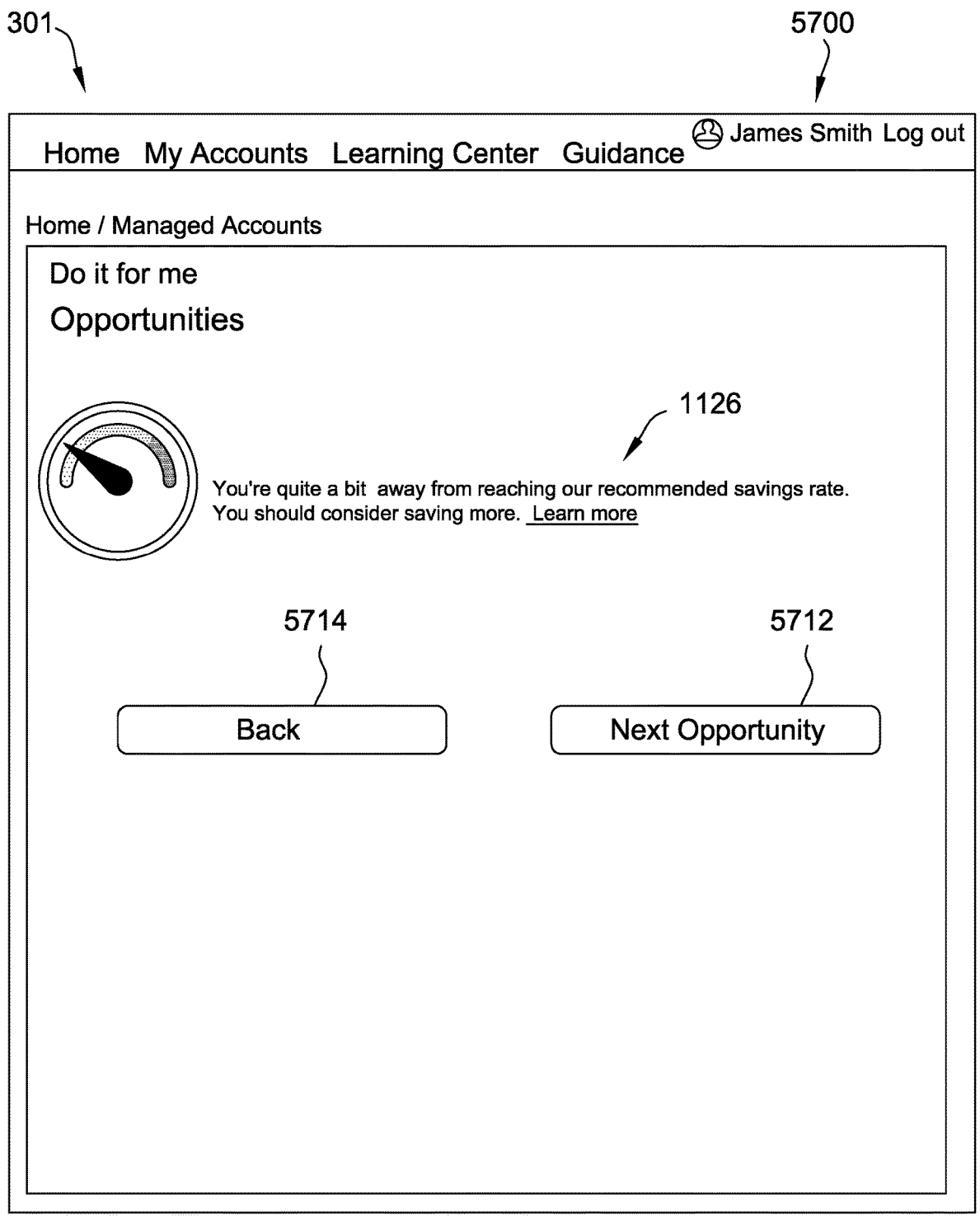

In some embodiments, the opportunity link 1114 causes the opportunity rules engine to execute an opportunities flow process. FIG. 57 depicts an exemplary opportunities page 5700 that allows the user to step through an ordered list of opportunities identified by the opportunity rule engine. The opportunities page 5700 displays one of the identified opportunities of the list within the opportunities area 1126 and provides a back link 5714 and a next opportunity link 5712 that allows the user to step through the sequence. In the exemplary embodiment, the opportunities flow includes the following steps in sequence: (i) selecting the first candidate modification in the ordered list; (ii) determining whether the selected candidate modification has been implemented in the user profile; (iii) if the selected candidate modification has been implemented, selecting the next candidate modification from the ordered list and returning to step (ii); (iv) if the selected candidate modification has not been implemented, displaying (a) the message recommending the identified candidate modification (e.g., in opportunities area 1126), (b) the associated jump link (e.g., "Learn more", as shown in FIG. 57), and (c) a next-opportunity link 5712; (v) in response to activation of the next-opportunity link 5712, selecting the next candidate modification from the ordered list and returning to step (ii); and (vi) in response to activation of the jump link, exiting the opportunities flow process.

In some embodiments, the planning engine 150 determines a projected retirement income based on a savings rate and an assumed savings type being tax-deferred. The planning engine 150 may re-determine the projected retirement income based on the savings rate and a non-tax-deferred savings type. The GUI 301 may include in the list of savings options 4202 a "change type" selector enabling the user to maintain the savings rate value and update the savings type to tax-deferred or non-tax-deferred in response to the savings type being the other of tax-deferred and non-tax-deferred. The planning engine 150 may further determine a goal-based savings rate and a goal-based savings type, where the goal-based savings rate and the goal-based savings type are determined based on a minimum savings rate that enables the respective user to meet the user's goal.

In some embodiments, the GUI 301 may include in the list of savings options 4202 a goal-based selector enabling the user to update the savings rate to a goal-based savings rate and the savings type to the goal-based savings type. In some embodiments, the GUI may compare the savings rate to a maximum company-match value associated with the financial plan and, in response to determining that the savings rate is less than the company-match value, include a company-match selector enabling the user to update the savings rate to the maximum company-match value. In some embodiments, the GUI 301 may include a user-choice selector in the list of savings options 4202 that enables the user to input a new value for the savings rate. In some embodiments, in response to receiving the updated savings rate, the planning engine 150 determines a projected updated retirement income based on the updated savings rate and the assumed savings type being non-tax-deferred and re-determines the projected updated retirement income based on the new savings rate and the assumed savings type being non-tax-deferred. In response to the savings type being one of tax-deferred or non-tax-deferred and the projected updated retirement income being higher for the assumed savings type being the other of tax-deferred and non-tax-deferred, the GUI 301 displays to the user a recommendation to update the savings type field to the other of the tax-deferred and non-tax-deferred type. In some embodiments, displaying the list of savings options 4202 (and associated selectors) includes displaying the savings options 4202 in a hierarchical order corresponding to a degree of change of the savings rate, and wherein the company-match selector appears after the change-type selector, the goal-based selector appears after the company-match selector, and the user-choice selector appears after the goal-based selector. In some embodiments, the savings options 4202 include a no-change selector that allows the user to maintain the current savings rate and savings type. The no-change selector may appear before the change-type selector. In some embodiments, displaying the list of savings options 4202 includes displaying the goal-based selector as a default selection. In some embodiments, the GUI 301 displays a review screen in response to the user selecting one of the savings options 4202. The review screen may include a submit-changes link operable to execute the selected updates in the user profile and a cancel-changes link operable to maintain the savings rate and savings type.

FIG. 43 depicts an exemplary investment advice page 4300 that may be provide as a part of the online advice services to the user. Once the user has completed the savings advice page 4200, either by selecting a new option or continuing with their existing savings rate, the user is next presented with the investment advice page 4300. The investment advice page 4300, in the example embodiment, analyzes the user profile data to generate investment recommendations for 4312. The investment advice page 4300 includes a current investment section 4310 illustrating funds in which the user is currently invested, as well as a current investment risk level (e.g., "moderate conservative"). The investment advice page 4300 also includes an investment recommendations section 4312 that illustrates a recommended risk level (e.g., a change to "moderate") as well as a list of recommended investments 4314 and recommended allocations 4316 (e.g., shown here as percentages). In some embodiments, the recommended allocations 4316 are provided by the planning engine 150 or a third-party service similar to the planning engine 150 configured to analyze user profile data and generate such recommendations.

FIG. 44 depicts an exemplary change review page 4400. If the user chooses to continue with the recommended allocations 4316, the opportunity rules engine displays the change review page 4400 to the user. The change review page 4400, in the example embodiment, includes a savings change summary 4410 and an investment change summary 4412 for review by the user. The savings change summary 4410 displays any change to savings selected by the user on the savings advice page 4200. The investment change summary 4412 displays any change to investments selected by the user on the investment advice page 4300.

Figure 45:
FIG. 45 depicts an exemplary confirmation page.

FIG. 45 depicts an exemplary confirmation page 4500. After the user submits the changes from the change review page 4400, the opportunity rules engine submits the portfolio changes and displays confirmation information 4510 to the user for summary and record keeping purposes.

Figure 46:
FIG. 46 depicts an exemplary social security page that allows the user to identify at what age they intent to begin taking Social Security benefit.

FIG. 46 depicts an exemplary social security page 4600 that allows the user to identify at what age they intend to begin taking Social Security benefit.

Figure 47:
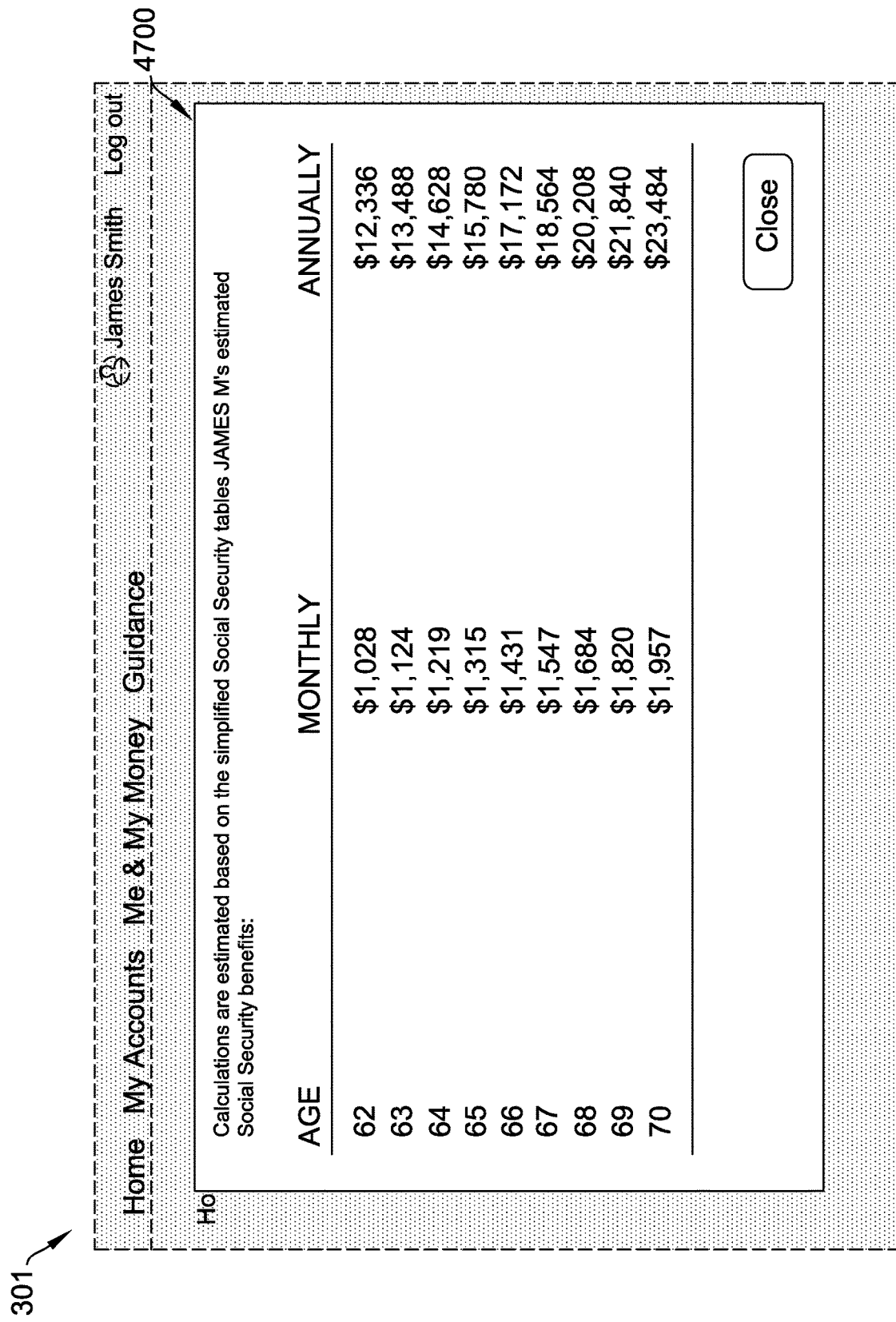
FIG. 47 depicts an exemplary social security benefits page that illustrates social security benefits calculations for the user based on retirement age.

FIG. 47 depicts an exemplary social security benefits page 4700 that illustrates social security benefits calculations for the user based on retirement age.

FIG. 48 depicts an exemplary institution selection page 4800 that allows the user to identify a third-party institution which may manage other investments of the user, and for which auto-linking of the user's third-party account information is available.

FIG. 49 depicts an exemplary account link page 4900 that allows the user to identify information about a linked account identified via the institution selection page 4800.

FIG. 50 depicts an exemplary retirement asset page 5000 that allows the user to add a retirement asset to their portfolio.

Figure 51A:
FIGS. 51A and 51B depict exemplary asset configuration pages that allows the user to configure assets.
Figure 51B:

FIGS. 51A and 51B depict exemplary asset configuration pages 5100, 5110 that allows the user to configure assets.

Figure 52A:
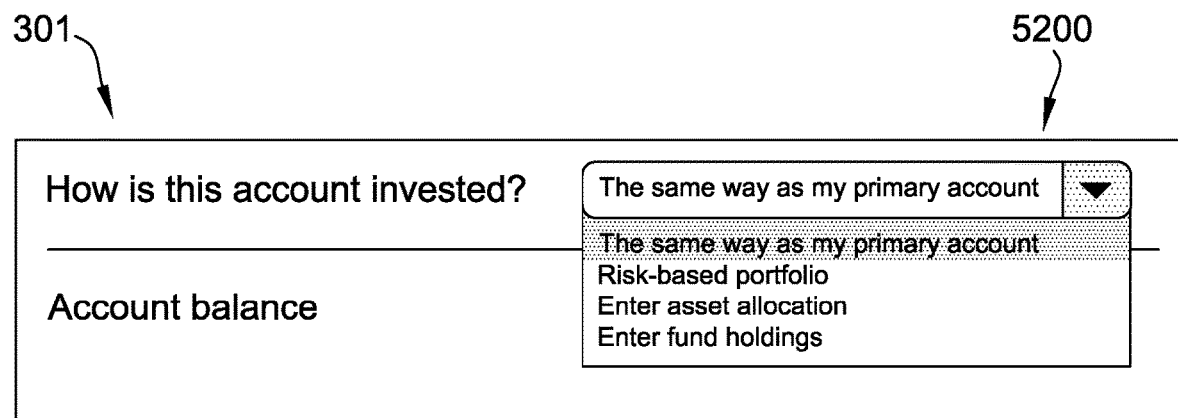
FIGS. 52A and 52B depict exemplary account configuration pages that allows the user to configure accounts.
Figure 52B:
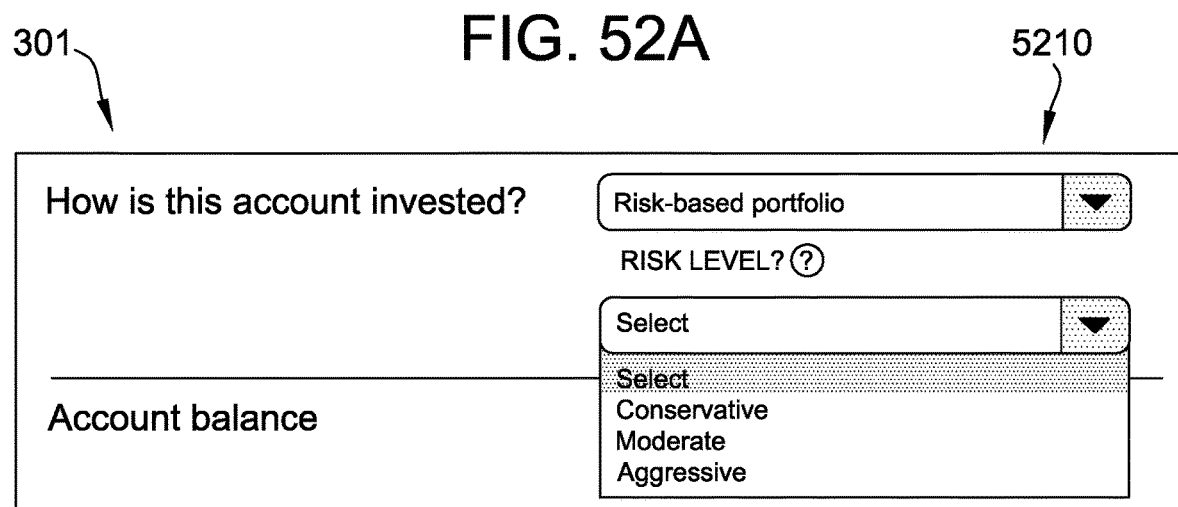

FIGS. 52A and 52B depict exemplary account configuration pages 5200, 5210 that allows the user to configure accounts.

FIGS. 53A and 53B depict exemplary account configuration pages 5300, 5310 that allows the user to configure accounts.

FIG. 54 is an exemplary assets page 5400 that allows the user to add and view their accounts.

FIG. 55 is an exemplary savings goals page 5500 that allows the user to add savings goals.

FIG. 56 is another exemplary add retirement asset page 5600 in "pop up" form that allows the user to add a retirement asset.

FIG. 57 is an exemplary opportunities page 5700 that allows the user to view and step through opportunities, as discussed above.

As will be appreciated based on the foregoing specification, the above-described embodiments of the disclosure may be implemented using computer programming or engineering techniques including computer software, firmware, hardware or any combination or subset thereof, wherein the technical effect is to provide virtualization and fraud security around fundraising and redemption in an online payment transaction environment. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method comprising:
   determining a service level of a user in response to a log-in by the user; and
   presenting a page of a graphical user interface (GUI) to the user,
   wherein, when the service level of the user is a first service level, presenting the page of the GUI includes:
      presenting a top level menu in a first location and in a first format;
      presenting a first projected outcome for the user, the first projected outcome generated by a first engine based on a first set of data fields of a user profile of the user, the first engine in communication with the GUI via a first API, and
   wherein, when the service level of the user is a second service level, presenting the page of the GUI includes:
      presenting the top level menu in the first location and in the first format;
      presenting a second projected outcome for the user, the second projected outcome generated by a second engine based on each of the first set of data fields and a second set of data fields of the user profile such that the second engine, the second engine in communication with the GUI via a second API different than the first API, and
   wherein the GUI includes an interactive control configured to be manipulated by the user to provide modified values for the user profile and the GUI is configured to transmit the modified values through an API to update the user profile.

2. The computer-implemented method of claim 1, wherein, when the service level for the user is the first service level, presenting the page of the GUI further includes presenting a link to a portion of the GUI for enrolling in the second service level.

3. The computer-implemented method of claim 1, wherein, when the service level for the user is the second service level, presenting the page of the GUI further includes presenting a link to a dashboard of the GUI for accessing additional services available at the second service level but not at the first service level.

4. The computer-implemented method of claim 1, wherein:
   when the service level for the user is the first service level, presenting the page of the GUI further includes presenting a first link to a portion of the GUI for enrolling in the second service level,
   when the service level for the user is the second service level, presenting the page of the GUI further includes presenting a second link to a dashboard of the GUI for accessing additional services available at the second service level but not at the first service level, and
   the first link and the second link are presented in substantially the same location of the page of the GUI.

5. The computer-implemented method of claim 1 further comprising generating an alert in response to the first projected outcome or the second projected outcome does not satisfy a stored goal of the user.

6. The computer-implemented method of claim 1, wherein presenting the page of the GUI when the service level of the user is either the first service level or the second service level includes:
   presenting a graphical control corresponding to recommendation data generated by the first planning engine or the second planning engine, the graphical control is controlled to initially be displayed at a recommended starting position according to the recommendation data and further controlled to be updated based upon receipt of user input data at the at least one graphical control, and
   presenting a current value corresponding to a current position of the graphical control.

7. The computer-implemented method of claim 1, wherein the first projected outcome and the second projected outcome are each estimated retirement incomes.

8. A graphical user interface (GUI) comprising:
   a page configured to dynamically modify in response to the GUI determining a service level of a user, wherein:
      when the GUI determines a service level of a user is a first service level, the page is configured to present the top level menu in a first location and in a first format and to present a first projected outcome for the user, the first projected outcome generated by a first engine based on a first set of data fields of a user profile of the user, the first engine in communication with the GUI via a first API, and
      when the GUI determines the service level of the user is a second service level, the page is configured to present the top level menu in the first location and in the first format and to present a second projected outcome for the user, the second projected outcome generated by a second engine based on each of the first set of data fields and a second set of data fields of the user profile such that the second engine, the second engine in communication with the GUI via a second API different than the first API; and
   an interactive control configured to be manipulated by the user to provide modified values for the user profile, wherein the GUI is configured to transmit the modified values through an API to update the user profile.

9. The GUI of claim 8, wherein, when the service level for the user is the first service level, the page is configured to present a link to a portion of the GUI for enrolling in the second service level.

10. The GUI of claim 8, wherein, when the service level for the user is the second service level, the page is configured to present a link to a dashboard of the GUI for accessing additional services available at the second service level but not at the first service level.

11. The GUI of claim 8, wherein:
   when the service level for the user is the first service level, the page is configured to present a first link to a portion of the GUI for enrolling in the second service level,
   when the service level for the user is the second service level, the page is configured to present a second link to a dashboard of the GUI for accessing additional services available at the second service level but not at the first service level, and
   the page is configured to present first link and the second link are presented in substantially the same location of the page.

12. The GUI of claim 8, wherein the GUI is further configured to generate an alert in response to the first projected outcome or the second projected outcome not satisfying a stored goal of the user.

13. The GUI of claim 8, wherein, when the service level of the user is either the first service level or the second service level, the page is configured to:
  present a graphical control corresponding to recommendation data generated by the first planning engine or the second planning engine, the graphical control configured to initially be displayed at a recommended starting position according to the recommendation data and further configured to be updated based upon receipt of user input data at the at least one graphical control, and
  present a current value corresponding to a current position of the graphical control.

14. The GUI of claim 8, wherein the first projected outcome and the second projected outcome are each estimated retirement incomes.

15. At least one non-transitory computer-readable storage media that includes computer-executable instructions that, when executed by the at least one processor, cause the at least one processor to:
  determine a service level of a user in response to a log-in by the user; and
  present a page of a graphical user interface (GUI) to the user,
  wherein, when the service level of the user is a first service level, the instructions cause the at least one processor to present the page of the GUI by:
    presenting a top level menu in a first location and in a first format;
    presenting a first projected outcome for the user, the first projected outcome generated by a first engine based on a first set of data fields of a user profile of the user, the first engine in communication with the GUI via first API,
  wherein, when the service level of the user is a second service level, the instructions cause the at least one processor to present the page of the GUI by:
    presenting the top level menu in the first location and in the first format;
    presenting a second projected outcome for the user, the second projected outcome generated by a second engine based on each of the first set of data fields and a second set of data fields of the user profile such that the second engine, the second engine in communication with the GUI via a second API different than the first API, and
  wherein the GUI further includes an interactive control configured to be manipulated by the user to provide modified values for the user profile and the GUI is configured to transmit the modified values through an API to update the user profile.

16. The at least one non-transitory computer-readable storage media of claim 15, wherein, when the service level for the user is the first service level, the instructions cause the at least one processor to present a link to a portion of the GUI for enrolling in the second service level on the page of the GUI.

17. The at least one non-transitory computer-readable storage media of claim 15, wherein, when the service level for the user is the first service level, the instructions cause the at least one processor to present a link to a dashboard of the GUI for accessing additional services available at the second service level but not at the first service level on the page of the GUI.

18. The at least one non-transitory computer-readable storage media of claim 15, wherein:
  when the service level for the user is the first service level, the instructions cause the at least one processor to present a first link to a portion of the GUI for enrolling in the second service level on the page of the GUI,
  when the service level for the user is the second service level, the instructions cause the at least one processor to present a second link to a dashboard of the GUI for accessing additional services available at the second service level but not at the first service level on the page of the GUI, and
  the first link and the second link are presented in substantially the same location of the page of the GUI.

19. The at least one non-transitory computer-readable storage media of claim 15, wherein the instructions further cause the at least one processor to generate an alert in response to the first projected outcome or the second projected outcome does not satisfy a stored goal of the user.

20. The at least one non-transitory computer-readable storage media of claim 15, wherein, when the service level of the user is either the first service level or the second service level, the instructions cause the at least one processor to present the page of the GUI by:
  presenting a graphical control corresponding to recommendation data generated by the first planning engine or the second planning engine, the graphical control is controlled to initially be displayed at a recommended starting position according to the recommendation data and further controlled to be updated based upon receipt of user input data at the at least one graphical control, and
  presenting a current value corresponding to a current position of the graphical control.

* * * * *